US008432800B2

(12) United States Patent
Plamondon et al.

(10) Patent No.: US 8,432,800 B2
(45) Date of Patent: Apr. 30, 2013

(54) SYSTEMS AND METHODS FOR STOCHASTIC-BASED QUALITY OF SERVICE

(75) Inventors: Robert Plamondon, Blodgett, OR (US); Michael Ovsiannikov, San Mateo, CA (US); Allen Samuels, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1355 days.

(21) Appl. No.: 11/685,156

(22) Filed: Mar. 12, 2007

(65) Prior Publication Data

US 2007/0206615 A1    Sep. 6, 2007

Related U.S. Application Data

(63) Continuation-in-part of application No. 10/901,940, filed on Jul. 28, 2004, which is a continuation-in-part of application No. 10/696,507, filed on Oct. 29, 2003, now Pat. No. 7,542, 471.

(60) Provisional application No. 60/490,694, filed on Jul. 29, 2003.

(51) Int. Cl.
*H04L 12/26* (2006.01)

(52) U.S. Cl.
USPC .......................................... 370/231; 370/235

(58) Field of Classification Search .................. 370/231, 370/235, 473; 709/224, 232
See application file for complete search history.

(56) References Cited

U.S. PATENT DOCUMENTS

| | | | |
|---|---|---|---|
| 4,438,511 A | 3/1984 | Baran | |
| 4,701,745 A | 10/1987 | Waterworth et al. | |
| 4,736,369 A | 4/1988 | Barzilai et al. | |
| 4,750,171 A | 6/1988 | Kedar et al. | |
| 4,768,190 A | 8/1988 | Giancarlo | |
| 4,893,307 A | 1/1990 | McKay et al. | |
| 4,922,486 A | 5/1990 | Lidinsky et al. | |

(Continued)

FOREIGN PATENT DOCUMENTS

| | | |
|---|---|---|
| EP | 0 493 286 | 7/1992 |
| WO | WO-9966675 | 12/1999 |
| WO | WO-00/35163 | 6/2000 |

OTHER PUBLICATIONS

Information Sciences Institute, "RFC 793: Transmission Control Protocol," Sep. 1981, IETF, p. 15-40.*

(Continued)

*Primary Examiner* — Dang Ton
*Assistant Examiner* — Ryan Kavleski
(74) *Attorney, Agent, or Firm* — Foley & Lardner LLP; Christopher McKenna

(57) ABSTRACT

Systems and methods for utilizing transaction boundary detection methods in queuing and retransmission decisions relating to network traffic are described. By detecting transaction boundaries and sizes, a client, server, or intermediary device may prioritize based on transaction sizes in queuing decisions, giving precedence to smaller transactions which may represent interactive and/or latency-sensitive traffic. Further, after detecting a transaction boundary, a device may retransmit one or more additional packets prompting acknowledgements, in order to ensure timely notification if the last packet of the transaction has been dropped. Systems and methods for potentially improving network latency, including retransmitting a dropped packet twice or more in order to avoid incurring additional delays due to a retransmitted packet being lost are also described.

51 Claims, 16 Drawing Sheets

U.S. PATENT DOCUMENTS

| | | | |
|---|---|---|---|
| 4,928,247 A | 5/1990 | Doyle et al. |
| 4,941,089 A | 7/1990 | Fischer |
| 4,953,159 A | 8/1990 | Hayden et al. |
| 5,014,221 A | 5/1991 | Mogul |
| 5,021,949 A | 6/1991 | Morten et al. |
| 5,029,164 A | 7/1991 | Goldstein et al. |
| 5,159,592 A | 10/1992 | Perkins |
| 5,181,200 A | 1/1993 | Harrison |
| 5,241,625 A | 8/1993 | Epard et al. |
| 5,307,456 A | 4/1994 | MacKay |
| 5,315,698 A | 5/1994 | Case et al. |
| 5,345,588 A | 9/1994 | Greenwood et al. |
| 5,392,223 A | 2/1995 | Caci |
| 5,410,543 A | 4/1995 | Seitz et al. |
| 5,446,736 A | 8/1995 | Gleeson et al. |
| 5,517,617 A | 5/1996 | Sathaye et al. |
| 5,541,927 A | 7/1996 | Kristol et al. |
| 5,564,070 A | 10/1996 | Want et al. |
| 5,566,225 A | 10/1996 | Haas |
| 5,572,674 A | 11/1996 | Ernst |
| 5,623,603 A | 4/1997 | Jiang et al. |
| 5,655,081 A | 8/1997 | Bonnell et al. |
| 5,657,390 A | 8/1997 | Elgamal et al. |
| 5,734,825 A | 3/1998 | Lauck et al. |
| 5,737,416 A | 4/1998 | Cooper et al. |
| 5,757,795 A | 5/1998 | Schnell |
| 5,758,085 A | 5/1998 | Kouoheris et al. |
| 5,764,915 A | 6/1998 | Heimsoth et al. |
| 5,793,768 A | 8/1998 | Keshav |
| 5,809,235 A | 9/1998 | Sharma et al. |
| 5,822,543 A | 10/1998 | Dunn et al. |
| 5,838,682 A | 11/1998 | Dekelbaum et al. |
| 5,838,920 A | 11/1998 | Rosborough |
| 5,864,678 A | 1/1999 | Riddle |
| 5,898,674 A | 4/1999 | Mawhinney et al. |
| 5,920,701 A | 7/1999 | Miller et al. |
| 5,933,412 A | 8/1999 | Choudhury et al. |
| 5,936,940 A | 8/1999 | Marin et al. |
| 5,937,169 A | 8/1999 | Connery et al. |
| 5,938,733 A | 8/1999 | Heimsoth et al. |
| 5,959,974 A | 9/1999 | Badt et al. |
| 5,968,176 A | 10/1999 | Nessett et al. |
| 5,974,028 A | 10/1999 | Ramakrishnan |
| 5,978,848 A | 11/1999 | Maddalozzo et al. |
| 5,983,227 A | 11/1999 | Nazem et al. |
| 6,003,030 A | 12/1999 | Kenner et al. |
| 6,005,843 A | 12/1999 | Kamiya et al. |
| 6,058,480 A | 5/2000 | Brown |
| 6,061,796 A | 5/2000 | Chen et al. |
| 6,076,113 A | 6/2000 | Ramanathan et al. |
| 6,078,582 A | 6/2000 | Curry et al. |
| 6,101,543 A | 8/2000 | Alden et al. |
| 6,108,697 A | 8/2000 | Raymond et al. |
| 6,112,085 A | 8/2000 | Garner et al. |
| 6,131,110 A | 10/2000 | Bates et al. |
| 6,147,986 A | 11/2000 | Orsic |
| 6,158,007 A | 12/2000 | Moreh et al. |
| 6,167,449 A | 12/2000 | Arnold et al. |
| 6,170,075 B1 | 1/2001 | Schuster et al. |
| 6,181,711 B1 | 1/2001 | Zhang et al. |
| 6,198,920 B1 | 3/2001 | Doviak et al. |
| 6,205,120 B1 | 3/2001 | Packer et al. |
| 6,236,643 B1 | 5/2001 | Kerstein |
| 6,252,851 B1 | 6/2001 | Siu et al. |
| 6,253,188 B1 | 6/2001 | Witek et al. |
| 6,253,326 B1 | 6/2001 | Lincke et al. |
| 6,256,673 B1 | 7/2001 | Gayman |
| 6,259,705 B1 | 7/2001 | Takahashi et al. |
| 6,282,172 B1 | 8/2001 | Robles et al. |
| 6,289,382 B1 | 9/2001 | Bowman-Amuah |
| 6,292,172 B1 | 9/2001 | Makhlouf |
| 6,308,213 B1 | 10/2001 | Valencia |
| 6,314,406 B1 | 11/2001 | O'Hagan et al. |
| 6,321,269 B1 * | 11/2001 | Walker ........................ 709/237 |
| 6,324,582 B1 | 11/2001 | Sridhar et al. |
| 6,332,163 B1 | 12/2001 | Bowman-Amuah |
| 6,333,931 B1 | 12/2001 | LaPier et al. |
| 6,339,832 B1 | 1/2002 | Bowman-Amuah |
| 6,343,318 B1 | 1/2002 | Hawkins et al. |
| 6,359,882 B1 | 3/2002 | Robles et al. |
| 6,363,429 B1 * | 3/2002 | Ketcham ........................ 709/235 |
| 6,374,300 B2 | 4/2002 | Masters |
| 6,397,259 B1 | 5/2002 | Lincke et al. |
| 6,400,996 B1 | 6/2002 | Hoffberg et al. |
| 6,405,252 B1 | 6/2002 | Gupta et al. |
| 6,411,986 B1 | 6/2002 | Susai et al. |
| 6,418,324 B1 | 7/2002 | Doviak et al. |
| 6,421,726 B1 | 7/2002 | Kenner et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,449,283 B1 | 9/2002 | Chao et al. |
| 6,452,915 B1 | 9/2002 | Jorgensen |
| 6,457,052 B1 | 9/2002 | Markowitz et al. |
| 6,463,470 B1 | 10/2002 | Mohaban et al. |
| 6,466,984 B1 | 10/2002 | Naveh et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,487,598 B1 | 11/2002 | Valencia |
| 6,496,481 B1 | 12/2002 | Wu et al. |
| 6,496,520 B1 | 12/2002 | Acosta |
| 6,496,850 B1 | 12/2002 | Bowman-Amuah |
| 6,496,856 B1 | 12/2002 | Kenner et al. |
| 6,499,107 B1 | 12/2002 | Gleichauf et al. |
| 6,502,102 B1 | 12/2002 | Haswell et al. |
| 6,502,125 B1 | 12/2002 | Kenner et al. |
| 6,502,135 B1 | 12/2002 | Munger et al. |
| 6,502,213 B1 | 12/2002 | Bowman-Amuah |
| 6,516,315 B1 | 2/2003 | Gupta |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,539,429 B2 | 3/2003 | Rakavy et al. |
| 6,542,077 B2 | 4/2003 | Joao |
| 6,546,425 B1 | 4/2003 | Hanson et al. |
| 6,549,949 B1 | 4/2003 | Bowman-Amuah |
| 6,550,057 B1 | 4/2003 | Bowman-Amuah |
| 6,560,243 B1 | 5/2003 | Mogul |
| 6,571,282 B1 | 5/2003 | Bowman-Amuah |
| 6,573,907 B1 | 6/2003 | Madrane |
| 6,578,068 B1 | 6/2003 | Bowman-Amuah |
| 6,584,569 B2 | 6/2003 | Reshef et al. |
| 6,587,437 B1 | 7/2003 | Lee et al. |
| 6,590,588 B2 | 7/2003 | Lincke et al. |
| 6,595,417 B2 | 7/2003 | O'Hagan et al. |
| 6,601,107 B1 | 7/2003 | Seibert |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,744 B1 | 8/2003 | Mikurak |
| 6,609,128 B1 | 8/2003 | Underwood |
| 6,611,522 B1 | 8/2003 | Zheng et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,761 B2 | 9/2003 | Munger et al. |
| 6,622,172 B1 | 9/2003 | Tam et al. |
| 6,624,766 B1 | 9/2003 | Possley et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,657,954 B1 | 12/2003 | Bird et al. |
| 6,658,021 B1 | 12/2003 | Bromley et al. |
| 6,658,624 B1 | 12/2003 | Savitzky et al. |
| 6,665,706 B2 | 12/2003 | Kenner et al. |
| 6,671,818 B1 | 12/2003 | Mikurak |
| 6,680,976 B1 | 1/2004 | Chen et al. |

| Patent | Date | Inventor |
|---|---|---|
| 6,683,873 B1 | 1/2004 | Kwok et al. |
| 6,687,227 B1 | 2/2004 | Li et al. |
| 6,687,732 B1 | 2/2004 | Bector et al. |
| 6,687,745 B1 | 2/2004 | Franco et al. |
| 6,691,232 B1 | 2/2004 | Wood et al. |
| 6,697,368 B2 | 2/2004 | Chang et al. |
| 6,701,514 B1 | 3/2004 | Haswell et al. |
| 6,704,873 B1 | 3/2004 | Underwood |
| 6,711,164 B1 | 3/2004 | Le et al. |
| 6,711,166 B1 | 3/2004 | Amir et al. |
| 6,714,536 B1 | 3/2004 | Dowling |
| 6,715,145 B1 | 3/2004 | Bowman-Amuah |
| 6,718,380 B1 | 4/2004 | Mohaban et al. |
| 6,718,535 B1 | 4/2004 | Underwood |
| 6,721,713 B1 | 4/2004 | Guheen et al. |
| 6,735,218 B2 | 5/2004 | Chang et al. |
| 6,742,015 B1 | 5/2004 | Bowman-Amuah |
| 6,745,360 B1 | 6/2004 | Srinivas et al. |
| 6,751,453 B2 | 6/2004 | Schemers et al. |
| 6,751,673 B2 | 6/2004 | Shaw |
| 6,754,228 B1 | 6/2004 | Ludwig |
| 6,788,682 B1 | 9/2004 | Kimmitt |
| 6,792,615 B1 | 9/2004 | Rowe et al. |
| 6,799,221 B1 | 9/2004 | Kenner et al. |
| 6,801,499 B1 | 10/2004 | Anandakumar et al. |
| 6,816,963 B1 | 11/2004 | Krithivas et al. |
| 6,820,133 B1 | 11/2004 | Grove et al. |
| 6,826,616 B2 | 11/2004 | Larson et al. |
| 6,834,297 B1 | 12/2004 | Peiffer et al. |
| 6,834,310 B2 | 12/2004 | Munger et al. |
| 6,839,759 B2 | 1/2005 | Larson et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,850,491 B1 | 2/2005 | Firoiu et al. |
| 6,856,651 B2 | 2/2005 | Singh |
| 6,859,776 B1 | 2/2005 | Cohen et al. |
| 6,877,043 B2 | 4/2005 | Mallory et al. |
| 6,880,086 B2 | 4/2005 | Kidder et al. |
| 6,882,624 B1 | 4/2005 | Ma et al. |
| 6,882,634 B2 | 4/2005 | Bagchi et al. |
| 6,888,844 B2 | 5/2005 | Mallory et al. |
| 6,888,927 B1 | 5/2005 | Cruickshank et al. |
| 6,891,799 B1 | 5/2005 | Hagai et al. |
| 6,891,830 B2 | 5/2005 | Curtis |
| 6,891,881 B2 | 5/2005 | Trachewsky et al. |
| 6,898,204 B2 | 5/2005 | Trachewsky et al. |
| 6,901,072 B1 | 5/2005 | Wong |
| 6,901,075 B1 | 5/2005 | Baron |
| 6,907,473 B2 | 6/2005 | Schmidt et al. |
| 6,907,546 B1 | 6/2005 | Haswell et al. |
| 6,914,886 B2 | 7/2005 | Peles et al. |
| 6,928,473 B1 | 8/2005 | Sundaram et al. |
| 6,934,288 B2 | 8/2005 | Dempo et al. |
| 6,954,800 B2 | 10/2005 | Mallory |
| 6,954,801 B1 | 10/2005 | Housel |
| 6,957,186 B1 | 10/2005 | Guheen et al. |
| 6,970,552 B1 | 11/2005 | Hahn et al. |
| 6,973,097 B1 | 12/2005 | Donzis et al. |
| 6,975,655 B2 | 12/2005 | Fischer et al. |
| 6,980,543 B1 | 12/2005 | Kastenholz et al. |
| 6,981,047 B2 | 12/2005 | Hanson et al. |
| 6,981,087 B1 | 12/2005 | Heitkamp et al. |
| 6,981,143 B2 | 12/2005 | Mullen et al. |
| 6,981,180 B1 | 12/2005 | Bailey et al. |
| 6,982,963 B2 | 1/2006 | Asahina et al. |
| 6,988,236 B2 | 1/2006 | Ptasinski et al. |
| 6,990,070 B1 | 1/2006 | Aweya et al. |
| 6,993,101 B2 | 1/2006 | Trachewsky et al. |
| 6,999,419 B2 | 2/2006 | Ise et al. |
| 7,000,031 B2 | 2/2006 | Fischer et al. |
| 7,003,777 B2 | 2/2006 | Hines |
| 7,007,089 B2 | 2/2006 | Freedman |
| 7,016,367 B1 | 3/2006 | Dyckerhoff et al. |
| 7,016,973 B1 | 3/2006 | Sibal et al. |
| 7,020,714 B2 | 3/2006 | Kalyanaraman et al. |
| 7,020,719 B1 | 3/2006 | Grove et al. |
| 7,023,979 B1 | 4/2006 | Wu et al. |
| 7,025,209 B2 | 4/2006 | Hawkins |
| 7,027,975 B1 | 4/2006 | Pazandak et al. |
| 7,028,083 B2 | 4/2006 | Levine et al. |
| 7,028,094 B2 | 4/2006 | Le et al. |
| 7,031,315 B2 | 4/2006 | Tanaka et al. |
| 7,032,153 B1 | 4/2006 | Zhang et al. |
| 7,035,285 B2 | 4/2006 | Holloway et al. |
| 7,035,914 B1 | 4/2006 | Payne et al. |
| 7,039,828 B1 | 5/2006 | Scott |
| 7,043,225 B1 | 5/2006 | Patel et al. |
| 7,050,396 B1 | 5/2006 | Cohen et al. |
| 7,055,028 B2 | 5/2006 | Peiffer et al. |
| 7,062,645 B2 | 6/2006 | Kroening |
| 7,068,641 B1 | 6/2006 | Allan et al. |
| 7,092,502 B2 | 8/2006 | Mohn et al. |
| 7,100,195 B1 | 8/2006 | Underwood |
| 7,103,068 B1 | 9/2006 | Gardner et al. |
| 7,116,894 B1 | 10/2006 | Chatterton |
| 7,123,613 B1 | 10/2006 | Chawla et al. |
| 7,124,101 B1 | 10/2006 | Mikurak |
| 7,126,913 B1 * | 10/2006 | Patel et al. .................. 370/230.1 |
| 7,130,807 B1 | 10/2006 | Mikurak |
| 7,136,645 B2 | 11/2006 | Hanson et al. |
| 7,143,153 B1 | 11/2006 | Black et al. |
| 7,149,698 B2 | 12/2006 | Guheen et al. |
| 7,150,017 B1 | 12/2006 | Vogl et al. |
| 7,165,041 B1 | 1/2007 | Guheen et al. |
| 7,171,440 B2 | 1/2007 | Hanner |
| 7,174,126 B2 | 2/2007 | McElhatten et al. |
| 7,188,180 B2 | 3/2007 | Larson et al. |
| 7,197,234 B1 | 3/2007 | Chatterton |
| 7,197,751 B2 | 3/2007 | Fedotov et al. |
| 7,200,153 B2 | 4/2007 | Feuerstraeter et al. |
| 7,206,805 B1 | 4/2007 | McLaughlin, Jr. |
| 7,206,811 B2 | 4/2007 | Skurikhin et al. |
| 7,209,437 B1 | 4/2007 | Hodgkinson et al. |
| 7,219,127 B2 | 5/2007 | Huck et al. |
| 7,222,305 B2 | 5/2007 | Teplov et al. |
| 7,225,244 B2 | 5/2007 | Reynolds et al. |
| 7,227,872 B1 | 6/2007 | Biswas et al. |
| 7,260,840 B2 | 8/2007 | Swander et al. |
| 7,280,547 B2 | 10/2007 | Featherston et al. |
| 7,310,336 B2 | 12/2007 | Malkamaki |
| 7,318,100 B2 | 1/2008 | Demmer et al. |
| 7,321,936 B2 | 1/2008 | Zimmerman et al. |
| 7,352,702 B2 | 4/2008 | Rosier |
| 7,389,537 B1 | 6/2008 | Callon et al. |
| 7,499,452 B2 | 3/2009 | Shearer et al. |
| 7,502,860 B1 | 3/2009 | Champagne |
| 7,536,473 B2 | 5/2009 | Ajanovic et al. |
| 7,539,130 B2 | 5/2009 | Le et al. |
| 7,542,472 B1 | 6/2009 | Gerendai et al. |
| 7,603,606 B1 | 10/2009 | Mate et al. |
| 7,609,640 B2 | 10/2009 | Ahuja et al. |
| 7,616,638 B2 | 11/2009 | Samuels et al. |
| 7,630,305 B2 | 12/2009 | Samuels et al. |
| 7,656,799 B2 | 2/2010 | Samuels et al. |
| 7,673,074 B1 | 3/2010 | Sebastian et al. |
| 7,706,369 B2 | 4/2010 | Roese et al. |
| 7,924,881 B2 | 4/2011 | Frank et al. |
| 2001/0007137 A1 | 7/2001 | Suumaki et al. |
| 2001/0030970 A1 | 10/2001 | Wiryaman et al. |
| 2001/0049717 A1 | 12/2001 | Freeman et al. |
| 2002/0006790 A1 | 1/2002 | Blumenstock et al. |
| 2002/0010866 A1 | 1/2002 | McCullough et al. |
| 2002/0016827 A1 | 2/2002 | McCabe et al. |
| 2002/0016851 A1 | 2/2002 | Border |
| 2002/0034173 A1 | 3/2002 | Border et al. |
| 2002/0035683 A1 | 3/2002 | Kaashoek et al. |
| 2002/0038373 A1 | 3/2002 | Border et al. |
| 2002/0042839 A1 | 4/2002 | Peiffer et al. |
| 2002/0049608 A1 | 4/2002 | Hartsell et al. |
| 2002/0052931 A1 | 5/2002 | Peiffer et al. |
| 2002/0054570 A1 | 5/2002 | Takeda |
| 2002/0059622 A1 | 5/2002 | Grove et al. |
| 2002/0065864 A1 | 5/2002 | Hartsell et al. |
| 2002/0071434 A1 | 6/2002 | Furukawa |
| 2002/0071436 A1 | 6/2002 | Border et al. |
| 2002/0071438 A1 | 6/2002 | Singh |
| 2002/0073167 A1 | 6/2002 | Powell et al. |

| | | |
|---|---|---|
| 2002/0080721 A1 | 6/2002 | Tobagi et al. |
| 2002/0080806 A1 | 6/2002 | Haggard Ljungqvist |
| 2002/0083205 A1 | 6/2002 | Leon et al. |
| 2002/0089930 A1 | 7/2002 | Aceves et al. |
| 2002/0089972 A1 | 7/2002 | Chang et al. |
| 2002/0089977 A1 | 7/2002 | Chang et al. |
| 2002/0090006 A1 | 7/2002 | Chang et al. |
| 2002/0091884 A1 | 7/2002 | Chang et al. |
| 2002/0095400 A1 | 7/2002 | Johnson et al. |
| 2002/0095511 A1 | 7/2002 | Walker |
| 2002/0097713 A1 | 7/2002 | Chang et al. |
| 2002/0098840 A1 | 7/2002 | Hanson et al. |
| 2002/0099851 A1 | 7/2002 | Shah et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0112152 A1 | 8/2002 | VanHeyningen et al. |
| 2002/0115407 A1 | 8/2002 | Thompson et al. |
| 2002/0116452 A1 | 8/2002 | Johnson et al. |
| 2002/0133596 A1 | 9/2002 | Border et al. |
| 2002/0138551 A1 | 9/2002 | Erickson |
| 2002/0138618 A1 | 9/2002 | Szabo |
| 2002/0141339 A1* | 10/2002 | Konuma ............... 370/229 |
| 2002/0141418 A1 | 10/2002 | Ben-Dor et al. |
| 2002/0147822 A1 | 10/2002 | Susai et al. |
| 2002/0150048 A1 | 10/2002 | Ha et al. |
| 2002/0150064 A1 | 10/2002 | Lucidarme |
| 2002/0186661 A1* | 12/2002 | Santiago et al. ............ 370/252 |
| 2002/0191600 A1 | 12/2002 | Shah et al. |
| 2002/0191612 A1 | 12/2002 | Curtis |
| 2003/0002484 A1 | 1/2003 | Freedman |
| 2003/0014623 A1 | 1/2003 | Freed et al. |
| 2003/0014625 A1 | 1/2003 | Freed et al. |
| 2003/0014628 A1 | 1/2003 | Freed et al. |
| 2003/0023746 A1 | 1/2003 | Loguinov |
| 2003/0026241 A1 | 2/2003 | Ono et al. |
| 2003/0033520 A1 | 2/2003 | Peiffer et al. |
| 2003/0035370 A1 | 2/2003 | Brustoloni et al. |
| 2003/0035413 A1 | 2/2003 | Herle et al. |
| 2003/0072271 A1 | 4/2003 | Simmons et al. |
| 2003/0086403 A1 | 5/2003 | Harris et al. |
| 2003/0093691 A1 | 5/2003 | Simon et al. |
| 2003/0103472 A1 | 6/2003 | Taylor et al. |
| 2003/0105977 A1 | 6/2003 | Brabson et al. |
| 2003/0112809 A1 | 6/2003 | Bharali et al. |
| 2003/0115331 A1 | 6/2003 | Xie et al. |
| 2003/0115338 A1 | 6/2003 | Jayam et al. |
| 2003/0117992 A1 | 6/2003 | Kim et al. |
| 2003/0119556 A1* | 6/2003 | Khan et al. ............... 455/560 |
| 2003/0120802 A1 | 6/2003 | Kohno |
| 2003/0120811 A1 | 6/2003 | Hanson et al. |
| 2003/0123394 A1 | 7/2003 | Neale et al. |
| 2003/0123481 A1 | 7/2003 | Neale et al. |
| 2003/0128704 A1 | 7/2003 | Mizrachi et al. |
| 2003/0131079 A1 | 7/2003 | Neale et al. |
| 2003/0131263 A1 | 7/2003 | Keane et al. |
| 2003/0143959 A1 | 7/2003 | Harris et al. |
| 2003/0149715 A1* | 8/2003 | Ruutu et al. ............... 709/100 |
| 2003/0187975 A1 | 10/2003 | Brown et al. |
| 2003/0188001 A1 | 10/2003 | Eisenberg et al. |
| 2003/0188195 A1* | 10/2003 | Abdo et al. ............... 713/201 |
| 2003/0191799 A1 | 10/2003 | Araujo et al. |
| 2003/0193893 A1 | 10/2003 | Wen et al. |
| 2003/0200284 A1 | 10/2003 | Philbrick et al. |
| 2003/0200290 A1 | 10/2003 | Zimmerman et al. |
| 2003/0202480 A1 | 10/2003 | Swami |
| 2003/0223361 A1 | 12/2003 | Hussain et al. |
| 2003/0226038 A1 | 12/2003 | Raanan et al. |
| 2003/0229718 A1 | 12/2003 | Tock et al. |
| 2003/0233581 A1 | 12/2003 | Reshef et al. |
| 2003/0235196 A1 | 12/2003 | Balachandran et al. |
| 2003/0236837 A1 | 12/2003 | Johnson et al. |
| 2003/0236887 A1 | 12/2003 | Kesselman et al. |
| 2003/0236919 A1 | 12/2003 | Johnson et al. |
| 2004/0001691 A1 | 1/2004 | Li et al. |
| 2004/0006643 A1 | 1/2004 | Dolson et al. |
| 2004/0008693 A1 | 1/2004 | Grove et al. |
| 2004/0015591 A1 | 1/2004 | Wang |
| 2004/0022263 A1 | 2/2004 | Zhao et al. |
| 2004/0030790 A1 | 2/2004 | Le et al. |
| 2004/0031058 A1 | 2/2004 | Reisman |
| 2004/0078465 A1 | 4/2004 | Coates et al. |
| 2004/0085902 A1 | 5/2004 | Miller et al. |
| 2004/0103438 A1 | 5/2004 | Yan et al. |
| 2004/0107360 A1 | 6/2004 | Herrmann et al. |
| 2004/0127131 A1 | 7/2004 | Potnis |
| 2004/0141525 A1 | 7/2004 | Bhushan et al. |
| 2004/0174886 A1 | 9/2004 | Packer |
| 2004/0196785 A1 | 10/2004 | Janakiraman et al. |
| 2004/0250124 A1 | 12/2004 | Chesla et al. |
| 2004/0258003 A1 | 12/2004 | Kokot et al. |
| 2004/0264377 A1 | 12/2004 | Kilkki et al. |
| 2004/0264433 A1 | 12/2004 | Melpignano |
| 2005/0013280 A1 | 1/2005 | Buddhikot et al. |
| 2005/0021864 A1 | 1/2005 | Sherman et al. |
| 2005/0022089 A1 | 1/2005 | Le et al. |
| 2005/0078171 A1 | 4/2005 | Firestone et al. |
| 2005/0080876 A1 | 4/2005 | Peiffer et al. |
| 2005/0089004 A1 | 4/2005 | Casaccia et al. |
| 2005/0089049 A1 | 4/2005 | Chang et al. |
| 2005/0097358 A1 | 5/2005 | Yanovsky |
| 2005/0111371 A1 | 5/2005 | Miura et al. |
| 2005/0135250 A1 | 6/2005 | Singh et al. |
| 2005/0135252 A1 | 6/2005 | Singh et al. |
| 2005/0141507 A1 | 6/2005 | Curtis |
| 2005/0144186 A1 | 6/2005 | Hesselink et al. |
| 2005/0149481 A1 | 7/2005 | Hesselink et al. |
| 2005/0180415 A1 | 8/2005 | Cheung et al. |
| 2005/0195835 A1 | 9/2005 | Savage et al. |
| 2005/0213586 A1 | 9/2005 | Cyganski et al. |
| 2005/0220086 A1 | 10/2005 | Dowling |
| 2005/0223114 A1 | 10/2005 | Hanson et al. |
| 2005/0223115 A1 | 10/2005 | Hanson et al. |
| 2005/0226150 A1 | 10/2005 | Santos et al. |
| 2005/0229237 A1 | 10/2005 | Xie et al. |
| 2005/0232161 A1 | 10/2005 | Maufer et al. |
| 2005/0265353 A1 | 12/2005 | Sengupta et al. |
| 2006/0039287 A1 | 2/2006 | Hasegawa et al. |
| 2006/0064716 A1 | 3/2006 | Sull et al. |
| 2006/0126616 A1 | 6/2006 | Bhatia |
| 2006/0206931 A1 | 9/2006 | Dillaway et al. |
| 2006/0215556 A1 | 9/2006 | Wu et al. |
| 2006/0215684 A1 | 9/2006 | Capone |
| 2006/0233178 A1 | 10/2006 | Lu et al. |
| 2007/0008883 A1 | 1/2007 | Kobayashi |
| 2007/0060152 A1 | 3/2007 | Sakamoto |
| 2007/0106681 A1 | 5/2007 | Haot et al. |
| 2007/0160063 A1 | 7/2007 | Mynam et al. |
| 2007/0245203 A1 | 10/2007 | Cho et al. |
| 2008/0151917 A1 | 6/2008 | Bartlett et al. |
| 2009/0185485 A1 | 7/2009 | Swami |

OTHER PUBLICATIONS

Fendick et al., ACM SIGCOMM Computer Communication Review, vol. 22, Issue 4, pp. 136-148, Oct. 1992.

Mathis et al., RFC 2018—TCP Selective Acknowledgement Options, Oct. 1996, http://www.faqs.org/rfcs/rfc2018.html.

Santos J. et al., Increasing Effective Link Bandwidth by Suppressing Replicated Data, Proceedings of the Annual Technical Conference on USENIX, pp. 213-224, Jun. 1998.

Kalampoukas et al., Improving {TCP} Throughput over Two-Way Asymmetric Links: Analysis and Solutions, In Proc. of Sigmetrics, pp. 78-89, 1998.

Jing J. et al., Client Server Computing in Mobile Environments, ACM Computing Surveys, vol. 31, No. 2, pp. 117-157 Jun. 1999.

Samaraweera, Return link optimization for internet service provision using DVB-S networks, ACM SIGCOMM Computer Communication Review, vol. 29, Issue 3, pp. 4-13, Jul. 1999.

Border, J. et al.. 'PILC: Performance Enhancing Prodes (PEPS). 46th IETF, Nov. 10, 1999, pp. 1-17.

Spring N. et al., A Protocol Independent Technique for Eliminating Redundant Network Traffic, Proceedings of SIGCOMM 2000, Aug. 2000.

RFC 3135—Performance Enhancing Proxies Intended to Mitigate Link-Related Degradations, available online at: http://www.faqs.org/rfcs/rfc3135.html.

Dutta D. et al., An Active Proxy Based Architecture for TCP in Heterogeneous Variable Bandwidth Networks, Proceedings of IEEE Globecom 2001, vol. 4, p. 2316-2320, Nov. 2001.

Ishac J. et al., Proceedings of IEEE MILCOMM 2001, vol. 1, pp. 700-704, 2001.

RFC 3040—Internet Web Replication and Caching Taxonomy, Jan. 2001.

Ehsan, N. et al., Evaluation of Performance Enhancing Proxies in Internet Over Satellite, International Journal of Communication Systems, Sep. 17, 2002. 22 pages.

Davison, B. et al., 'A Split Stack Approach to Mobility Providing Performance-Enhancing Proxies,' Lehigh University, Nov. 2002, pp. 1-13. Bethlehem, PA.

Vangala, S. et al., Performance of TCP Over Wireless Networks With the Snoop Protocol, University of South Florida, Tampa. FL. 2 pages.

Feighery P., Frequently Asked Questions (FAQ) for Performance Enhancing Proxies (PEPS). Hints on How to Configure PEPs, Online document, Jun. 27, 2005.

International Preliminary Report on Patentability Written Opinion and International Search Report, PCT/US2004/024655, 7 pages.

Non-Final Office Action, USPTO, U.S. Appl. No. 10/901,952, Sep. 14, 2007.

Non-Final Office Action, USPTO, U.S. Appl. No. 10/696,507, Nov. 14, 2007.

Non-Final Office Action, USPTO, U.S. Appl. No. 10/902,491, Dec. 28, 2007.

Non-Final Office Action, USPTO, U.S. Appl. No. 10/902,493, Jan. 7, 2008.

Non-Final Office Action. USPTO, U.S. Appl. No. 10/901,940, Feb. 20, 2008. 12 pages.

Non Final Office Action. USPTO, U.S. Appl. No. 10/902,509, Mar. 18, 2008. 14 pages.

Non Final Office Action, USPTO, U.S. Appl. No. 10/901,691, Mar. 20, 2008. 15 pages.

Non Final Office Action. UPSTO, U.S. Appl. No. 10/696,507, Apr. 1, 2008. 17 pages.

Final Office Action, USPTO, U.S. Appl. No. 10/901,952, Apr. 24, 2008. 9 pages.

Final Office Action. USPTO U.S. Appl. No. 10/902,491. Dated Jul. 22, 2008.

International Search Report PCT/US04/24655.

Office Action, USPTO, U.S. Appl. No. 10/902,491, mailed on Jul. 22, 2008.

Office Action, USPTO, U.S. Appl. No. 10/902,509, mailed on Aug. 13, 2008.

Office Action, USPTO, U.S. Appl. No. 10/901,691, mailed on Sep. 29, 2008.

Office Action, USPTO, U.S. Appl. No. 10/696,507, mailed on Nov. 13, 2008.

Office Action, USPTO, U.S. Appl. No. 10/902,509, mailed on Nov. 18, 2008.

Office Action, USPTO, U.S. Appl. No. 10/902,491, mailed on Jan. 5, 2009.

Office Action, USPTO, U.S. Appl. No. 10/902,493, mailed on Jan. 21, 2009.

International Search Report for PCT/US2008/056684, mailed on Jan. 28, 2009.

Office Action, USPTO, U.S. Appl. No. 10/901,691, mailed on Feb. 27, 2009.

Office Action, USPTO, U.S. Appl. No. 10/901,952, mailed on Mar. 16, 2009.

Office Action, USPTO, U.S. Appl. No. 10/901,940, mailed on Aug. 5, 2008.

Office Action, USPTO, U.S. Appl. No. 10/901,940, mailed on Jan. 8, 2009.

Office Action, USPTO, U.S. Appl. No. 10/901,940, Aug. 18, 2009.

Australian Examination Report on 2008225072 dated Nov. 17, 2011.

Border. J. et al.. Performance Enhancing Proxies Intended to Mitigate Link Related Degradations. PILC—Perfomance Enhancing Proxies. Jun. 2001, pp. 1-45, RFC 3135.

Chinese Office Action on 200880015762.1 dated Aug. 4, 2011.

Cooper et al. "Web Proxy Auto-Discovery Protocol", Nov. 15, 2000, pp. 1-24.

EPO Communication under Rule 71(3) EPC on 08732021.4 dated Dec. 19, 2011.

European Examination Report on 08732021.4 dated Jul. 13, 2011.

European Examination Report on 08732021.4 dated Sep. 3, 2010.

IETF, Transmission Control Protocol, Darpa Internet Program Protocol Specification, Sep. 1, 1981.

International Preliminary Report on Patentability, PCT/US2004/024655, Feb. 9, 2006, 7 pages.

International Search Report for PCT/US08/56528 mailed Oct. 10, 2008.

International Search Report for PCT/US2008/051993, mailed on Oct. 1, 2008.

Jacobson et. al., "TCP Extensions for High Performance", May 1, 1992.

Mathis et al., TCP Selective Acknowledgement Options, Oct. 1996, Network Working Group, RFC 2018.

Mogul, Jeffrey and Deering, Steve, "Path MTU Discovery", RFC 1191, Nov. 1990.

Non-Final Office Action, USPTO, U.S. Appl. No. 10/696,507, Apr. 13, 2007.

Notice of Allowance for U.S. Appl. No. 12/429,774 dated Feb. 18, 2011.

Notice of Allowance on U.S. Appl. No. 10/901,691 dated Feb. 15, 2012.

Notice of Allowance on U.S. Appl. No. 10/901,940 dated Mar. 29, 2012.

Notice of Allowance on U.S. Appl. No. 11/301,825 dated Aug. 15, 2011.

Notice of Allowance on U.S. Appl. No. 11/685,183 dated Apr. 9, 2012.

Notice of Allowance on U.S. Appl. No. 12/567,402 dated Apr. 27, 2012.

Office Action for U.S. Appl. No. 11/301,825 dated Aug. 26, 2008.

Office Action on U.S. Appl. No. 10/901,691 dated Oct. 28, 2010.

Office Action on U.S. Appl. No. 10/901,940 dated Jan. 25, 2011.

Office Action on U.S. Appl. No. 10/901,940 dated Sep. 3, 2010.

Office Action on U.S. Appl. No. 10/901,691 dated Sep. 13, 2011.

Office Action on U.S. Appl. No. 10/901,940 dated Jul. 20, 2011.

Office Action on U.S. Appl. No. 11/301,825 dated Feb. 28, 2011.

Office Action on U.S. Appl. No. 11/685,181 dated Dec. 10, 2010.

Office Action on U.S. Appl. No. 11/685,181 dated Feb. 29, 2012.

Office Action on U.S. Appl. No. 11/685,181 dated Sep. 17, 2010.

Office Action on U.S. Appl. No. 11/685,183 dated Nov. 19, 2010.

Office Action on U.S. Appl. No. 11/685,181 dated May 23, 2011.

Office Action on U.S. Appl. No. 11/685,183 dated Oct. 20, 2011.

Office Action on U.S. Appl. No. 11/685,183 dated Apr. 26, 2011.

Office Action on U.S. Appl. No. 12/567,402 dated Jan. 12, 2012.

Office Action on U.S. Appl. No. 12/607,365 dated Mar. 19, 2012.

Office Action on U.S. Appl. No. 12/634,496 dated Oct. 4, 2010.

Office Action on U.S. Appl. No. 12/634,496 dated Mar. 9, 2011.

Office Action, USPTO, U.S. Appl. No. 10/901,952, mailed on Oct. 16, 2008.

Office Action, USPTO, U.S. Appl. No. 10/902,493, Aug. 20, 2008.

Office Action, USPTO, U.S. Appl. No. 10/902,509, Nov. 18, 2008.

Office Action, USPTO, U.S. Appl. No. 11/658,183 May 26, 2009.

Restriction Requirement on U.S. Appl. No. 12/567,402 dated Oct. 27, 2011.

Spatcheck, O. et al., "Optimizing TCP Forwarder Performance", IEEE/ACM Transactions on Networking, Apr. 1, 2000.

Written Opinion for PCT/US08/56528 mailed Oct. 10, 2008.

Written Opinion of the ISA for PCT/US04/24655, mailed on Jun. 21, 2005.

Written Opinion of the ISA for PCT/US2008/051993, mailed on Oct. 1, 2008.

Yamanegi K. et al., "Implementation Experiments of the TCP Proxy Mechanism", Nov. 9, 2005.
Chinese Office Action on 200880015762.1 dated Jul. 2, 2012.
Notice of Allowance on U.S. Appl. No. 12/634,496 dated Jul. 12, 2012.

Office Action on U.S. Appl. No. 11/685,181 dated Aug. 6, 2012.
Office Action on U.S. Appl. No. 12/607,365 dated Jul. 11, 2012.
Office Action on U.S. Appl. No. 12/784,863 dated Aug. 29, 2012.

* cited by examiner

Sample TCP packet

SYSTEMS AND METHODS FOR STOCHASTIC-BASED QUALITY OF SERVICE

RELATED APPLICATIONS

The present application is a continuation-in-part of U.S. patent application Ser. No. 10/901,940 filed on Jul. 28, 2004, which is itself a continuation-in-part of U.S. patent application Ser. No. 10/696,507, filed on Oct. 29, 2003, now U.S. Pat. No. 7,542,471, issued Jun. 9, 2009, which is a nonprovisional application corresponding to the U.S. Provisional Application 60/490,694 filed on Jul. 29, 2003.

FIELD OF THE INVENTION

The present invention generally relates to data communication networks. In particular, the present invention relates to systems and methods for dynamically controlling bandwidth by a proxy of one or more connections.

BACKGROUND OF THE INVENTION

Different types of network traffic have different sensitivity to network performance. With regard to latency, large file transfers may be relatively unaffected by moderate increases in the latency of a connection. By contrast, interactive traffic, such as VoIP, remote procedure calls, media streaming, application streaming, and remote application execution, may be dramatically affected by changes in latency which lead to slower application response times.

Existing quality of service (QoS) systems may attempt to prioritize interactive traffic to reduce latency, but may face several difficulties. First, bandwidth-allocation methods of QoS may ensure that a certain amount of interactive traffic has the bandwidth to pass through a network, but the bandwidth allocation may have no guarantee of latency. Second, interactive traffic may be difficult to identify. Many ports and applications carry a mix of interactive, streaming, and bulk traffic. Thus, simply prioritizing packets based on a port or underlying application may not properly identify latency sensitive traffic. There exists a need for methods of identifying and prioritizing network traffic based on the latency sensitivity of the traffic.

An additional potential cause of latency with respect to interactive or streaming traffic is dropped packets. Dropped packets can impose additional costs on traffic containing, such as interactive or streaming traffic, which may contain significant gaps between transmitted packets. Where these gaps occur, a receiver may not be able to identify if a packet immediately preceding the gap was lost since there are no subsequent packets to inform the receiver that the last packet existed. Many protocols, such as TCP, may use a retransmission timeout (RTO) to discover and correct cases such as this where the last packet of a group has been dropped. However, RTOs may provide only coarse control over delays induced by packet losses. In some protocols, RTOs can be very expensive, such as TCP, where the RTO is by default a full second. There exists a need for methods of avoiding these retransmission timeouts to improve connection performance.

Further, in many protocols, including, for example, TCP, use retransmissions as one means for providing a reliable data stream. In addition to standard retransmission delays, extra delays may be incurred when a retransmitted packet is also dropped. In some cases, the dropping of a retransmitted packet may cause a delay equal to a full round trip time. This delay may have severe effects on time-sensitive network traffic. Thus, there exists a need for systems and methods for mitigating or avoiding the delay caused by dropped retransmissions.

BRIEF SUMMARY OF THE INVENTION

The present invention is directed towards systems and methods for utilizing transaction boundary detection methods in queuing and retransmission decisions relating to network traffic. By detecting transaction boundaries and sizes, a client, server, or intermediary device may prioritize based on transaction sizes in queuing decisions, giving precedence to smaller transactions which may represent interactive and/or latency-sensitive traffic. Further, after detecting a transaction boundary, a device may retransmit one or more additional packets prompting acknowledgements, in order to ensure timely notification if the last packet of the transaction has been dropped. The present invention is also directed to other retransmission systems and methods for potentially improving network latency, including retransmitting a dropped packet twice or more in order to avoid incurring additional delays due to a retransmitted packet being lost.

In a first aspect, the present invention relates to methods for prioritizing, based on transaction size, packets awaiting transmission from an intermediary. In one embodiment, a method comprises: receiving, by an intermediary, a first packet and a second packet. The intermediary may then determine a first transaction size corresponding to the first packet or an average transaction size corresponding to a connection from which the first packet was received. The intermediary, may assign a first transmission priority to the first packet, the transmission priority determined responsive to the determined first transaction size. The intermediary may then transmit the first packet and the second packet, wherein the transmission order is determined according to the first assigned transmission priority.

In a second aspect, the present invention relates to systems for prioritizing, based on transaction size, packets awaiting transmission from an intermediary device. In one embodiment, a system comprises: a packet processor receiving a first packet and a second packet; and a flow controller determining a first transaction size associated with the first packet; assigning to the first packet a transmission priority responsive to the determined first transaction size; and transmitting, the first packet and the second packet according to the assigned transmission priority.

In a third aspect, the present invention relates to methods for reducing transmission timeouts by selectively transmitting additional packets from an intermediary device based on identifying transaction boundaries. In one embodiment, the method comprises: receiving, by a device via a transport layer connection between a sender and a receiver, a first packet from the sender via the first transport layer connection; transmitting, by the device, the first packet to the receiver; determining, by the device, that the first packet is smaller than a maximum packet size of the transport layer connection; generating, by the device in response to the determination, at least one additional packet; and transmitting, by the device after the first packet has been transmitted to the receiver, the at least one additional packet to the receiver via the transport layer connection.

In a fourth aspect, the present invention relates to systems for reducing transmission timeouts by selectively transmitting additional packets from an intermediary device based on identifying transaction boundaries. In one embodiment, a system comprises: a device which serves as an intermediary for a transport layer connection between a sender and a receiver, the device comprising: a packet processor which receives a first packet from the sender via the first transport layer connection; and transmits the first packet to the receiver; and a flow controller which determines that the first packet is smaller than a maximum packet size of the transport layer connection, in response to the determination, at least one additional packet; and transmits, after the first packet has been transmitted to the receiver, the at least one additional packet to the receiver via the transport layer connection.

In a fifth aspect, the present invention relates to methods for retransmitting network packets between a sender and a receiver to reduce transmission errors associated with a transport layer connection. In one embodiment, a method comprises: receiving, by a device, an indication that a network packet transmitted via a transport layer connection was not received by the receiver; retransmitting, by the device, the network packet to the receiver in response to the indication; determining, by the device, a packet loss rate associated with the transport layer connection; determining, by the device in response to the determined packet loss rate, a number of additional retransmissions; and retransmitting, by the device, the network packet in accordance with the determined number of additional retransmissions.

In a sixth aspect, the present invention relates to systems for retransmitting network packets between a sender and a receiver to reduce transmission errors associated with a transport layer connection. In one embodiment, a system comprises: a packet processor which receives an indication that a network packet transmitted via a transport layer connection was not received by the receiver; and retransmits the network packet to the receiver in response to the indication; and a flow controller in communication with the packet processor which determines a packet loss rate associated with the transport layer connection; determines, in response to the determined packet loss rate, a number of additional retransmissions; and retransmits the network packet in accordance with the determined number of additional retransmissions.

The details of various embodiments of the invention are set forth in the accompanying drawings and the description below.

BRIEF DESCRIPTION OF THE DRAWINGS

The foregoing and other objects, aspects, features, and advantages of the invention will become more apparent and better understood by referring to the following description taken in conjunction with the accompanying drawings, in which:

FIG. 4 illustrates a sample TCP packet;

DETAILED DESCRIPTION OF THE INVENTION

Figure 1A:
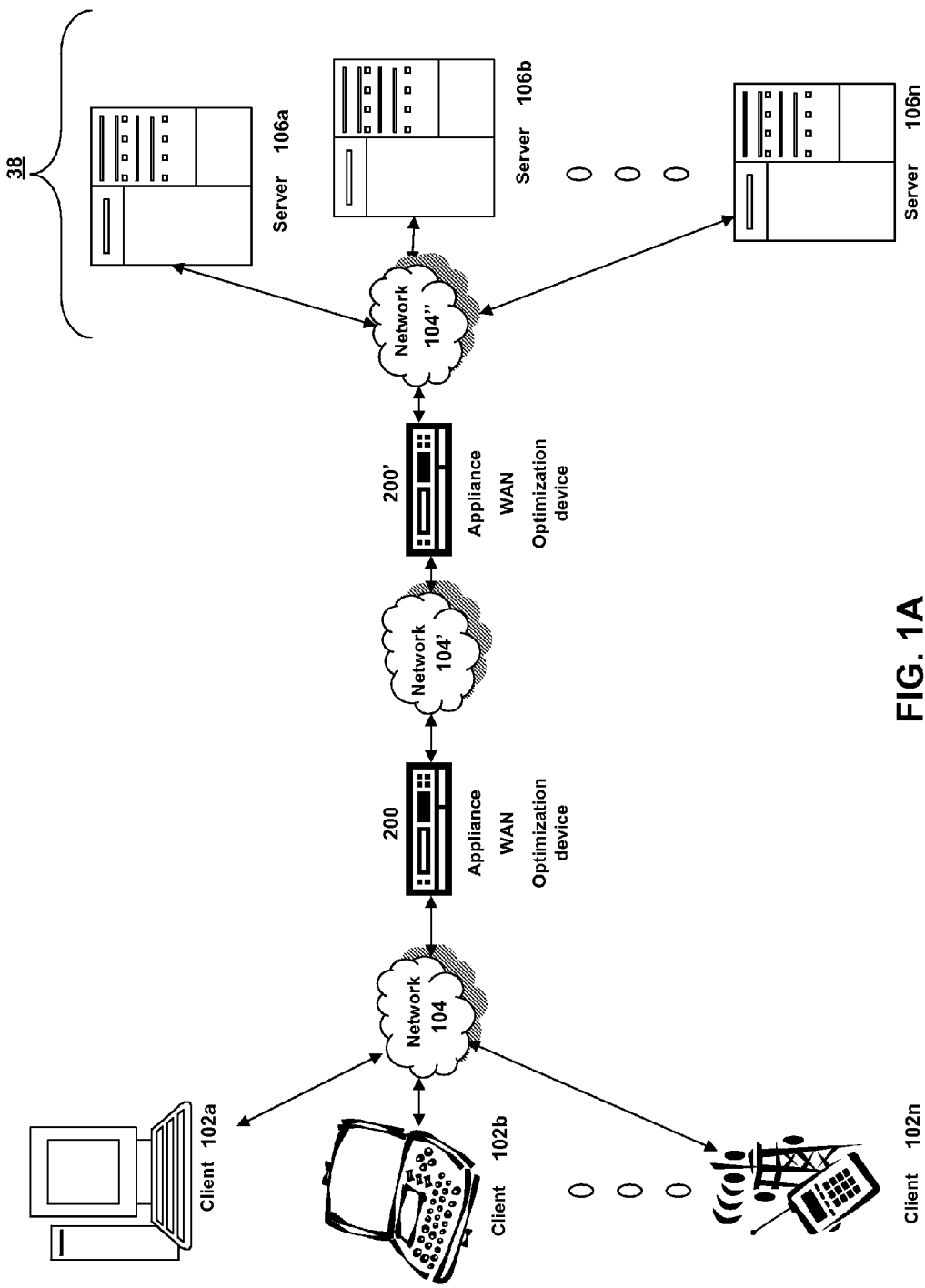
FIG. 1A is a block diagram of an embodiment of a network environment for a client to access a server via one or more network optimization appliances.

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for using transaction boundaries to determine transmission priorities; and Section E describes embodiments of systems and methods for reducing timeout penalties and costs associated with network connections A. Network and Computing Environment Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment has one or more clients 102a-102n (also generally referred to as local machine(s) 102, or client(s) 102) in communication with one or more servers 106a-106n (also generally referred to as server(s) 106, or remote machine(s) 106) via one or more networks 104, 104', 104". In some embodiments, a client 102 communicates with a server 106 via one or more network optimization appliances 200, 200' (generally referred to as appliance 200). In one embodiment, the network optimization appliance 200 is designed, configured or adapted to optimize Wide Area Network (WAN) network traffic. In some embodiments, a first appliance 200 works in conjunction or cooperation with a second appliance 200' to optimize network traffic. For example, a first appliance 200 may be located between a branch office and a WAN connection while the second appliance 200' is located between the WAN and a corporate Local Area Network (LAN). The appliances 200 and 200' may work together to optimize the WAN related network traffic between a client in the branch office and a server on the corporate LAN.

Although FIG. 1A shows a network 104, network 104' and network 104" (generally referred to as network(s) 104) between the clients 102 and the servers 106, the clients 102 and the servers 106 may be on the same network 104. The networks 104, 104', 104" can be the same type of network or different types of networks. The network 104 can be a local-area network (LAN), such as a company Intranet, a metropolitan area network (MAN), or a wide area network (WAN), such as the Internet or the World Wide Web. The networks 104, 104', 104" can be a private or public network. In one embodiment, network 104' or network 104" may be a private network and network 104 may be a public network. In some embodiments, network 104 may be a private network and network 104' and/or network 104" a public network. In another embodiment, networks 104, 104', 104" may be private networks. In some embodiments, clients 102 may be located at a branch office of a corporate enterprise communicating via a WAN connection over the network 104 to the servers 106 located on a corporate LAN in a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As depicted in FIG. 1A, a first network optimization appliance 200 is shown between networks 104 and 104' and a second network optimization appliance 200' is also between networks 104' and 104". In some embodiments, the appliance 200 may be located on network 104. For example, a corporate enterprise may deploy an appliance 200 at the branch office. In other embodiments, the appliance 200 may be located on network 104'. In some embodiments, the appliance 200' may be located on network 104' or network 104". For example, an appliance 200 may be located at a corporate data center. In one embodiment, the appliance 200 and 200' are on the same network. In another embodiment, the appliance 200 and 200' are on different networks.

In one embodiment, the appliance 200 is a device for accelerating, optimizing or otherwise improving the performance, operation, or quality of service of any type and form of network traffic. In some embodiments, the appliance 200 is a performance enhancing proxy. In other embodiments, the appliance 200 is any type and form of WAN optimization or acceleration device, sometimes also referred to as a WAN optimization controller. In one embodiment, the appliance 200 is any of the product embodiments referred to as WAN-Scaler manufactured by Citrix Systems, Inc. of Ft. Lauderdale, Fla. In other embodiments, the appliance 200 includes any of the product embodiments referred to as BIG-IP link controller and WANjet manufactured by F5 Networks, Inc. of Seattle, Wash. In another embodiment, the appliance 200 includes any of the WX and WXC WAN acceleration device platforms manufactured by Juniper Networks, Inc. of Sunnyvale, Calif. In some embodiments, the appliance 200 includes any of the steelhead line of WAN optimization appliances manufactured by Riverbed Technology of San Francisco, Calif. In other embodiments, the appliance 200 includes any of the WAN related devices manufactured by Expand Networks Inc. of Roseland, N.J. In one embodiment, the appliance 200 includes any of the WAN related appliances manufactured by Packeteer Inc. of Cupertino, Calif., such as the PacketShaper, iShared, and SkyX product embodiments provided by Packeteer. In yet another embodiment, the appliance 200 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 200 provides application and data acceleration services for branch-office or remote offices. In one embodiment, the appliance 200 includes optimization of Wide Area File Services (WAFS). In another embodiment, the appliance 200 accelerates the delivery of files, such as via the Common Internet File System (CIFS) protocol. In other embodiments, the appliance 200 provides caching in memory and/or storage to accelerate delivery of applications and data. In one embodiment, the appliance 205 provides compression of network traffic at any level of the network stack or at any protocol or network layer. In another embodiment, the appliance 200 provides transport layer protocol optimizations, flow control, performance enhancements or modifications and/or management to accelerate delivery of applications and data over a WAN connection. For example, in one embodiment, the appliance 200 provides Transport Control Protocol (TCP) optimizations. In other embodiments, the appliance 200 provides optimizations, flow control, performance enhancements or modifications and/or management for any session or application layer protocol. Further details of the optimization techniques, operations and architecture of the appliance 200 are discussed below in Section B.

Still referring to FIG. 1A, the network environment may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be file servers, application servers, web servers, proxy servers, and/or gateway servers. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, a server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Deployed with Other Appliances.

Figure 1B:
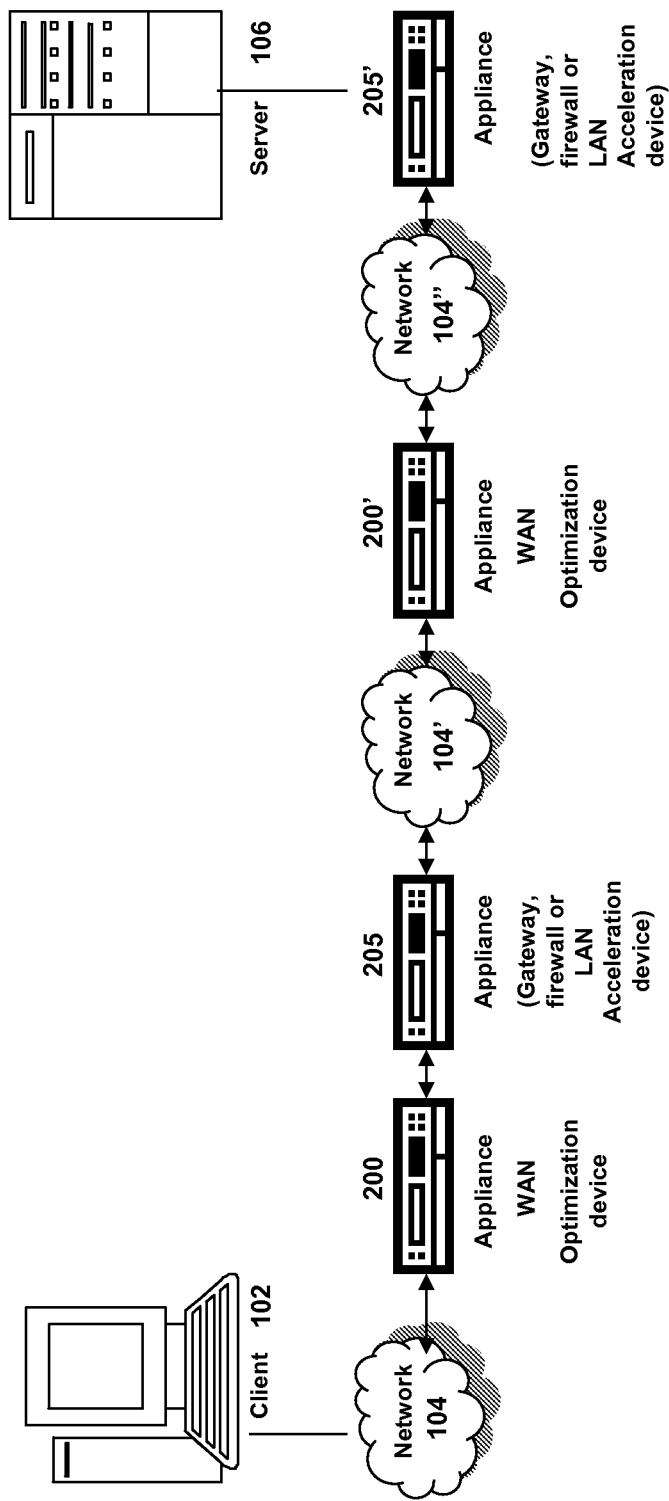
FIG. 1B is a block diagram of another embodiment of a network environment for a client to access a server via one or more network optimization appliances in conjunction with other network appliances.

Referring now to FIG. 1B, another embodiment of a network environment is depicted in which the network optimization appliance 200 is deployed with one or more other appliances 205, 205' (generally referred to as appliance 205 or second appliance 205) such as a gateway, firewall or acceleration appliance. For example, in one embodiment, the appliance 205 is a firewall or security appliance while appliance 205' is a LAN acceleration device. In some embodiments, a client 102 may communicate to a server 106 via one or more of the first appliances 200 and one or more second appliances 205.

One or more appliances 200 and 205 may be located at any point in the network or network communications path between a client 102 and a server 106. In some embodiments, a second appliance 205 may be located on the same network 104 as the first appliance 200. In other embodiments, the second appliance 205 may be located on a different network 104 as the first appliance 200. In yet another embodiment, a first appliance 200 and second appliance 205 is on the same network, for example network 104, while the first appliance 200' and second appliance 205' is on the same network, such as network 104".

In one embodiment, the second appliance 205 includes any type and form of transport control protocol or transport later terminating device, such as a gateway or firewall device. In one embodiment, the appliance 205 terminates the transport control protocol by establishing a first transport control protocol connection with the client and a second transport control connection with the second appliance or server. In another embodiment, the appliance 205 terminates the transport control protocol by changing, managing or controlling the behavior of the transport control protocol connection between the client and the server or second appliance. For example, the appliance 205 may change, queue, forward or transmit network packets in manner to effectively terminate the transport control protocol connection or to act or simulate as terminating the connection.

In some embodiments, the second appliance 205 is a performance enhancing proxy. In one embodiment, the appliance 205 provides a virtual private network (VPN) connection. In some embodiments, the appliance 205 provides a Secure Socket Layer VPN (SSL VPN) connection. In other embodiments, the appliance 205 provides an IPsec (Internet Protocol Security) based VPN connection. In some embodiments, the appliance 205 provides any one or more of the following functionality: compression, acceleration, load-balancing, switching/routing, caching, and Transport Control Protocol (TCP) acceleration.

In one embodiment, the appliance 205 is any of the product embodiments referred to as Access Gateway, Application Firewall, Application Gateway, or NetScaler manufactured by Citrix Systems, Inc. of Ft. Lauderdale, Fla. As such, in some embodiments, the appliance 205 includes any logic, functions, rules, or operations to perform services or functionality such as SSL VPN connectivity, SSL offloading, switching/load balancing, Domain Name Service resolution, LAN acceleration and an application firewall.

In some embodiments, the appliance 205 provides a SSL VPN connection between a client 102 and a server 106. For example, a client 102 on a first network 104 requests to establish a connection to a server 106 on a second network 104'. In some embodiments, the second network 104" is not routable from the first network 104. In other embodiments, the client 102 is on a public network 104 and the server 106 is on a private network 104', such as a corporate network. In one embodiment, a client agent intercepts communications of the client 102 on the first network 104, encrypts the communications, and transmits the communications via a first transport layer connection to the appliance 205. The appliance 205 associates the first transport layer connection on the first network 104 to a second transport layer connection to the server 106 on the second network 104. The appliance 205 receives the intercepted communication from the client agent, decrypts the communications, and transmits the communication to the server 106 on the second network 104 via the second transport layer connection. The second transport layer connection may be a pooled transport layer connection. In one embodiment, the appliance 205 provides an end-to-end secure transport layer connection for the client 102 between the two networks 104, 104'

In one embodiment, the appliance 205 hosts an intranet internet protocol or intranetIP address of the client 102 on the virtual private network 104. The client 102 has a local network identifier, such as an internet protocol (IP) address and/or host name on the first network 104. When connected to the second network 104' via the appliance 205, the appliance 205 establishes, assigns or otherwise provides an IntranetIP, which is a network identifier, such as IP address and/or host name, for the client 102 on the second network 104'. The appliance 205 listens for and receives on the second or private network 104' for any communications directed towards the client 102 using the client's established IntranetIP. In one embodiment, the appliance 205 acts as or on behalf of the client 102 on the second private network 104.

In some embodiment, the appliance 205 has an encryption engine providing logic, business rules, functions or operations for handling the processing of any security related protocol, such as SSL or TLS, or any function related thereto. For example, the encryption engine encrypts and decrypts network packets, or any portion thereof, communicated via the appliance 205. The encryption engine may also setup or establish SSL or TLS connections on behalf of the client 102*a*-102*n*, server 106*a*-106*n*, or appliance 200, 205. As such, the encryption engine provides offloading and acceleration of SSL processing. In one embodiment, the encryption engine uses a tunneling protocol to provide a virtual private network between a client 102*a*-102*n* and a server 106*a*-106*n*. In some embodiments, the encryption engine uses an encryption processor. In other embodiments, the encryption engine includes executable instructions running on an encryption processor.

In some embodiments, the appliance 205 provides one or more of the following acceleration techniques to communications between the client 102 and server 106: 1) compression, 2) decompression, 3) Transmission Control Protocol pooling, 4) Transmission Control Protocol multiplexing, 5) Transmission Control Protocol buffering, and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 205 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 205, and the destination network address is changed to that of the intended server. In the case of an outbound packet (that is, one received from a server 106), the source network address is changed from that of the server 106 to that of an output port of appliance 205 and the destination address is changed from that of appliance 205 to that of the requesting client 102. The sequence numbers and acknowledgment numbers of the packet are also translated to sequence numbers and acknowledgement expected by the client 102 on the appliance's 205 transport layer connection to the client 102. In some embodiments, the packet checksum of the transport layer protocol is recalculated to account for these translations.

In another embodiment, the appliance 205 provides switching or load-balancing functionality for communications between the client 102 and server 106. In some embodiments, the appliance 205 distributes traffic and directs client requests to a server 106 based on layer 4 payload or application-layer request data. In one embodiment, although the network layer or layer 2 of the network packet identifies a destination server 106, the appliance 205 determines the server 106 to distribute the network packet by application information and data carried as payload of the transport layer packet. In one embodiment, a health monitoring program of the appliance 205 monitors the health of servers to determine the server 106 for which to distribute a client's request. In some embodiments, if the appliance 205 detects a server 106 is not available or has a load over a predetermined threshold, the appliance 205 can direct or distribute client requests to another server 106.

In some embodiments, the appliance 205 acts as a Domain Name Service (DNS) resolver or otherwise provides resolution of a DNS request from clients 102. In some embodiments, the appliance intercepts' a DNS request transmitted by the client 102. In one embodiment, the appliance 205 responds to a client's DNS request with an IP address of or hosted by the appliance 205. In this embodiment, the client 102 transmits network communication for the domain name to the appliance 200. In another embodiment, the appliance 200 responds to a client's DNS request with an IP address of or hosted by a second appliance 200'. In some embodiments, the appliance 205 responds to a client's DNS request with an IP address of a server 106 determined by the appliance 200.

In yet another embodiment, the appliance 205 provides application firewall functionality for communications between the client 102 and server 106. In one embodiment, a policy engine 295' provides rules for detecting and blocking illegitimate requests. In some embodiments, the application firewall protects against denial of service (DoS) attacks. In other embodiments, the appliance inspects the content of intercepted requests to identify and block application-based attacks. In some embodiments, the rules/policy engine includes one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall of the appliance provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall of the appliance 205 ensures cookies are not modified. In other embodiments, the appliance 205 protects against forceful browsing by enforcing legal URLs.

In still yet other embodiments, the application firewall appliance 205 protects any confidential information contained in the network communication. The appliance 205 may inspect or analyze any network communication in accordance with the rules or polices of the policy engine to identify any confidential information in any field of the network packet. In some embodiments, the application firewall identifies in the network communication one or more occurrences of a credit card number, password, social security number, name, patient code, contact information, and age. The encoded portion of the network communication may include these occurrences or the confidential information. Based on these occurrences, in one embodiment, the application firewall may take a policy action on the network communication, such as prevent transmission of the network communication. In another embodiment, the application firewall may rewrite, remove or otherwise mask such identified occurrence or confidential information.

Although generally referred to as a network optimization or first appliance 200 and a second appliance 205, the first appliance 200 and second appliance 205 may be the same type and form of appliance. In one embodiment, the second appliance 205 may perform the same functionality, or portion thereof, as the first appliance 200, and vice-versa. For example, the first appliance 200 and second appliance 205 may both provide acceleration techniques. In one embodiment, the first appliance may perform LAN acceleration while the second appliance performs WAN acceleration, or vice-versa. In another example, the first appliance 200 may also be a transport control protocol terminating device as with the second appliance 205. Furthermore, although appliances 200 and 205 are shown as separate devices on the network, the appliance 200 and/or 205 could be a part of any client 102 or server 106.

Figure 1C:
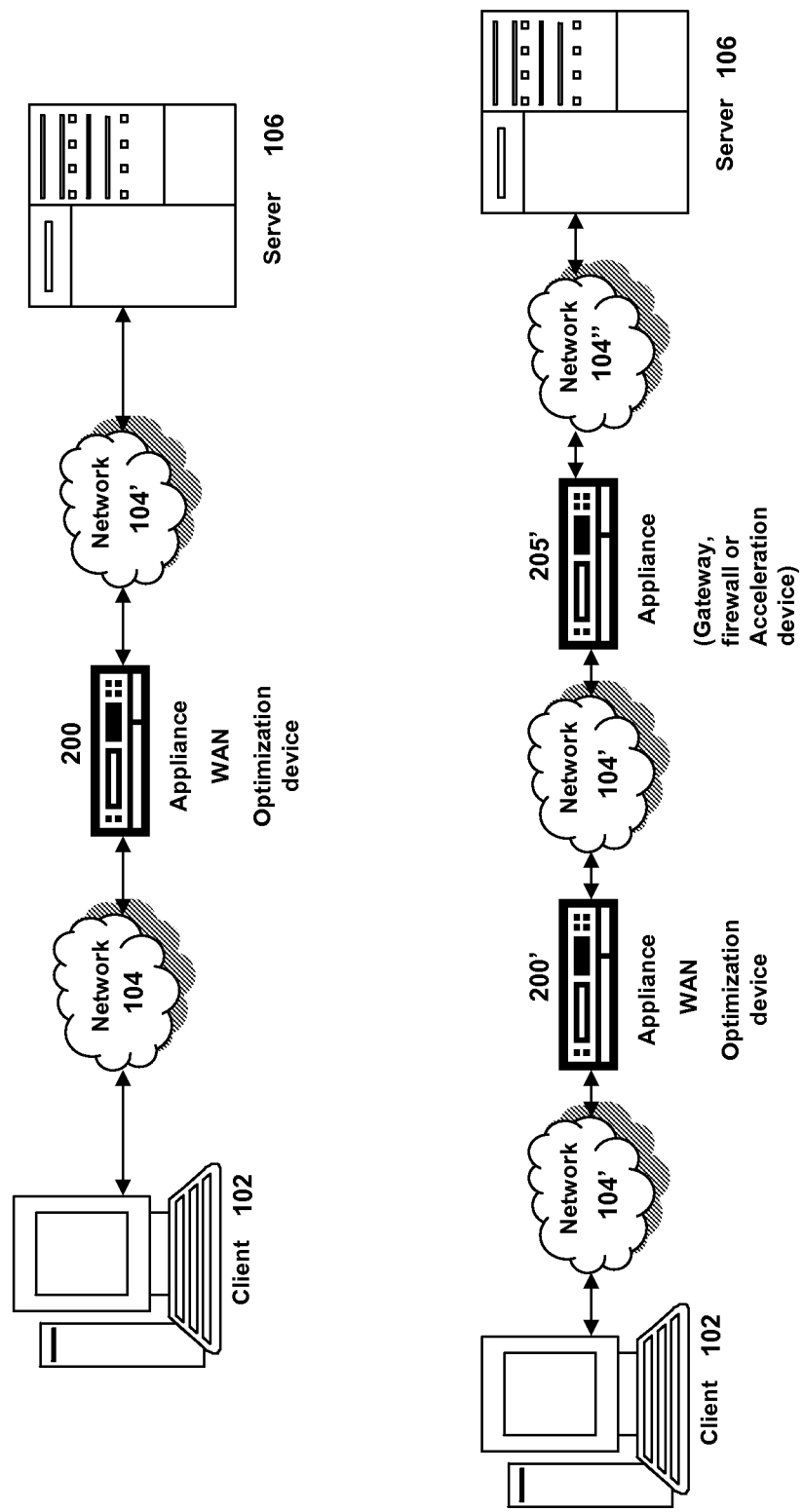
FIG. 1C is a block diagram of another embodiment of a network environment for a client to access a server via a single network optimization appliance deployed stand-alone or in conjunction with other network appliances.

Referring now to FIG. 1C, other embodiments of a network environment for deploying the appliance 200 are depicted. In another embodiment as depicted on the top of FIG. 1C, the appliance 200 may be deployed as a single appliance or single proxy on the network 104. For example, the appliance 200 may be designed, constructed or adapted to perform WAN optimization techniques discussed herein without a second cooperating appliance 200'. In other embodiments as depicted on the bottom of FIG. 1C, a single appliance 200 may be deployed with one or more second appliances 205. For example, a WAN acceleration first appliance 200, such as a Citrix WANScaler appliance, may be deployed with a LAN accelerating or Application Firewall second appliance 205, such as a Citrix NetScaler appliance.

Computing Device

Figure 1D:
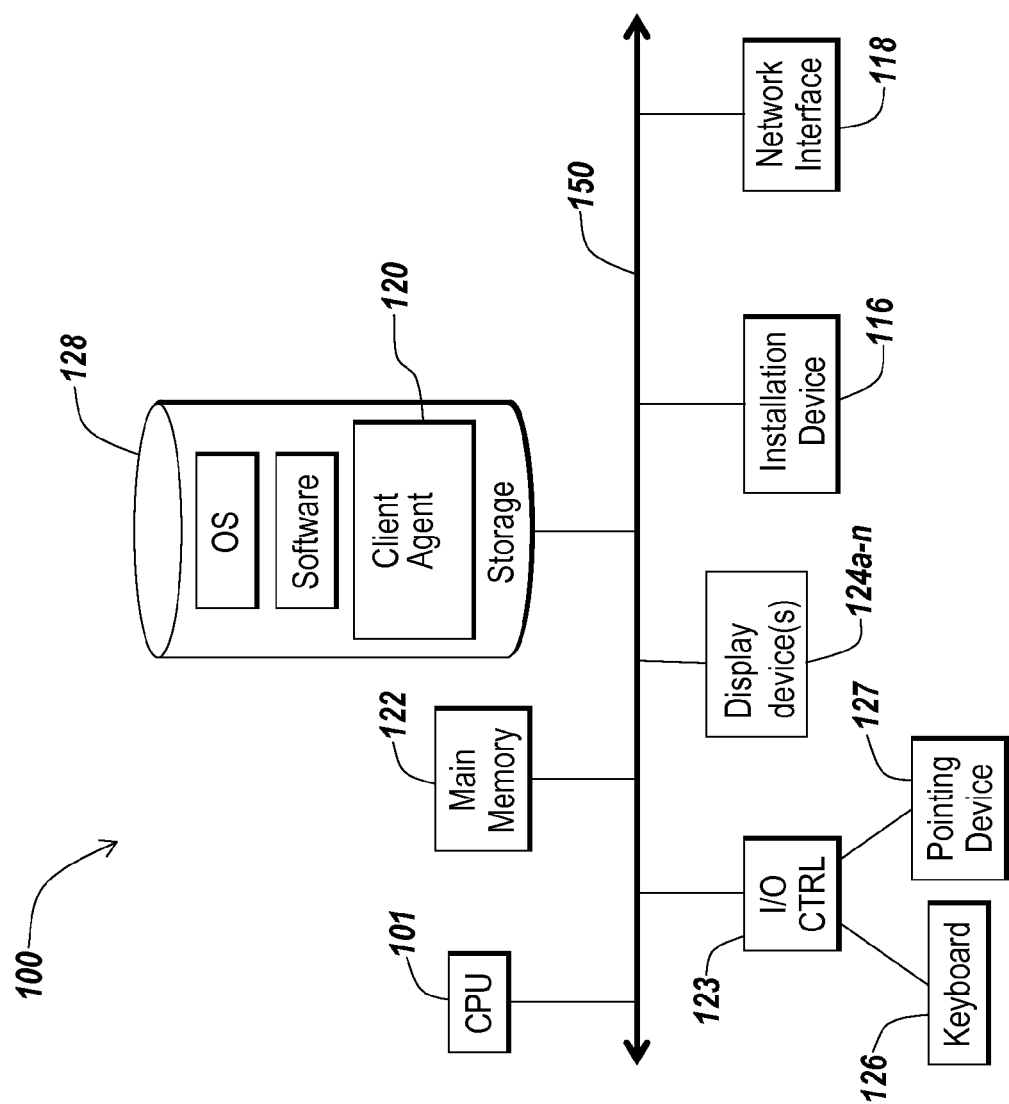
FIGS. 1D and 1E are block diagrams of embodiments of a computing device.

The client 102, server 106, and appliance 200 and 205 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® or OS X for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS 2003, WINDOWS XP, and WINDOWS VISTA all of which are manufactured by Microsoft Corporation of Redmond, Wash.; MacOS and OS X, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, (such as those versions of Unix referred to as Solaris/Sparc, Solaris/x86, AIX IBM, HP UX, and SGI (Silicon Graphics)), among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. In another example, the computing device 100 may be a WinCE or PocketPC device with an ARM (Advanced RISC Machine) type of processor. In one example, the computing device 100 includes a Series 80 (Nokia 9500 or Nokia 9300) type of smart phone manufactured by Nokia of Finland, which may run the Symbian OS or EPOC mobile operating system manufactured by Symbian Software Limited of London, United Kingdom. In another example, the computing device 100 may include a FOMA M100 brand smart phone manufactured by Motorola, Inc. of Schaumburg, Ill., and operating the EPOC or Symbian OS operating system. In yet another example, the computing device 100 includes a Sony Ericsson P800, P900 or P910 Alpha model phone manufactured by Sony Ericsson Mobile Communications (USA) Inc. of Research Triangle Park, N.C. Moreover, the computing device 100 can be any workstation, desktop computer, laptop or notebook computer, server, handheld computer, mobile telephone, smart phone, any other computer, or other form of computing or telecommunications device that is capable of communication and that has sufficient processor power and memory capacity to perform the operations described herein.

B. System and Appliance Architecture

Figure 2A:
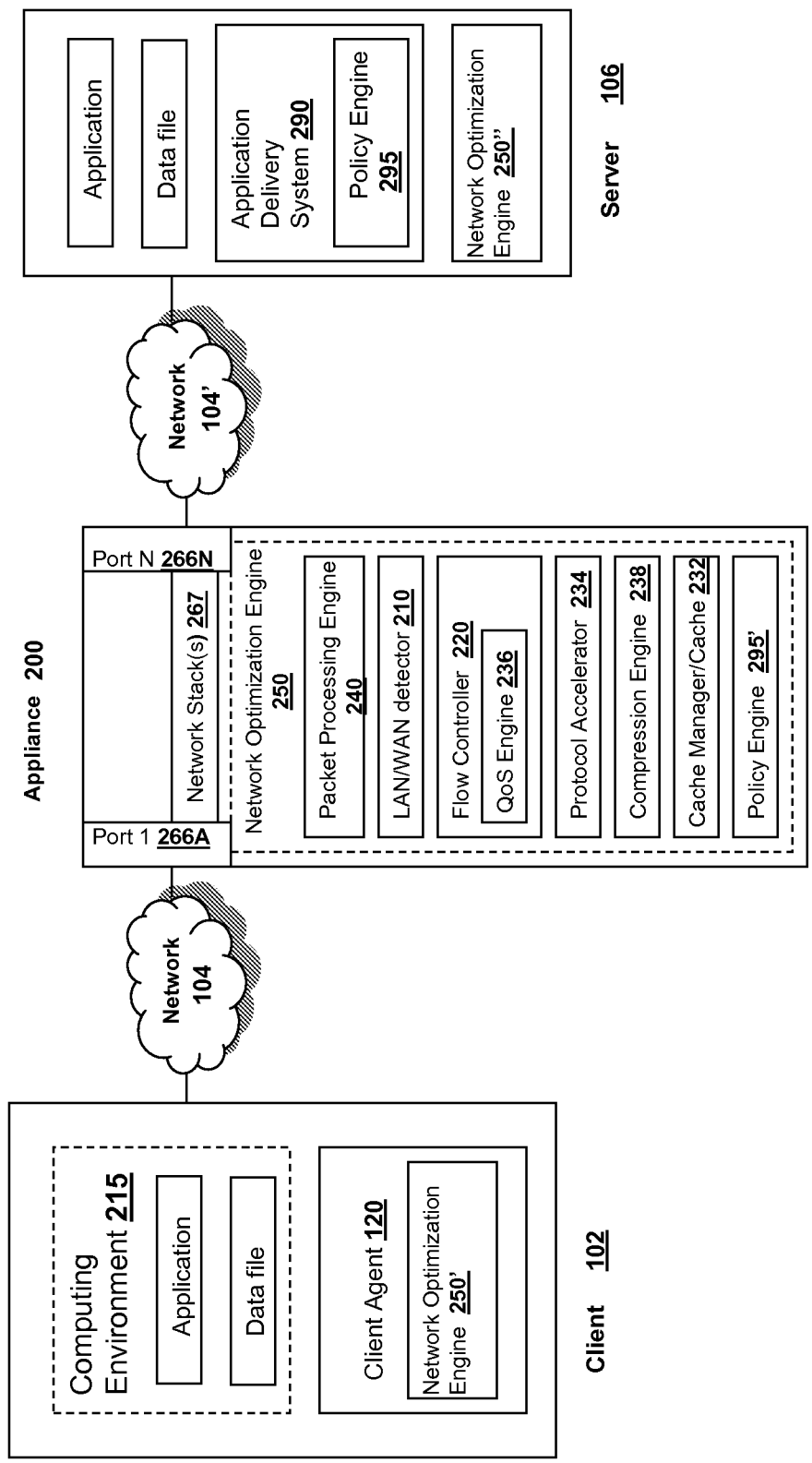
FIG. 2A is a block diagram of an embodiment of an appliance for processing communications between a client and a server.

Referring now to FIG. 2A, an embodiment of a system environment and architecture of an appliance 200 for delivering and/or operating a computing environment on a client is depicted. In some embodiments, a server 106 includes an application delivery system 290 for delivering a computing environment or an application and/or data file to one or more clients 102. In brief overview, a client 102 is in communication with a server 106 via network 104 and appliance 200. For example, the client 102 may reside in a remote office of a company, e.g., a branch office, and the server 106 may reside at a corporate data center. The client 102 has a client agent 120, and a computing environment 215. The computing environment 215 may execute or operate an application that accesses, processes or uses a data file. The computing environment 215, application and/or data file may be delivered via the appliance 200 and/or the server 106.

In some embodiments, the appliance 200 accelerates delivery of a computing environment 215, or any portion thereof, to a client 102. In one embodiment, the appliance 200 accelerates the delivery of the computing environment 215 by the application delivery system 290. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. In another embodiment, the appliance 200 controls, manages, or adjusts the transport layer protocol to accelerate delivery of the computing environment. In some embodiments, the appliance 200 uses caching and/or compression techniques to accelerate delivery of a computing environment.

In some embodiments, the application delivery management system 290 provides application delivery techniques to deliver a computing environment to a desktop of a user, remote or otherwise, based on a plurality of execution methods and based on any authentication and authorization policies applied via a policy engine 295. With these techniques, a remote user may obtain a computing environment and access to server stored applications and data files from any network connected device 100. In one embodiment, the application delivery system 290 may reside or execute on a server 106. In another embodiment, the application delivery system 290 may reside or execute on a plurality of servers 106a-106n. In some embodiments, the application delivery system 290 may execute in a server farm 38. In one embodiment, the server 106 executing the application delivery system 290 may also store or provide the application and data file. In another embodiment, a first set of one or more servers 106 may execute the application delivery system 290, and a different server 106n may store or provide the application and data file. In some embodiments, each of the application delivery system 290, the application, and data file may reside or be located on different servers. In yet another embodiment, any portion of the application delivery system 290 may reside, execute or be stored on or distributed to the appliance 200, or a plurality of appliances.

The client 102 may include a computing environment 215 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 290 and/or server 106 may deliver the application and data file to the client 102. For example, in one embodiment, the server 106 may transmit the application as an application stream to operate in computing environment 215 on client 102.

In some embodiments, the application delivery system 290 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 290 may deliver one or more applications to clients 102 or users via a remote-display protocol or otherwise via remote-based or server-based computing. In another embodiment, the application delivery system 290 may deliver one or more applications to clients or users via steaming of the application.

In one embodiment, the application delivery system 290 includes a policy engine 295 for controlling and managing the access to applications, selection of application execution methods and the delivery of applications. In some embodiments, the policy engine 295 determines the one or more applications a user or client 102 may access. In another embodiment, the policy engine 295 determines how the application should be delivered to the user or client 102, e.g., the method of execution. In some embodiments, the application delivery system 290 provides a plurality of delivery techniques from which to select a method of application execution, such as a server-based computing, streaming or delivering the application locally to the client 120 for local execution.

In one embodiment, a client 102 requests execution of an application program and the application delivery system 290 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 290 enumerates a plurality of application programs available to the client 102. The application delivery system 290 receives a request to execute an enumerated application. The application delivery system 290 selects one of a predetermined number of methods for executing the enumerated application, for example, responsive to a policy of a policy engine. The application delivery system 290 may select a method of execution of the application enabling the client 102 to receive application-output data generated by execution of the application program on a server 106. The application delivery system 290 may select a method of execution of the application enabling the client or local machine 102 to execute the application program locally after retrieving a plurality of application files comprising the application. In yet another embodiment, the application delivery system 290 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiment the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes, as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Example Appliance Architecture

Figure 1E:
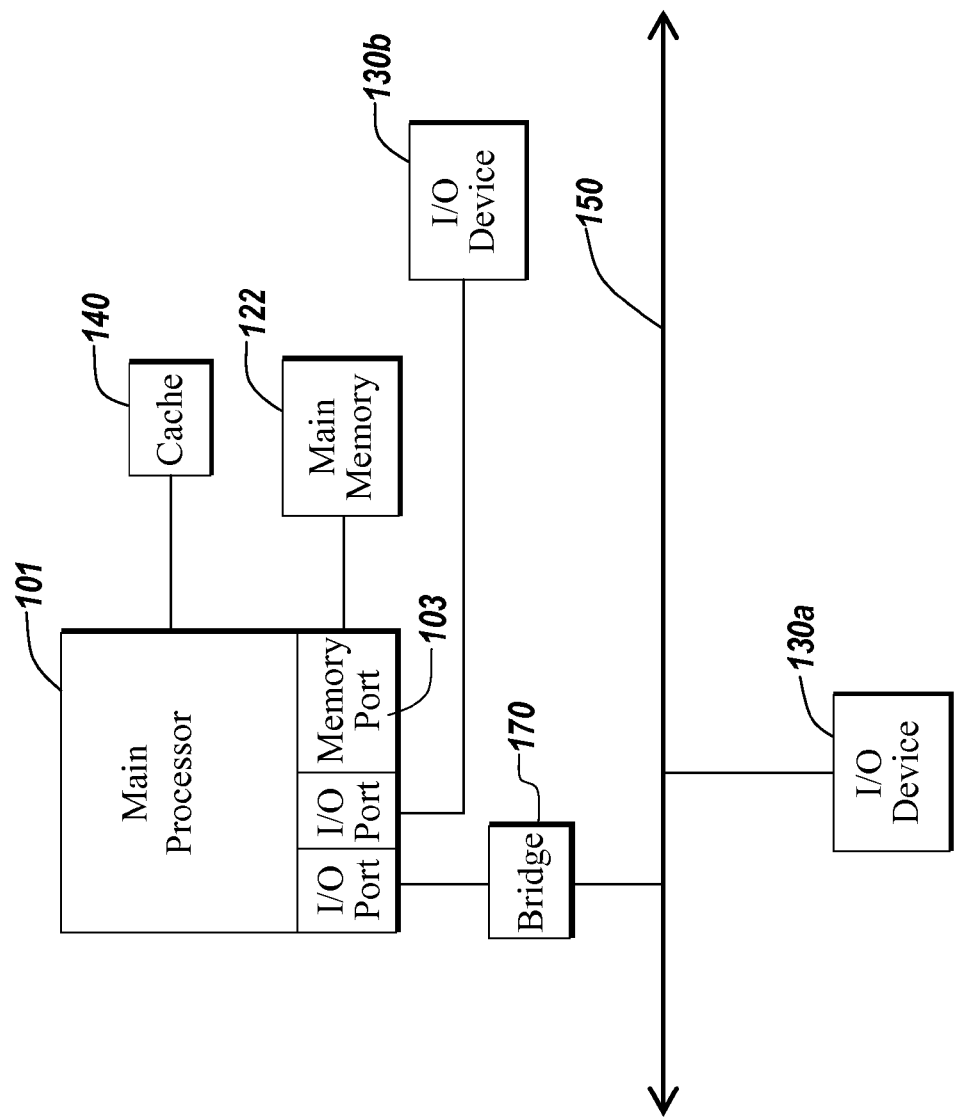

FIG. 2A also illustrates an example embodiment of the appliance 200. The architecture of the appliance 200 in FIG. 2A is provided by way of illustration only and is not intended to be limiting in any manner. The appliance 200 may include any type and form of computing device 100, such as any element or portion described in conjunction with FIGS. 1D and 1E above. In brief overview, the appliance 200 has one or more network ports 266A-226N and one or more networks stacks 267A-267N for receiving and/or transmitting communications via networks 104. The appliance 200 also has a network optimization engine 250 for optimizing, accelerating or otherwise improving the performance, operation, or quality of any network traffic or communications traversing the appliance 200.

The appliance 200 includes or is under the control of an operating system. The operating system of the appliance 200 may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The operating system of appliance 200 allocates, manages, or otherwise segregates the available system memory into what is referred to as kernel or system space, and user or application space. The kernel space is typically reserved for running the kernel, including any device drivers, kernel extensions or other kernel related software. As known to those skilled in the art, the kernel is the core of the operating system, and provides access, control, and management of resources and hardware-related elements of the appliance 200. In accordance with an embodiment of the appliance 200, the kernel space also includes a number of network services or processes working in conjunction with the network optimization engine 250, or any portion thereof. Additionally, the embodiment of the kernel will depend on the embodiment of the operating system installed, configured, or otherwise used by the device 200. In contrast to kernel space, user space is the memory area or portion of the operating system used by user mode applications or programs otherwise running in user mode. A user mode application may not access kernel space directly and uses service calls in order to access kernel services. The operating system uses the user or application space for executing or running applications and provisioning of user level programs, services, processes and/or tasks.

The appliance 200 has one or more network ports 266 for transmitting and receiving data over a network 104. The network port 266 provides a physical and/or logical interface between the computing device and a network 104 or another device 100 for transmitting and receiving network communications. The type and form of network port 266 depends on the type and form of network and type of medium for connecting to the network. Furthermore, any software of, provisioned for or used by the network port 266 and network stack 267 may run in either kernel space or user space.

In one embodiment, the appliance 200 has one network stack 267, such as a TCP/IP based stack, for communicating on a network 105, such with the client 102 and/or the server 106. In one embodiment, the network stack 267 is used to communicate with a first network, such as network 104, and also with a second network 104'. In another embodiment, the appliance 200 has two or more network stacks, such as first network stack 267A and a second network stack 267N. The first network stack 267A may be used in conjunction with a first port 266A to communicate on a first network 104. The second network stack 267N may be used in conjunction with a second port 266N to communicate on a second network 104'. In one embodiment, the network stack(s) 267 has one or more buffers for queuing one or more network packets for transmission by the appliance 200.

The network stack 267 includes any type and form of software, or hardware, or any combinations thereof, for providing connectivity to and communications with a network. In one embodiment, the network stack 267 includes a software implementation for a network protocol suite. The network stack 267 may have one or more network layers, such as any networks layers of the Open Systems Interconnection (OSI) communications model as those skilled in the art recognize and appreciate. As such, the network stack 267 may have any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 267 includes a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 267 has any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 267 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 267, such as for voice communications or real-time data communications.

Furthermore, the network stack 267 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 267 may be customized, modified or adapted to provide a custom or modified portion of the network stack 267 in support of any of the techniques described herein.

In one embodiment, the appliance 200 provides for or maintains a transport layer connection between a client 102 and server 106 using a single network stack 267. In some embodiments, the appliance 200 effectively terminates the transport layer connection by changing, managing or controlling the behavior of the transport control protocol connection between the client and the server. In these embodiments, the appliance 200 may use a single network stack 267. In other embodiments, the appliance 200 terminates a first transport layer connection, such as a TCP connection of a client 102, and establishes a second transport layer connection to a server 106 for use by or on behalf of the client 102, e.g., the second transport layer connection is terminated at the appliance 200 and the server 106. The first and second transport layer connections may be established via a single network stack 267. In other embodiments, the appliance 200 may use multiple network stacks, for example 267A and 267N. In these embodiments, the first transport layer connection may be established or terminated at one network stack 267A, and the second transport layer connection may be established or terminated on the second network stack 267N. For example, one network stack may be for receiving and transmitting network packets on a first network, and another network stack for receiving and transmitting network packets on a second network.

As shown in FIG. 2A, the network optimization engine 250 includes one or more of the following elements, components or modules: network packet processing engine 240, LAN/WAN detector 210, flow controller 220, QoS engine 236, protocol accelerator 234, compression engine 238, cache manager 232 and policy engine 295'. The network optimization engine 250, or any portion thereof, may include software, hardware or any combination of software and hardware. Furthermore, any software of, provisioned for or used by the network optimization engine 250 may run in either kernel space or user space. For example, in one embodiment, the network optimization engine 250 may run in kernel space. In another embodiment, the network optimization engine 250 may run in user space. In yet another embodiment, a first portion of the network optimization engine 250 runs in kernel space while a second portion of the network optimization engine 250 runs in user space.

Network Packet Processing Engine

The network packet engine 240, also generally referred to as a packet processing engine or packet engine, is responsible for controlling and managing the processing of packets received and transmitted by appliance 200 via network ports 266 and network stack(s) 267. The network packet engine 240 may operate at any layer of the network stack 267. In one embodiment, the network packet engine 240 operates at layer 2 or layer 3 of the network stack 267. In some embodiments, the packet engine 240 intercepts or otherwise receives packets at the network layer, such as the IP layer in a TCP/IP embodiment. In another embodiment, the packet engine 240 operates at layer 4 of the network stack 267. For example, in some embodiments, the packet engine 240 intercepts or otherwise receives packets at the transport layer, such as intercepting packets as the TCP layer in a TCP/IP embodiment. In other embodiments, the packet engine 240 operates at any session or application layer above layer 4. For example, in one embodiment, the packet engine 240 intercepts or otherwise receives network packets above the transport layer protocol layer, such as the payload of a TCP packet in a TCP embodiment.

The packet engine 240 may include a buffer for queuing one or more network packets during processing, such as for receipt of a network packet or transmission of a network packet. Additionally, the packet engine 240 is in communication with one or more network stacks 267 to send and receive network packets via network ports 266. The packet engine 240 may include a packet processing timer. In one embodiment, the packet processing timer provides one or more time intervals to trigger the processing of incoming, i.e., received, or outgoing, i.e., transmitted, network packets. In some embodiments, the packet engine 240 processes network packets responsive to the timer. The packet processing timer provides any type and form of signal to the packet engine 240 to notify, trigger, or communicate a time related event, interval or occurrence. In many embodiments, the packet processing timer operates in the order of milliseconds, such as for example 100 ms, 50 ms, 25 ms, 10 ms, 5 ms or 1 ms.

During operations, the packet engine 240 may be interfaced, integrated or be in communication with any portion of the network optimization engine 250, such as the LAN/WAN detector 210, flow controller 220, QoS engine 236, protocol accelerator 234, compression engine 238, cache manager 232 and/or policy engine 295'. As such, any of the logic, functions, or operations of the LAN/WAN detector 210, flow controller 220, QoS engine 236, protocol accelerator 234, compression engine 238, cache manager 232 and policy engine 295 may be performed responsive to the packet processing timer and/or the packet engine 240. In some embodiments, any of the logic, functions, or operations of the encryption engine 234, cache manager 232, policy engine 236 and multi-protocol compression logic 238 may be performed at the granularity of time intervals provided via the packet processing timer, for example, at a time interval of less than or equal to 10 ms. For example, in one embodiment, the cache manager 232 may perform expiration of any cached objects responsive to the integrated packet engine 240 and/or the packet processing timer 242. In another embodiment, the expiry or invalidation time of a cached object can be set to the same order of granularity as the time interval of the packet processing timer, such as at every 10 ms.

Cache Manager

The cache manager 232 may include software, hardware or any combination of software and hardware to store data, information and objects to a cache in memory or storage, provide cache access, and control and manage the cache. The data, objects or content processed and stored by the cache manager 232 may include data in any format, such as a markup language, or any type of data communicated via any protocol. In some embodiments, the cache manager 232 duplicates original data stored elsewhere or data previously computed, generated or transmitted, in which the original data may require longer access time to fetch, compute or otherwise obtain relative to reading a cache memory or storage element. Once the data is stored in the cache, future use can be made by accessing the cached copy rather than refetching or recomputing the original data, thereby reducing the access time. In some embodiments, the cache may comprise a data object in memory of the appliance 200. In another embodiment, the cache may comprise any type and form of storage element of the appliance 200, such as a portion of a hard disk. In some embodiments, the processing unit of the device may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any caching techniques of the appliance 200. In some embodiments, the cache manager 232 may operate as an application, library, program, service, process, thread or task. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

Policy Engine

The policy engine 295' includes any logic, function or operations for providing and applying one or more policies or rules to the function, operation or configuration of any portion of the appliance 200. The policy engine 295' may include, for example, an intelligent statistical engine or other programmable application(s). In one embodiment, the policy engine 295 provides a configuration mechanism to allow a user to identify, specify, define or configure a policy for the network optimization engine 250, or any portion thereof. For example, the policy engine 295 may provide policies for what data to cache, when to cache the data, for whom to cache the data, when to expire an object in cache or refresh the cache. In other embodiments, the policy engine 236 may include any logic, rules, functions or operations to determine and provide access, control and management of objects, data or content being cached by the appliance 200 in addition to access, control and management of security, network traffic, network access, compression or any other function or operation performed by the appliance 200.

In some embodiments, the policy engine 295' provides and applies one or more policies based on any one or more of the following: a user, identification of the client, identification of the server, the type of connection, the time of the connection, the type of network, or the contents of the network traffic. In one embodiment, the policy engine 295' provides and applies a policy based on any field or header at any protocol layer of a network packet. In another embodiment, the policy engine 295' provides and applies a policy based on any payload of a network packet. For example, in one embodiment, the policy engine 295' applies a policy based on identifying a certain portion of content of an application layer protocol carried as a payload of a transport layer packet. In another example, the policy engine 295' applies a policy based on any information identified by a client, server or user certificate. In yet another embodiment, the policy engine 295' applies a policy based on any attributes or characteristics obtained about a client 102, such as via any type and form of endpoint detection (see for example the collection agent of the client agent discussed below).

In one embodiment, the policy engine 295' works in conjunction or cooperation with the policy engine 295 of the application delivery system 290. In some embodiments, the policy engine 295' is a distributed portion of the policy engine 295 of the application delivery system 290. In another embodiment, the policy engine 295 of the application delivery system 290 is deployed on or executed on the appliance 200. In some embodiments, the policy engines 295, 295' both operate on the appliance 200. In yet another embodiment, the policy engine 295', or a portion thereof, of the appliance 200 operates on a server 106.

Multi-Protocol and Multi-Layer Compression Engine

The compression engine 238 includes any logic, business rules, function or operations for compressing one or more protocols of a network packet, such as any of the protocols used by the network stack 267 of the appliance 200. The compression engine 238 may also be referred to as a multi-protocol compression engine 238 in that it may be designed, constructed or capable of compressing a plurality of protocols. In one embodiment, the compression engine 238 applies context insensitive compression, which is compression applied to data without knowledge of the type of data. In another embodiment, the compression engine 238 applies context-sensitive compression. In this embodiment, the compression engine 238 utilizes knowledge of the data type to select a specific compression algorithm from a suite of suitable algorithms. In some embodiments, knowledge of the specific protocol is used to perform context-sensitive compression. In one embodiment, the appliance 200 or compression engine 238 can use port numbers (e.g., well-known ports), as well as data from the connection itself to determine the appropriate compression algorithm to use. Some protocols use only a single type of data, requiring only a single compression algorithm that can be selected when the connection is established. Other protocols contain different types of data at different times. For example, POP, IMAP, SMTP, and HTTP all move files of arbitrary types interspersed with other protocol data.

In one embodiment, the compression engine 238 uses a delta-type compression algorithm. In another embodiment, the compression engine 238 uses first site compression as well as searching for repeated patterns among data stored in cache, memory or disk. In some embodiments, the compression engine 238 uses a lossless compression algorithm. In other embodiments, the compression engine uses a lossy compression algorithm. In some cases, knowledge of the data type and, sometimes, permission from the user are required to use a lossy compression algorithm. In some embodiments, compression is not limited to the protocol payload. The control fields of the protocol itself may be compressed. In some embodiments, the compression engine 238 uses a different algorithm for control fields than that used for the payload.

In some embodiments, the compression engine 238 compresses at one or more layers of the network stack 267. In one embodiment, the compression engine 238 compresses at a transport layer protocol. In another embodiment, the compression engine 238 compresses at an application layer protocol. In some embodiments, the compression engine 238 compresses at a layer 2-4 protocol. In other embodiments, the compression engine 238 compresses at a layer 5-7 protocol. In yet another embodiment, the compression engine compresses a transport layer protocol and an application layer protocol. In some embodiments, the compression engine 238 compresses a layer 2-4 protocol and a layer 5-7 protocol.

In some embodiments, the compression engine 238 uses memory-based compression, cache-based compression or disk-based compression or any combination thereof. As such, the compression engine 238 may be referred to as a multi-layer compression engine. In one embodiment, the compression engine 238 uses a history of data stored in memory, such as RAM. In another embodiment, the compression engine 238 uses a history of data stored in a cache, such as L2 cache of the processor. In other embodiments, the compression engine 238 uses a history of data stored to a disk or storage location. In some embodiments, the compression engine 238 uses a hierarchy of cache-based, memory-based and disk-based data history. The compression engine 238 may first use the cache-based data to determine one or more data matches for compression, and then may check the memory-based data to determine one or more data matches for compression. In another case, the compression engine 238 may check disk storage for data matches for compression after checking either the cache-based and/or memory-based data history.

In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 may accelerate performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine by integrating with packet processing engine 240 accessing the network stack 267 is able to compress any of the protocols carried by a transport layer protocol, such as any application layer protocol.

LAN/WAN Detector

The LAN/WAN detector 238 includes any logic, business rules, function or operations for automatically detecting a slow side connection (e.g., a wide area network (WAN) connection such as an Intranet) and associated port 267, and a fast side connection (e.g., a local area network (LAN) connection) and an associated port 267. In some embodiments, the LAN/WAN detector 238 monitors network traffic on the network ports 267 of the appliance 200 to detect a synchronization packet, sometimes referred to as a "tagged" network packet. The synchronization packet identifies a type or speed of the network traffic. In one embodiment, the synchronization packet identifies a WAN speed or WAN type connection. The LAN/WAN detector 238 also identifies receipt of an acknowledgement packet to a tagged synchronization packet and on which port it is received. The appliance 200 then configures itself to operate the identified port on which the tagged synchronization packet arrived so that the speed on that port is set to be the speed associated with the network connected to that port. The other port is then set to the speed associated with the network connected to that port.

For ease of discussion herein, reference to "slow" side will be made with respect to connection with a wide area network (WAN), e.g., the Internet, and operating at a network speed of the WAN. Likewise, reference to "fast" side will be made with respect to connection with a local area network (LAN) and operating at a network speed the LAN. However, it is noted that "fast" and "slow" sides in a network can change on a per-connection basis and are relative terms to the speed of the network connections or to the type of network topology. Such configurations are useful in complex network topologies, where a network is "fast" or "slow" only when compared to adjacent networks and not in any absolute sense.

In one embodiment, the LAN/WAN detector 238 may be used to allow for auto-discovery by an appliance 200 of a network to which it connects. In another embodiment, the LAN/WAN detector 238 may be used to detect the existence or presence of a second appliance 200' deployed in the network 104. For example, an auto-discovery mechanism in operation in accordance with FIG. 1A functions as follows: appliance 200 and 200' are placed in line with the connection linking client 102 and server 106. The appliances 200 and 200' are at the ends of a low-speed link, e.g., Internet, connecting two LANs. In one example embodiment, appliances 200 and 200' each include two ports—one to connect with the "lower" speed link and the other to connect with a "higher" speed link, e.g., a LAN. Any packet arriving at one port is copied to the other port. Thus, appliance 200 and 200' are each configured to function as a bridge between the two networks 104.

When an end node, such as the client 102, opens a new TCP connection with another end node, such as the server 106, the client 102 sends a TCP packet with a synchronization (SYN) header bit set, or a SYN packet, to the server 106. In the present example, client 102 opens a transport layer connection to server 106. When the SYN packet passes through appliance 200, the appliance 200 inserts, attaches or otherwise provides a characteristic TCP header option to the packet, which announces its presence. If the packet passes through a second appliance, in this example appliance 200' the second appliance notes the header option on the SYN packet. The server 106 responds to the SYN packet with a synchronization acknowledgment (SYN-ACK) packet. When the SYN-ACK packet passes through appliance 200', a TCP header option is tagged (e.g., attached, inserted or added) to the SYN-ACK packet to announce appliance 200' presence to appliance 200. When appliance 200 receives this packet, both appliances 200, 200' are now aware of each other and the connection can be appropriately accelerated.

Further to the operations of the LAN/WAN detector 238, a method or process for detecting "fast" and "slow" sides of a network using a SYN packet is described. During a transport layer connection establishment between a client 102 and a server 106, the appliance 200 via the LAN/WAN detector 238 determines whether the SYN packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configure the port receiving the untagged packet as the "fast" side. The appliance 200 then tags the SYN packet with an ACK and copies the packet to the other port.

In another embodiment, the LAN/WAN detector 238 detects fast and slow sides of a network using a SYN-ACK packet. The appliance 200 via the LAN/WAN detector 238 determines whether the SYN-ACK packet is tagged with an acknowledgement (ACK). If it is tagged, the appliance 200 identifies or configures the port receiving the tagged SYN packet (SYN-ACK) as the "slow" side. In one embodiment, the appliance 200 optionally removes the ACK tag from the packet before copying the packet to the other port. If the LAN/WAN detector 238 determines that the packet is not tagged, the appliance 200 identifies or configures the port receiving the untagged packet as the "fast" side. The LAN/WAN detector 238 determines whether the SYN packet was tagged. If the SYN packet was not tagged, the appliance 200 copied the packet to the other port. If the SYN packet was tagged, the appliance tags the SYN-ACK packet before copying it to the other port.

The appliance 200, 200' may add, insert, modify, attach or otherwise provide any information or data in the TCP option header to provide any information, data or characteristics about the network connection, network traffic flow, or the configuration or operation of the appliance 200. In this manner, not only does an appliance 200 announce its presence to another appliance 200 or tag a higher or lower speed connection, the appliance 200 provides additional information and data via the TCP option headers about the appliance or the connection. The TCP option header information may be useful to or used by an appliance in controlling, managing, optimizing, acceleration or improving the network traffic flow traversing the appliance 200, or to otherwise configure itself or operation of a network port.

Although generally described in conjunction with detecting speeds of network connections or the presence of appliances, the LAN/WAN detector 238 can be used for applying any type of function, logic or operation of the appliance 200 to a port, connection or flow of network traffic. In particular, automated assignment of ports can occur whenever a device performs different functions on different ports, where the assignment of a port to a task can be made during the unit's operation, and/or the nature of the network segment on each port is discoverable by the appliance 200.

Flow Control

The flow controller 220 includes any logic, business rules, function or operations for optimizing, accelerating or otherwise improving the performance, operation or quality of service of transport layer communications of network packets or the delivery of packets at the transport layer. A flow controller, also sometimes referred to as a flow control module, regulates, manages and controls data transfer rates. In some embodiments, the flow controller 220 is deployed at or connected at a bandwidth bottleneck in the network 104. In one embodiment, the flow controller 220 effectively regulates, manages and controls bandwidth usage or utilization. In other embodiments, the flow control modules may also be deployed at points on the network of latency transitions (low latency to high latency) and on links with media losses (such as wireless or satellite links).

In some embodiments, a flow controller 220 may include a receiver-side flow control module for controlling the rate of receipt of network transmissions and a sender-side flow control module for the controlling the rate of transmissions of network packets. In other embodiments, a first flow controller 220 includes a receiver-side flow control module and a second flow controller 220' includes a sender-side flow control module. In some embodiments, a first flow controller 220 is deployed on a first appliance 200 and a second flow controller 220' is deployed on a second appliance 200'. As such, in some embodiments, a first appliance 200 controls the flow of data on the receiver side and a second appliance 200' controls the data flow from the sender side. In yet another embodiment, a single appliance 200 includes flow control for both the receiver-side and sender-side of network communications traversing the appliance 200.

In one embodiment, a flow control module 220 is configured to allow bandwidth at the bottleneck to be more fully utilized, and in some embodiments, not overutilized. In some embodiments, the flow control module 220 transparently buffers (or rebuffers data already buffered by, for example, the sender) network sessions that pass between nodes having associated flow control modules 220. When a session passes through two or more flow control modules 220, one or more of the flow control modules controls a rate of the session(s).

In one embodiment, the flow control module 200 is configured with predetermined data relating to bottleneck bandwidth. In another embodiment, the flow control module 220 may be configured to detect the bottleneck bandwidth or data associated therewith. A receiver-side flow control module 220 may control the data transmission rate. The receiver-side flow control module controls 220 the sender-side flow control module, e.g., 220, data transmission rate by forwarding transmission rate limits to the sender-side flow control module 220. In one embodiment, the receiver-side flow control module 220 piggybacks these transmission rate limits on acknowledgement (ACK) packets (or signals) sent to the sender, e.g., client 102, by the receiver, e.g., server 106. The receiver-side flow control module 220 does this in response to rate control requests that are sent by the sender side flow control module 220'. The requests from the sender-side flow control module 220' may be "piggybacked" on data packets sent by the sender 106.

In some embodiments, the flow controller 220 manipulates, adjusts, simulates, changes, improves or otherwise adapts the behavior of the transport layer protocol to provide improved performance or operations of delivery, data rates and/or bandwidth utilization of the transport layer. The flow controller 220 may implement a plurality of data flow control techniques at the transport layer, including but not limited to 1) pre-acknowledgements, 2) window virtualization, 3) recongestion techniques, 3) local retransmission techniques, 4) wavefront detection and disambiguation, 5) transport control protocol selective acknowledgements, 6) transaction boundary detection techniques and 7) repacketization.

Although a sender may be generally described herein as a client 102 and a receiver as a server 106, a sender may be any end point such as a server 106 or any computing device 100 on the network 104. Likewise, a receiver may be a client 102 or any other computing device on the network 104.

Pre-Acknowledgements

In brief overview of a pre-acknowledgement flow control technique, the flow controller 220, in some embodiments, handles the acknowledgements and retransmits for a sender, effectively terminating the sender's connection with the downstream portion of a network connection. In reference to FIG. 1B, one possible deployment of an appliance 200 into a network architecture to implement this feature is depicted. In this example environment, a sending computer or client 102 transmits data on network 104, for example, via a switch, which determines that the data is destined for VPN appliance 205. Because of the chosen network topology, all data destined for VPN appliance 205 traverses appliance 200, so the appliance 200 can apply any necessary algorithms to this data.

Continuing further with the example, the client 102 transmits a packet, which is received by the appliance 200. When the appliance 200 receives the packet, which is transmitted from the client 102 to a recipient via the VPN appliance 205, the appliance 200 retains a copy of the packet and forwards the packet downstream to the VPN appliance 205. The appliance 200 then generates an acknowledgement packet (ACK) and sends the ACK packet back to the client 102 or sending endpoint. This ACK, a pre-acknowledgment, causes the sender 102 to believe that the packet has been delivered successfully, freeing the sender's resources for subsequent processing. The appliance 200 retains the copy of the packet data in the event that a retransmission of the packet is required, so that the sender 102 does not have to handle retransmissions of the data. This early generation of acknowledgements may be called "preacking."

If a retransmission of the packet is required, the appliance 200 retransmits the packet to the sender. The appliance 200 may determine whether retransmission is required as a sender would in a traditional system, for example, determining that a packet is lost if an acknowledgement has not been received for the packet after a predetermined amount of time. To this end, the appliance 200 monitors acknowledgements generated by the receiving endpoint, e.g., server 106 (or any other downstream network entity) so that it can determine whether the packet has been successfully delivered or needs to be retransmitted. If the appliance 200 determines that the packet has been successfully delivered, the appliance 200 is free to discard the saved packet data. The appliance 200 may also inhibit forwarding acknowledgements for packets that have already been received by the sending endpoint.

In the embodiment described above, the appliance 200 via the flow controller 220 controls the sender 102 through the delivery of pre-acknowledgements, also referred to as "preacks", as though the appliance 200 was a receiving endpoint itself. Since the appliance 200 is not an endpoint and does not actually consume the data, the appliance 200 includes a mechanism for providing overflow control to the sending endpoint. Without overflow control, the appliance 200 could run out of memory because the appliance 200 stores packets that have been preacked to the sending endpoint but not yet acknowledged as received by the receiving endpoint. Therefore, in a situation in which the sender 102 transmits packets to the appliance 200 faster than the appliance 200 can forward the packets downstream, the memory available in the appliance 200 to store unacknowledged packet data can quickly fill. A mechanism for overflow control allows the appliance 200 to control transmission of the packets from the sender 102 to avoid this problem.

In one embodiment, the appliance 200 or flow controller 220 includes an inherent "self-clocking" overflow control mechanism. This self-clocking is due to the order in which the appliance 200 may be designed to transmit packets downstream and send ACKs to the sender 102 or 106. In some embodiments, the appliance 200 does not preack the packet until after it transmits the packet downstream. In this way, the sender 102 will receive the ACKs at the rate at which the appliance 200 is able to transmit packets rather than the rate at which the appliance 200 receives packets from the sender 100. This helps to regulate the transmission of packets from a sender 102.

Window Virtualization

Another overflow control mechanism that the appliance 200 may implement is to use the TCP window size parameter, which tells a sender how much buffer the receiver is permitting the sender to fill up. A nonzero window size (e.g., a size of at least one Maximum Segment Size (MSS)) in a preack permits the sending endpoint to continue to deliver data to the appliance, whereas a zero window size inhibits further data transmission. Accordingly, the appliance 200 may regulate the flow of packets from the sender, for example when the appliance's 200 buffer is becoming full, by appropriately setting the TCP window size in each preack.

Another technique to reduce this additional overhead is to apply hysteresis. When the appliance 200 delivers data to the slower side, the overflow control mechanism in the appliance 200 can require that a minimum amount of space be available before sending a nonzero window advertisement to the sender. In one embodiment, the appliance 200 waits until there is a minimum of a predetermined number of packets, such as four packets, of space available before sending a nonzero window packet, such as a packet indicating a window size of four packets. This may reduce the overhead by approximately a factor of four, since only two ACK packets are sent for each group of four data packets, instead of eight ACK packets for four data packets.

Another technique the appliance 200 or flow controller 220 may use for overflow control is the TCP delayed ACK mechanism, which skips ACKs to reduce network traffic. The TCP delayed ACKs automatically delay the sending of an ACK, either until two packets are received or until a fixed timeout has occurred. This mechanism alone can result in cutting the overhead in half, moreover, by increasing the numbers of packets above two, additional overhead reduction is realized. But merely delaying the ACK itself may be insufficient to control overflow, and the appliance 200 may also use the advertised window mechanism on the ACKs to control the sender. When doing this, the appliance 200 in one embodiment avoids triggering the timeout mechanism of the sender by delaying the ACK too long.

In one embodiment, the flow controller 220 does not preack the last packet of a group of packets. By not preacking the last packet, or at least one of the packets in the group, the appliance avoids a false acknowledgement for a group of packets. For example, if the appliance were to send a preack for a last packet and the packet were subsequently lost, the sender would have been tricked into thinking that the packet is delivered when it was not. Thinking that the packet had been delivered, the sender could discard that data. If the appliance also lost the packet, there would be no way to retransmit the packet to the recipient. By not preacking the last packet of a group of packets, the sender will not discard the packet until it has been delivered.

In another embodiment, the flow controller 220 may use a window virtualization technique to control the rate of flow or bandwidth utilization of a network connection. Though it may not immediately be apparent from examining conventional literature such as RFC 1323, there is effectively a send window for transport layer protocols such as TCP. The send window is similar to the receive window, in that it consumes buffer space (though on the sender). The sender's send window consists of all data sent by the application that has not been acknowledged by the receiver. This data must be retained in memory in case retransmission is required. Since memory is a shared resource, some TCP stack implementations limit the size of this data. When the send window is full, an attempt by an application program to send more data results in blocking the application program until space is available. Subsequent reception of acknowledgements will free send-window memory and unblock the application program. This window size is known as the socket buffer size in some TCP implementations.

In one embodiment, the flow control module 220 is configured to provide access to increased window (or buffer) sizes. This configuration may also be referenced to as window virtualization. In an embodiment including TCP as the transport layer protocol, the TCP header may include a bit string corresponding to a window scale. In one embodiment, "window" may be referenced in a context of send, receive, or both.

One embodiment of window virtualization is to insert a preacking appliance 200 into a TCP session. In reference to any of the environments of FIG. 1A or 1B, initiation of a data communication session between a source node, e.g., client 102 (for ease of discussion, now referenced as source node 102), and a destination node, e.g., server 106 (for ease of discussion, now referenced as destination node 106) is established. For TCP communications, the source node 102 initially transmits a synchronization signal ("SYN") through its local area network 104 to first flow control module 220. The first flow control module 220 inserts a configuration identifier into the TCP header options area. The configuration identifier identifies this point in the data path as a flow control module.

The appliances 200 via a flow control module 220 provide window (or buffer) to allow increasing data buffering capabilities within a session despite having end nodes with small buffer sizes, e.g., typically 16 k bytes. However, RFC 1323 requires window scaling for any buffer sizes greater than 64 k bytes, which must be set at the time of session initialization (SYN, SYN-ACK signals). Moreover, the window scaling corresponds to the lowest common denominator in the data path, often an end node with small buffer size. This window scale often is a scale of 0 or 1, which corresponds to a buffer size of up to 64 k or 128 k bytes. Note that because the window size is defined as the window field in each packet shifted over by the window scale, the window scale establishes an upper limit for the buffer, but does not guarantee the buffer is actually that large. Each packet indicates the current available buffer space at the receiver in the window field.

In one embodiment of scaling using the window virtualization technique, during connection establishment (i.e., initialization of a session) when the first flow control module 220 receives from the source node 102 the SYN signal (or packet), the flow control module 220 stores the windows scale of the source node 102 (which is the previous node) or stores a 0 for window scale if the scale of the previous node is missing. The first flow control module 220 also modifies the scale, e.g., increases the scale to 4 from 0 or 1, in the SYN-FCM signal. When the second flow control module 220 receives the SYN signal, it stores the increased scale from the first flow control signal and resets the scale in the SYN signal back to the source node 103 scale value for transmission to the destination node 106. When the second flow controller 220 receives the SYN-ACK signal from the destination node 106, it stores the scale from the destination node 106 scale, e.g., 0 or 1, and modifies it to an increased scale that is sent with the SYN-ACK-FCM signal. The first flow control node 220 receives and notes the received window scale and revises the windows scale sent back to the source node 102 back down to the original scale, e.g., 0 or 1. Based on the above window shift conversation during connection establishment, the window field in every subsequent packet, e.g., TCP packet, of the session must be shifted according to the window shift conversion.

The window scale, as described above, expresses buffer sizes of over 64 k and may not be required for window virtualization. Thus, shifts for window scale may be used to express increased buffer capacity in each flow control module 220. This increase in buffer capacity in may be referenced as window (or buffer) virtualization. The increase in buffer size allows greater packet throughput from and to the respective end nodes 102 and 106. Note that buffer sizes in TCP are typically expressed in terms of bytes, but for ease of discussion "packets" may be used in the description herein as it relates to virtualization.

By way of example, a window (or buffer) virtualization performed by the flow controller 220 is described. In this example, the source node 102 and the destination node 106 are configured similar to conventional end nodes having a limited buffer capacity of 16 k bytes, which equals approximately 10 packets of data. Typically, an end node 102, 106 must wait until the packet is transmitted and confirmation is received before a next group of packets can be transmitted. In one embodiment, using increased buffer capacity in the flow control modules 220, when the source node 103 transmits its data packets, the first flow control module 220 receives the packets, stores it in its larger capacity buffer, e.g., 512 packet capacity, and immediately sends back an acknowledgement signal indicating receipt of the packets ("REC-ACK") back to the source node 102. The source node 102 can then "flush" its current buffer, load the buffer with 10 new data packets, and transmit those onto the first flow control module 220. Again, the first flow control module 220 transmits a REC-ACK signal back to the source node 102 and the source node 102 flushes its buffer and loads it with 10 more new packets for transmission.

As the first flow control module 220 receives the data packets from the source nodes, it loads up its buffer accordingly. When it is ready the first flow control module 220 can begin transmitting the data packets to the second flow control module 230, which also has an increased buffer size, for example, to receive 512 packets. The second flow control module 220' receives the data packets and begins to transmit 10 packets at a time to the destination node 106. Each REC-ACK received at the second flow control node 220 from the destination node 106 results in 10 more packets being transmitted to the destination node 106 until all the data packets are transferred. Hence, the present invention is able to increase data transmission throughput between the source node (sender) 102 and the destination node (receiver) 106 by taking advantage of the larger buffer in the flow control modules 220, 220' between the devices.

It is noted that by "preacking" the transmission of data as described previously, a sender (or source node 102) is allowed to transmit more data than is possible without the preacks, thus affecting a larger window size. For example, in one embodiment this technique is effective when the flow control module 220, 220' is located "near" a node (e.g., source node 102 or destination node 106) that lacks large windows.

Recongestion

Another technique or algorithm of the flow controller 220 is referred to as recongestion. The standard TCP congestion avoidance algorithms are known to perform poorly in the face of certain network conditions, including: large RTTs (round trip times), high packet loss rates, and others. When the appliance 200 detects a congestion condition such as long round trip times or high packet loss, the appliance 200 intervenes, substituting an alternate congestion avoidance algorithm that better suits the particular network condition. In one embodiment, the recongestion algorithm uses preacks to effectively terminate the connection between the sender and the receiver. The appliance 200 then resends the packets from itself to the receiver, using a different congestion avoidance algorithm. Recongestion algorithms may be dependent on the characteristics of the TCP connection. The appliance 200 monitors each TCP connection, characterizing it with respect to the different dimensions, selecting a recongestion algorithm that is appropriate for the current characterization.

In one embodiment, upon detecting a TCP connection that is limited by round trip times (RTT), a recongestion algorithm is applied which behaves as multiple TCP connections. Each TCP connection operates within its own performance limit but the aggregate bandwidth achieves a higher performance level. One parameter in this mechanism is the number of parallel connections that are applied (N). Too large a value of N and the connection bundle achieves more than its fair share of bandwidth. Too small a value of N and the connection bundle achieves less than its fair share of bandwidth. One method of establishing "N" relies on the appliance 200 monitoring the packet loss rate, RTT, and packet size of the actual connection. These numbers are plugged into a TCP response curve formula to provide an upper limit on the performance of a single TCP connection in the present configuration. If each connection within the connection bundle is achieving substantially the same performance as that computed to be the upper limit, then additional parallel connections are applied. If the current bundle is achieving less performance than the upper limit, the number of parallel connections is reduced. In this manner, the overall fairness of the system is maintained since individual connection bundles contain no more parallelism than is required to eliminate the restrictions imposed by the protocol itself Furthermore, each individual connection retains TCP compliance.

Another method of establishing "N" is to utilize a parallel flow control algorithm such as the TCP "Vegas" algorithm or the TCP "Stabilized Vegas" algorithm. In this method, the network information associated with the connections in the connection bundle (e.g., RTT, loss rate, average packet size, etc.) is aggregated and applied to the alternate flow control algorithm. The results of this algorithm are in turn distributed among the connections of the bundle controlling their number (i.e., N). Optionally, each connection within the bundle continues using the standard TCP congestion avoidance algorithm.

In another embodiment, the individual connections within a parallel bundle are virtualized, i.e., actual individual TCP connections are not established. Instead the congestion avoidance algorithm is modified to behave as though there were N parallel connections. This method has the advantage of appearing to transiting network nodes as a single connection. Thus the QOS, security and other monitoring methods of these nodes are unaffected by the recongestion algorithm. In yet another embodiment, the individual connections within a parallel bundle are real, i.e., a separate. TCP connection is established for each of the parallel connections within a bundle. The congestion avoidance algorithm for each TCP connection need not be modified.

Retransmission

In some embodiments, the flow controller 220 may apply a local retransmission technique. One reason for implementing preacks is to prepare to transmit to a high-loss link (e.g., wireless). In these embodiments, the preacking appliance 200 or flow control module 220 is located most beneficially "before" the wireless link. This allows retransmissions to be performed closer to the high loss link, removing the retransmission burden from the remainder of the network. The appliance 200 may provide local retransmission, in which case, packets dropped due to failures of the link are retransmitted directly by the appliance 200. This is advantageous because it eliminates the retransmission burden upon an end node, such as server 106, and infrastructure of any of the networks 104. With appliance 200 providing local retransmissions, the dropped packet can be retransmitted across the high loss link without necessitating a retransmit by an end node and a corresponding decrease in the rate of data transmission from the end node.

Another reason for implementing preacks is to avoid a receive time out (RTO) penalty. In standard TCP there are many situations that result in an RTO, even though a large percentage of the packets in flight were successfully received. With standard TCP algorithms, dropping more than one packet within an RTT window would likely result in a timeout. Additionally, most TCP connections experience a timeout if a retransmitted packet is dropped. In a network with a high bandwidth delay product, even a relatively small packet loss rate will cause frequent Retransmission timeouts (RTOs). In one embodiment, the appliance 200 uses a retransmit and timeout algorithm is avoid premature RTOs. The appliance 200 or flow controller 220 maintains a count of retransmissions is maintained on a per-packet basis. Each time that a packet is retransmitted, the count is incremented by one and the appliance 200 continues to transmit packets. In some embodiments, only if a packet has been retransmitted a predetermined number of times is an RTO declared.

Wavefront Detection and Disambiguation

In some embodiments, the appliance 200 or flow controller 220 uses wavefront detection and disambiguation techniques in managing and controlling flow of network traffic. In this technique, the flow controller 220 uses transmit identifiers or numbers to determine whether particular data packets need to be retransmitted. By way of example, a sender transmits data packets over a network, where each instance of a transmitted data packet is associated with a transmit number. It can be appreciated that the transmit number for a packet is not the same as the packet's sequence number, since a sequence number references the data in the packet while the transmit number references an instance of a transmission of that data. The transmit number can be any information usable for this purpose, including a timestamp associated with a packet or simply an increasing number (similar to a sequence number or a packet number). Because a data segment may be retransmitted, different transmit numbers may be associated with a particular sequence number.

As the sender transmits data packets, the sender maintains a data structure of acknowledged instances of data packet transmissions. Each instance of a data packet transmission is referenced by its sequence number and transmit number. By maintaining a transmit number for each packet, the sender retains the ordering of the transmission of data packets. When the sender receives an ACK or a SACK, the sender determines the highest transmit number associated with packets that the receiver indicated has arrived (in the received acknowledgement). Any outstanding unacknowledged packets with lower transmit numbers are presumed lost.

In some embodiments, the sender is presented with an ambiguous situation when the arriving packet has been retransmitted: a standard ACK/SACK does not contain enough information to allow the sender to determine which transmission of the arriving packet has triggered the acknowledgement. After receiving an ambiguous acknowledgement, therefore, the sender disambiguates the acknowledgement to associate it with a transmit number. In various embodiments, one or a combination of several techniques may be used to resolve this ambiguity.

In one embodiment, the sender includes an identifier with a transmitted data packet, and the receiver returns that identifier or a function thereof with the acknowledgement. The identifier may be a timestamp (e.g., a TCP timestamp as described in RFC 1323), a sequential number, or any other information that can be used to resolve between two or more instances of a packet's transmission. In an embodiment in which the TCP timestamp option is used to disambiguate the acknowledgement, each packet is tagged with up to 32-bits of unique information. Upon receipt of the data packet, the receiver echoes this unique information back to the sender with the acknowledgement. The sender ensures that the originally sent packet and its retransmitted version or versions contain different values for the timestamp option, allowing it to unambiguously eliminate the ACK ambiguity. The sender may maintain this unique information, for example, in the data structure in which it stores the status of sent data packets.

This technique is advantageous because it complies with industry standards and is thus likely to encounter little or no interoperability issues. However, this technique may require ten bytes of TCP header space in some implementations, reducing the effective throughput rate on the network and reducing space available for other TCP options.

In another embodiment, another field in the packet, such as the IP ID field, is used to disambiguate in a way similar to the TCP timestamp option described above. The sender arranges for the ID field values of the original and the retransmitted version or versions of the packet to have different ID fields in the IP header. Upon reception of the data packet at the receiver, or a proxy device thereof, the receiver sets the ID field of the ACK packet to a function of the ID field of the packet that triggers the ACK. This method is advantageous, as it requires no additional data to be sent, preserving the efficiency of the network and TCP header space. The function chosen should provide a high degree of likelihood of providing disambiguation. In a preferred embodiment, the sender selects IP ID values with the most significant bit set to 0. When the receiver responds, the IP ID value is set to the same IP ID value with the most significant bit set to a one.

In another embodiment, the transmit numbers associated with non-ambiguous acknowledgements are used to disambiguate an ambiguous acknowledgement. This technique is based on the principle that acknowledgements for two packets will tend to be received closer in time as the packets are transmitted closer in time. Packets that are not retransmitted will not result in ambiguity, as the acknowledgements received for such packets can be readily associated with a transmit number. Therefore, these known transmit numbers are compared to the possible transmit numbers for an ambiguous acknowledgement received near in time to the known acknowledgement. The sender compares the transmit numbers of the ambiguous acknowledgement against the last known received transmit number, selecting the one closest to the known received transmit number. For example, if an acknowledgement for data packet 1 is received and the last received acknowledgement was for data packet 5, the sender resolves the ambiguity by assuming that the third instance of data packet 1 caused the acknowledgement.

Selective Acknowledgements

Another technique of the appliance 200 or flow controller 220 is to implement an embodiment of transport control protocol selective acknowledgements, or TCP SACK, to determine what packets have or have not been received. This technique allows the sender to determine unambiguously a list of packets that have been received by the receiver as well as an accurate list of packets not received. This functionality may be implemented by modifying the sender and/or receiver, or by inserting sender- and receiver-side flow control modules 220 in the network path between the sender and receiver. In reference to FIG. 1A or FIG. 1B, a sender, e.g., client 102, is configured to transmit data packets to the receiver, e.g., server 106, over the network 104. In response, the receiver returns a TCP Selective Acknowledgment option, referred to as SACK packet to the sender. In one embodiment, the communication is bi-directional, although only one direction of communication is discussed here for simplicity. The receiver maintains a list, or other suitable data structure, that contains a group of ranges of sequence numbers for data packets that the receiver has actually received. In some embodiments, the list is sorted by sequence number in an ascending or descending order. The receiver also maintains a left-off pointer, which comprises a reference into the list and indicates the left-off point from the previously generated SACK packet.

Upon reception of a data packet, the receiver generates and transmits a SACK packet back to the sender. In some embodiments, the SACK packet includes a number of fields, each of which can hold a range of sequence numbers to indicate a set of received data packets. The receiver fills this first field of the SACK packet with a range of sequence numbers that includes the landing packet that triggered the SACK packet. The remaining available SACK fields are filled with ranges of sequence numbers from the list of received packets. As there are more ranges in the list than can be loaded into the SACK packet, the receiver uses the left-off pointer to determine which ranges are loaded into the SACK packet. The receiver inserts the SACK ranges consecutively from the sorted list, starting from the range referenced by the pointer and continuing down the list until the available SACK range space in the TCP header of the SACK packet is consumed. The receiver wraps around to the start of the list if it reaches the end. In some embodiments, two or three additional SACK ranges can be added to the SACK range information.

Once the receiver generates the SACK packet, the receiver sends the acknowledgement back to the sender. The receiver then advances the left-off pointer by one or more SACK range entries in the list. If the receiver inserts four SACK ranges, for example, the left-off pointer may be advanced two SACK ranges in the list. When the advanced left-off pointer reaches at the end of the list, the pointer is reset to the start of the list, effectively wrapping around the list of known received ranges. Wrapping around the list enables the system to perform well, even in the presence of large losses of SACK packets, since the SACK information that is not communicated due to a lost SACK packet will eventually be communicated once the list is wrapped around.

It can be appreciated, therefore, that a SACK packet may communicate several details about the condition of the receiver. First, the SACK packet indicates that, upon generation of the SACK packet, the receiver had just received a data packet that is within the first field of the SACK information. Secondly, the second and subsequent fields of the SACK information indicate that the receiver has received the data packets within those ranges. The SACK information also implies that the receiver had not, at the time of the SACK packet's generation, received any of the data packets that fall between the second and subsequent fields of the SACK information. In essence, the ranges between the second and subsequent ranges in the SACK information are "holes" in the received data, the data therein known not to have been delivered. Using this method, therefore, when a SACK packet has sufficient space to include more than two SACK ranges, the receiver may indicate to the sender a range of data packets that have not yet been received by the receiver.

In another embodiment, the sender uses the SACK packet described above in combination with the retransmit technique described above to make assumptions about which data packets have been delivered to the receiver. For example, when the retransmit algorithm (using the transmit numbers) declares a packet lost, the sender considers the packet to be only conditionally lost, as it is possible that the SACK packet identifying the reception of this packet was lost rather than the data packet itself. The sender thus adds this packet to a list of potentially lost packets, called the presumed lost list. Each time a SACK packet arrives, the known missing ranges of data from the SACK packet are compared to the packets in the presumed lost list. Packets that contain data known to be missing are declared actually lost and are subsequently retransmitted. In this way, the two schemes are combined to give the sender better information about which packets have been lost and need to be retransmitted.

Transaction Boundary Detection

In some embodiments, the appliance 200 or flow controller 220 applies a technique referred to as transaction boundary detection. In one embodiment, the technique pertains to ping-pong behaved connections. At the TCP layer, ping-pong behavior is when one communicant—a sender—sends data and then waits for a response from the other communicant—the receiver. Examples of ping-pong behavior include remote procedure call, HTTP and others. The algorithms described above use retransmission timeout (RTO) to recover from the dropping of the last packet or packets associated with the transaction. Since the TCP RTO mechanism is extremely coarse in some embodiments, for example requiring a minimum one second value in all cases), poor application behavior may be seen in these situations.

In one embodiment, the sender of data or a flow control module 220 coupled to the sender detects a transaction boundary in the data being sent. Upon detecting a transaction boundary, the sender or a flow control module 220 sends additional packets, whose reception generates additional ACK or SACK responses from the receiver. Insertion of the additional packets is preferably limited to balance between improved application response time and network capacity utilization. The number of additional packets that is inserted may be selected according to the current loss rate associated with that connection, with more packets selected for connections having a higher loss rate.

One method of detecting a transaction boundary is time based. If the sender has been sending data and ceases, then after a period of time the sender or flow control module 200 declares a transaction boundary. This may be combined with other techniques. For example, the setting of the PSH (TCP Push) bit by the sender in the TCP header may indicate a transaction boundary. Accordingly, combining the time-based approach with these additional heuristics can provide for more accurate detection of a transaction boundary. In another technique, if the sender or flow control module 220 understands the application protocol, it can parse the protocol data stream and directly determine transaction boundaries. In some embodiment, this last behavior can be used independent of any time-based mechanism.

Responsive to detecting a transaction boundary, the sender or flow control module 220 transmits additional data packets to the receiver to cause acknowledgements therefrom. The additional data packets should therefore be such that the receiver will at least generate an ACK or SACK in response to receiving the data packet. In one embodiment, the last packet or packets of the transaction are simply retransmitted. This has the added benefit of retransmitting needed data if the last packet or packets had been dropped, as compared to merely sending dummy data packets. In another embodiment, fractions of the last packet or packets are sent, allowing the sender to disambiguate the arrival of these packets from their original packets. This allows the receiver to avoid falsely confusing any reordering adaptation algorithms. In another embodiment, any of a number of well-known forward error correction techniques can be used to generate additional data for the inserted packets, allowing for the reconstruction of dropped or otherwise missing data at the receiver.

In some embodiments, the boundary detection technique described herein helps to avoid a timeout when the acknowledgements for the last data packets in a transaction are dropped. When the sender or flow control module 220 receives the acknowledgements for these additional data packets, the sender can determine from these additional acknowledgements whether the last data packets have been received or need to be retransmitted, thus avoiding a timeout.

In one embodiment, if the last packets have been received but their acknowledgements were dropped, a flow control module 220 generates an acknowledgement for the data packets and sends the acknowledgement to the sender, thus communicating to the sender that the data packets have been delivered. In another embodiment, if the last packets have not been received, a flow control module 200 sends a packet to the sender to cause the sender to retransmit the dropped data packets.

Repacketization

In yet another embodiment, the appliance 200 or flow controller 220 applies a repacketization technique for improving the flow of transport layer network traffic. In some embodiments, performance of TCP is proportional to packet size. Thus increasing packet sizes improves performance unless it causes substantially increased packet loss rates or other nonlinear effects, like IP fragmentation. In general, wired media (such as copper or fibre optics) have extremely low bit-error rates, low enough that these can be ignored. For these media, it is advantageous for the packet size to be the maximum possible before fragmentation occurs (the maximum packet size is limited by the protocols of the underlying transmission media). Whereas for transmission media with higher loss rates (e.g., wireless technologies such as WiFi, etc., or high-loss environments such as power-line networking, etc.), increasing the packet size may lead to lower transmission rates, as media-induced errors cause an entire packet to be dropped (i.e., media-induced errors beyond the capability of the standard error correcting code for that media), increasing the packet loss rate. A sufficiently large increase in the packet loss rate will actually negate any performance benefit of increasing packet size. In some cases, it may be difficult for a TCP endpoint to choose an optimal packet size. For example, the optimal packet size may vary across the transmission path, depending on the nature of each link.

By inserting an appliance 200 or flow control module 220 into the transmission path, the flow controller 220 monitors characteristics of the link and repacketizes according to determined link characteristics. In one embodiment, an appliance 200 or flow controller 220 repacketizes packets with sequential data into a smaller number of larger packets. In another embodiment, an appliance 200 or flow controller 220 repacketizes packets by breaking part a sequence of large packets into a larger number of smaller packets. In other embodiments, an appliance 200 or flow controller 220 monitors the link characteristics and adjusts the packet sizes through recombination to improve throughput.

QoS

Still referring to FIG. 2A, the flow controller 220, in some embodiments, may include a QoS Engine 236, also referred to as a QoS controller. In another embodiment, the appliance 200 and/or network optimization engine 250 includes the QoS engine 236, for example, separately but in communication with the flow controller 220. The QoS Engine 236 includes any logic, business rules, function or operations for performing one or more Quality of Service (QoS) techniques improving the performance, operation or quality of service of any of the network connections. In some embodiments, the QoS engine 236 includes network traffic control and management mechanisms that provide different priorities to different users, applications, data flows or connections. In other embodiments, the QoS engine 236 controls, maintains, or assures a certain level of performance to a user, application, data flow or connection. In one embodiment, the QoS engine 236 controls, maintains or assures a certain portion of bandwidth or network capacity for a user, application, data flow or connection. In some embodiments, the QoS engine 236 monitors the achieved level of performance or the quality of service corresponding to a user, application, data flow or connection, for example, the data rate and delay. In response to monitoring, the QoS engine 236 dynamically controls or adjusts scheduling priorities of network packets to achieve the desired level of performance or quality of service.

In some embodiments, the QoS engine 236 prioritizes, schedules and transmits network packets according to one or more classes or levels of services. In some embodiments, the class or level service may include: 1) best efforts, 2) controlled load, 3) guaranteed or 4) qualitative. For a best efforts class of service, the appliance 200 makes reasonable effort to deliver packets (a standard service level). For a controlled load class of service, the appliance 200 or QoS engine 236 approximates the standard packet error loss of the transmission medium or approximates the behavior of best-effort service in lightly loaded network conditions. For a guaranteed class of service, the appliance 200 or QoS engine 236 guarantees the ability to transmit data at a determined rate for the duration of the connection. For a qualitative class of service, the appliance 200 or QoS engine 236 the qualitative service class is used for applications, users, data flows or connection that require or desire prioritized traffic but cannot quantify resource needs or level of service. In these cases, the appliance 200 or QoS engine 236 determines the class of service or prioritization based on any logic or configuration of the QoS engine 236 or based on business rules or policies. For example, in one embodiment, the QoS engine 236 prioritizes, schedules and transmits network packets according to one or more policies as specified by the policy engine 295, 295'.

Protocol Acceleration

The protocol accelerator 234 includes any logic, business rules, function or operations for optimizing, accelerating, or otherwise improving the performance, operation or quality of service of one or more protocols. In one embodiment, the protocol accelerator 234 accelerates any application layer protocol or protocols at layers 5-7 of the network stack. In other embodiments, the protocol accelerator 234 accelerates a transport layer or a layer 4 protocol. In one embodiment, the protocol accelerator 234 accelerates layer 2 or layer 3 protocols. In some embodiments, the protocol accelerator 234 is configured, constructed or designed to optimize or accelerate each of one or more protocols according to the type of data, characteristics and/or behavior of the protocol. In another embodiment, the protocol accelerator 234 is configured, constructed or designed to improve a user experience, response times, network or computer load, and/or network or bandwidth utilization with respect to a protocol.

In one embodiment, the protocol accelerator 234 is configured, constructed or designed to minimize the effect of WAN latency on file system access. In some embodiments, the protocol accelerator 234 optimizes or accelerates the use of the CIFS (Common Internet File System) protocol to improve file system access times or access times to data and files. In some embodiments, the protocol accelerator 234 optimizes or accelerates the use of the NFS (Network File System) protocol. In another embodiment, the protocol accelerator 234 optimizes or accelerates the use of the File Transfer protocol (FTP).

In one embodiment, the protocol accelerator 234 is configured, constructed or designed to optimize or accelerate a protocol carrying as a payload or using any type and form of markup language. In other embodiments, the protocol accelerator 234 is configured, constructed or designed to optimize or accelerate a HyperText Transfer Protocol (HTTP). In another embodiment, the protocol accelerator 234 is configured, constructed or designed to optimize or accelerate a protocol carrying as a payload or otherwise using XML (eXtensible Markup Language).

Transparency and Multiple Deployment Configurations

In some embodiments, the appliance 200 and/or network optimization engine 250 is transparent to any data flowing across a network connection or link, such as a WAN link. In one embodiment, the appliance 200 and/or network optimization engine 250 operates in such a manner that the data flow across the WAN is recognizable by any network monitoring, QOS management or network analysis tools. In some embodiments, the appliance 200 and/or network optimization engine 250 does not create any tunnels or streams for transmitting data that may hide, obscure or otherwise make the network traffic not transparent. In other embodiments, the appliance 200 operates transparently in that the appliance does not change any of the source and/or destination address information or port information of a network packet, such as internet protocol addresses or port numbers. In other embodiments, the appliance 200 and/or network optimization engine 250 is considered to operate or behave transparently to the network, an application, client, server or other appliances or computing device in the network infrastructure. That is, in some embodiments, the appliance is transparent in that network related configuration of any device or appliance on the network does not need to be modified to support the appliance 200.

The appliance 200 may be deployed in any of the following deployment configurations: 1) in-line of traffic, 2) in proxy mode, or 3) in a virtual in-line mode. In some embodiments, the appliance 200 may be deployed inline to one or more of the following: a router, a client, a server or another network device or appliance. In other embodiments, the appliance 200 may be deployed in parallel to one or more of the following: a router, a client, a server or another network device or appliance. In parallel deployments, a client, server, router or other network appliance may be configured to forward, transfer or transmit networks to or via the appliance 200.

In the embodiment of in-line, the appliance 200 is deployed inline with a WAN link of a router. In this way, all traffic from the WAN passes through the appliance before arriving at a destination of a LAN.

In the embodiment of a proxy mode, the appliance 200 is deployed as a proxy device between a client and a server. In some embodiments, the appliance 200 allows clients to make indirect connections to a resource on a network. For example, a client connects to a resource via the appliance 200, and the appliance provides the resource either by connecting to the resource, a different resource, or by serving the resource from a cache. In some cases, the appliance may alter the client's request or the server's response for various purposes, such as for any of the optimization techniques discussed herein. In one embodiment, the client 102 send requests addressed to the proxy. In one case, the proxy responds to the client in place of or acting as a server 106. In other embodiments, the appliance 200 behaves as a transparent proxy, by intercepting and forwarding requests and responses transparently to a client and/or server. Without client-side configuration, the appliance 200 may redirect client requests to different servers or networks. In some embodiments, the appliance 200 may perform any type and form of network address translation, referred to as NAT, on any network traffic traversing the appliance.

In some embodiments, the appliance 200 is deployed in a virtual in-line mode configuration. In this embodiment, a router or a network device with routing or switching functionality is configured to forward, reroute or otherwise provide network packets destined to a network to the appliance 200. The appliance 200 then performs any desired processing on the network packets, such as any of the WAN optimization techniques discussed herein. Upon completion of processing, the appliance 200 forwards the processed network packet to the router to transmit to the destination on the network. In this way, the appliance 200 can be coupled to the router in parallel but still operate as it if the appliance 200 were inline. This deployment mode also provides transparency in that the source and destination addresses and port information are preserved as the packet is processed and transmitted via the appliance through the network.

End Node Deployment

Although the network optimization engine 250 is generally described above in conjunction with an appliance 200, the network optimization engine 250, or any portion thereof, may be deployed, distributed or otherwise operated on any end node, such as a client 102 and/or server 106. As such, a client or server may provide any of the systems and methods of the network optimization engine 250 described herein in conjunction with one or more appliances 200 or without an appliance 200.

Figure 2B:
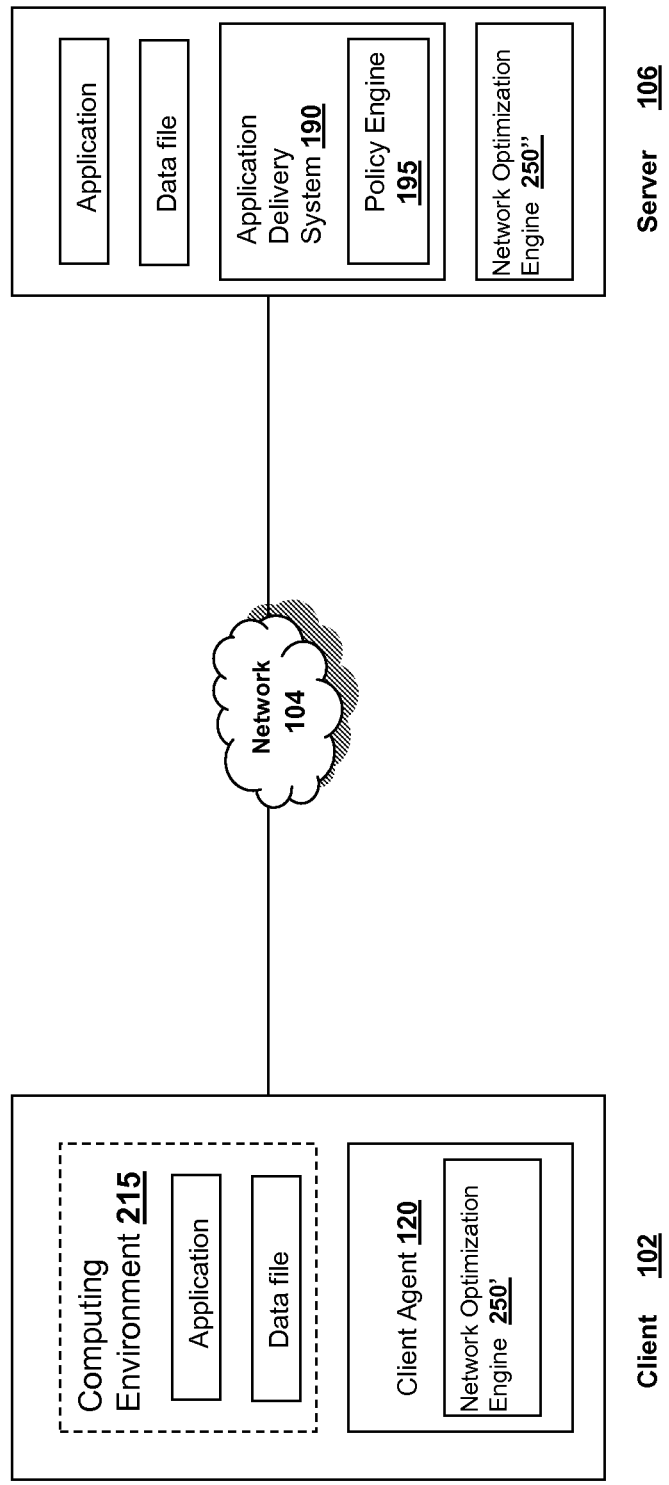
FIG. 2B is a block diagram of another embodiment of a client and/or server deploying the network optimization features of the appliance.

Referring now to FIG. 2B, an example embodiment of the network optimization engine 250 deployed on one or more end nodes is depicted. In brief overview, the client 102 may include a first network optimization engine 250' and the server 106 may include a second network optimization engine 250". The client 102 and server 106 may establish a transport layer connection and exchange communications with or without traversing an appliance 200.

In one embodiment, the network optimization engine 250' of the client 102 performs the techniques described herein to optimize, accelerate or otherwise improve the performance, operation or quality of service of network traffic communicated with the server 106. In another embodiment, the network optimization engine 250" of the server 106 performs the techniques described herein to optimize, accelerate or otherwise improve the performance, operation or quality of service of network traffic communicated with the client 102. In some embodiments, the network optimization engine 250' of the client 102 and the network optimization engine 250" of the server 106 perform the techniques described herein to optimize, accelerate or otherwise improve the performance, operation or quality of service of network traffic communicated between the client 102 and the server 106. In yet another embodiment, the network optimization engine 250' of the client 102 performs the techniques described herein in conjunction with an appliance 200 to optimize, accelerate or otherwise improve the performance, operation or quality of service of network traffic communicated with the client 102. In still another embodiment, the network optimization engine 250" of the server 106 performs the techniques described herein in conjunction with an appliance 200 to optimize, accelerate or otherwise improve the performance, operation or quality of service of network traffic communicated with the server 106.

C. Client Agent

As illustrated in FIGS. 2A and 2B, a client deployed in the system or with an appliance 200 or 205 may include a client agent 120. In one embodiment, the client agent 120 is used to facilitate communications with one or more appliances 200 or 205. In some embodiments, any of the systems and methods of the appliance 200 or 205 described herein may be deployed, implemented or embodied in a client, such as via a client agent 120. In other embodiments, the client agent 120 may include applications, programs, or agents providing additional functionality such as end point detection and authorization, virtual private network connectivity, and application streaming. Prior to discussing other embodiments of systems and methods of the appliance 200, embodiments of the client agent 120 will be described.

Figure 3:
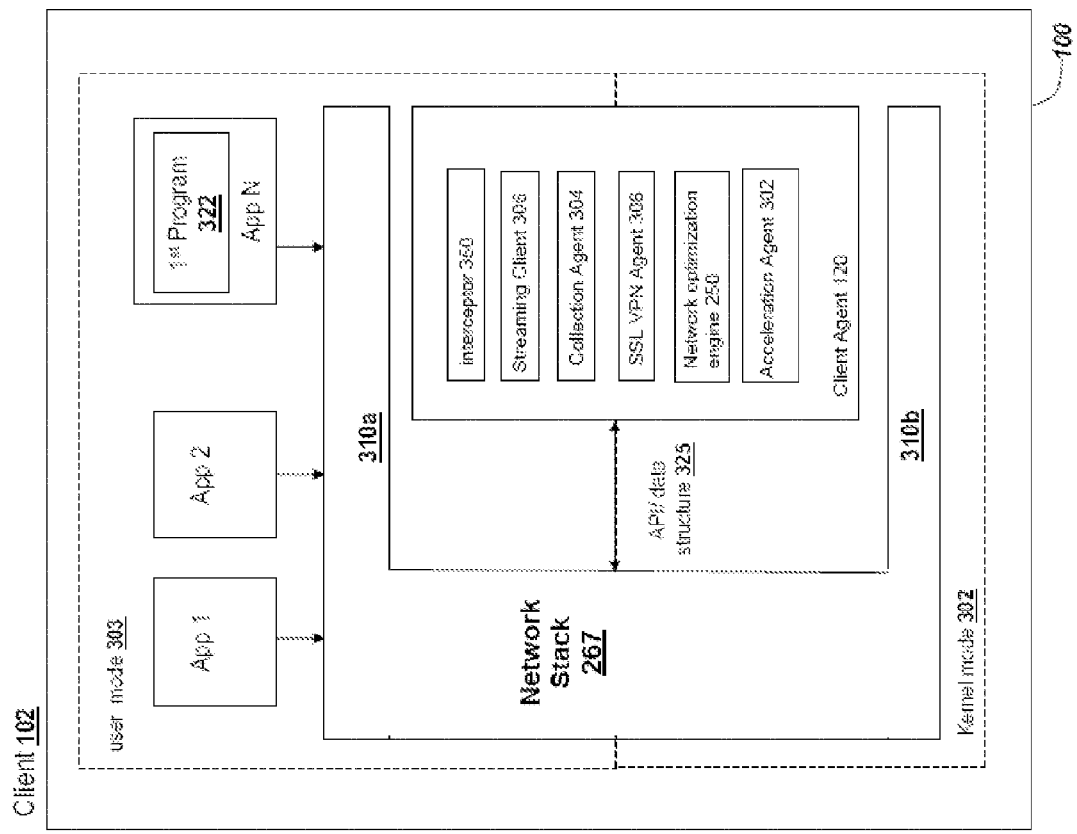
FIG. 3 is a block diagram of an embodiment of a client for communicating with a server using the network optimization feature.

Referring now to FIG. 3, an embodiment of a client agent 120 is depicted. The client 102 has a client agent 120 for establishing, exchanging, managing or controlling communications with the appliance 200, appliance 205 and/or server 106 via a network 104. In some embodiments, the client agent 120, which may also be referred to as a WAN client, accelerates WAN network communications and/or is used to communicate via appliance 200 on a network. In brief overview, the client 102 operates on computing device 100 having an operating system with a kernel mode 302 and a user mode 303, and a network stack 267 with one or more layers 310a-310b. The client 102 may have installed and/or execute one or more applications. In some embodiments, one or more applications may communicate via the network stack 267 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 267 from the one or more applications.

As with the appliance 200, the client has a network stack 267 including any type and form of software, hardware, or any combinations thereof, for providing connectivity to and communications with a network 104. The network stack 267 of the client 102 includes any of the network stack embodiments described above in conjunction with the appliance 200. In some embodiments, the client agent 120, or any portion thereof, is designed and constructed to operate with or work in conjunction with the network stack 267 installed or otherwise provided by the operating system of the client 102.

In further details, the network stack 267 of the client 102 or appliance 200 (or 205) may include any type and form of interfaces for receiving, obtaining, providing or otherwise accessing any information and data related to network communications of the client 102. In one embodiment, an interface to the network stack 267 includes an application programming interface (API). The interface may also have any function call, hooking or filtering mechanism, event or call back mechanism, or any type of interfacing technique. The network stack 267 via the interface may receive or provide any type and form of data structure, such as an object, related to functionality or operation of the network stack 267. For example, the data structure may include information and data related to a network packet or one or more network packets. In some embodiments, the data structure includes, references or identifies a portion of the network packet processed at a protocol layer of the network stack 267, such as a network packet of the transport layer. In some embodiments, the data structure 325 is a kernel-level data structure, while in other embodiments, the data structure 325 is a user-mode data structure. A kernel-level data structure may have a data structure obtained or related to a portion of the network stack 267 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 267 may execute or operate in kernel-mode 302, for example, the data link or network layer, while other portions execute or operate in user-mode 303, such as an application layer of the network stack 267. For example, a first portion 310a of the network stack may provide user-mode access to the network stack 267 to an application while a second portion 310a of the network stack 267 provides access to a network. In some embodiments, a first portion 310a of the network stack has one or more upper layers of the network stack 267, such as any of layers 5-7. In other embodiments, a second portion 310b of the network stack 267 includes one or more lower layers, such as any of layers 1-4. Each of the first portion 310a and second portion 310b of the network stack 267 may include any portion of the network stack 267, at any one or more network layers, in user-mode 303, kernel-mode, 302, or combinations thereof, or at any portion of a network layer or interface point to a network layer or any portion of or interface point to the user-mode 302 and kernel-mode 203.

The interceptor 350 may include software, hardware, or any combination of software and hardware. In one embodiment, the interceptor 350 intercepts or otherwise receives a network communication at any point in the network stack 267, and redirects or transmits the network communication to a destination desired, managed or controlled by the interceptor 350 or client agent 120. For example, the interceptor 350 may intercept a network communication of a network stack 267 of a first network and transmit the network communication to the appliance 200 for transmission on a second network 104. In some embodiments, the interceptor 350 includes or is a driver, such as a network driver constructed and designed to interface and work with the network stack 267. In some embodiments, the client agent 120 and/or interceptor 350 operates at one or more layers of the network stack 267, such as at the transport layer. In one embodiment, the interceptor 350 includes a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 includes a driver complying with the Network Driver Interface Specification (NDIS), or a NDIS driver. In another embodiment, the interceptor 350 may be a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts or receives any transport layer connection requests. In these embodiments, the interceptor 350 executes transport layer application programming interface (API) calls to set the destination information, such as destination IP address and/or port to a desired location for the location. In this manner, the interceptor 350 intercepts and redirects the transport layer connection to an IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may include two agents 120 and 120'. In one embodiment, a first agent 120 may include an interceptor 350 operating at the network layer of the network stack 267. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 267. For example, in one embodiment, the interceptor 350 operates or interfaces with the transport layer of the network stack 267 transparently to any protocol layer below the transport layer, such as the network layer, and any protocol layer above the transport layer, such as the session, presentation or application layer protocols. This allows the other protocol layers of the network stack 267 to operate as desired and without modification for using the interceptor 350. As such, the client agent 120 and/or interceptor 350 interfaces with or operates at the level of the transport layer to secure, optimize, accelerate, route or load-balance any communications provided via any protocol carried by the transport layer, such as any application layer protocol over TCP/IP.

Furthermore, the client agent 120 and/or interceptor 350 may operate at or interface with the network stack 267 in a manner transparent to any application, a user of the client 102, the client 102 and/or any other computing device 100, such as a server or appliance 200, 206, in communications with the client 102. The client agent 120, or any portion thereof, may be installed and/or executed on the client 102 in a manner without modification of an application. In one embodiment, the client agent 120, or any portion thereof, is installed and/or executed in a manner transparent to any network configuration of the client 102, appliance 200, 205 or server 106. In some embodiments, the client agent 120, or any portion thereof, is installed and/or executed with modification to any network configuration of the client 102, appliance 200, 205 or server 106. In one embodiment, the user of the client 102 or a computing device in communications with the client 102 are not aware of the existence, execution or operation of the client agent 12, or any portion thereof. As such, in some embodiments, the client agent 120 and/or interceptor 350 is installed, executed, and/or operated transparently to an application, user of the client 102, the client 102, another computing device, such as a server or appliance 200, 2005, or any of the protocol layers above and/or below the protocol layer interfaced to by the interceptor 350.

The client agent 120 includes a streaming client 306, a collection agent 304, SSL VPN agent 308, a network optimization engine 250, and/or acceleration program 302. In one embodiment, the client agent 120 is an Independent Computing Architecture (ICA) client, or any portion thereof, developed by Citrix Systems, Inc. of Fort Lauderdale, Fla., and is also referred to as an ICA client. In some embodiments, the client agent 120 has an application streaming client 306 for streaming an application from a server 106 to a client 102. In another embodiment, the client agent 120 includes a collection agent 304 for performing endpoint detection/scanning and collecting end-point information for the appliance 200 and/or server 106. In some embodiments, the client agent 120 has one or more network accelerating or optimizing programs or agents, such as a network optimization engine 250 and an acceleration program 302. In one embodiment, the acceleration program 302 accelerates communications between client 102 and server 106 via appliance 205'. In some embodiments, the network optimization engine 250 provides WAN optimization techniques as discussed herein.

The streaming client 306 is an application, program, process, service, task or set of executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 is an application, program, process, service, task or set of executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 is an endpoint detection and scanning program, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or version of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

The SSL VPN agent 308 is an application, program, process, service, task or set of executable instructions for establishing a Secure Socket Layer (SSL) virtual private network (VPN) connection from a first network 104 to a second network 104', 104", or a SSL VPN connection from a client 102 to a server 106. In one embodiment, the SSL VPN agent 308 establishes a SSL VPN connection from a public network 104 to a private network 104' or 104". In some embodiments, the SSL VPN agent 308 works in conjunction with appliance 205 to provide the SSL VPN connection. In one embodiment, the SSL VPN agent 308 establishes a first transport layer connection with appliance 205. In some embodiment, the appliance 205 establishes a second transport layer connection with a server 106. In another embodiment, the SSL VPN agent 308 establishes a first transport layer connection with an application on the client, and a second transport layer connection with the appliance 205. In other embodiments, the SSL VPN agent 308 works in conjunction with WAN optimization appliance 200 to provide SSL VPN connectivity.

In some embodiments, the acceleration program 302 is a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

In one embodiment, the acceleration program 302 is designed, constructed or configured to work with appliance 205 to provide LAN side acceleration or to provide acceleration techniques provided via appliance 205. For example, in one embodiment of a NetScaler appliance 205 manufactured by Citrix Systems, Inc., the acceleration program 302 includes a NetScaler client. In some embodiments, the acceleration program 302 provides NetScaler acceleration techniques stand-alone in a remote device, such as in a branch office. In other embodiments, the acceleration program 302 works in conjunction with one or more NetScaler appliances 205. In one embodiment, the acceleration program 302 provides LAN-side or LAN based acceleration or optimization of network traffic.

In some embodiments, the network optimization engine 250 may be designed, constructed or configured to work with WAN optimization appliance 200. In other embodiments, network optimization engine 250 may be designed, constructed or configured to provide the WAN optimization techniques of appliance 200, with or without an appliance 200. For example, in one embodiment of a WANScaler appliance 200 manufactured by Citrix Systems, Inc. the network optimization engine 250 includes the WANscaler client. In some embodiments, the network optimization engine 250 provides WANScaler acceleration techniques stand-alone in a remote location, such as a branch office. In other embodiments, the network optimization engine 250 works in conjunction with one or more WANScaler appliances 200.

In another embodiment, the network optimization engine 250 includes the acceleration program 302, or the function, operations and logic of the acceleration program 302. In some embodiments, the acceleration program 302 includes the network optimization engine 250 or the function, operations and logic of the network optimization engine 250. In yet another embodiment, the network optimization engine 250 is provided or installed as a separate program or set of executable instructions from the acceleration program 302. In other embodiments, the network optimization engine 250 and acceleration program 302 are included in the same program or same set of executable instructions.

In some embodiments and still referring to FIG. 3, a first program 322 may be used to install and/or execute the client agent 120, or any portion thereof, automatically, silently, transparently, or otherwise. In one embodiment, the first program 322 is a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 is designed and constructed to install the client agent 120. In some embodiments, the first program 322 obtains, downloads, or receives the client agent 120 via the network from another computing device. In another embodiment, the first program 322 is an installer program or a plug and play manager for installing programs, such as network drivers and the client agent 120, or any portion thereof, on the operating system of the client 102.

In some embodiments, each or any of the portions of the client agent 120—a streaming client 306, a collection agent 304, SSL VPN agent 308, a network optimization engine 250, acceleration program 302, and interceptor 350—may be installed, executed, configured or operated as a separate application, program, process, service, task or set of executable instructions. In other embodiments, each or any of the portions of the client agent 120 may be installed, executed, configured or operated together as a single client agent 120.

D. Systems and Methods for Using Transaction Boundaries to Prioritize Traffic

Figure 4:
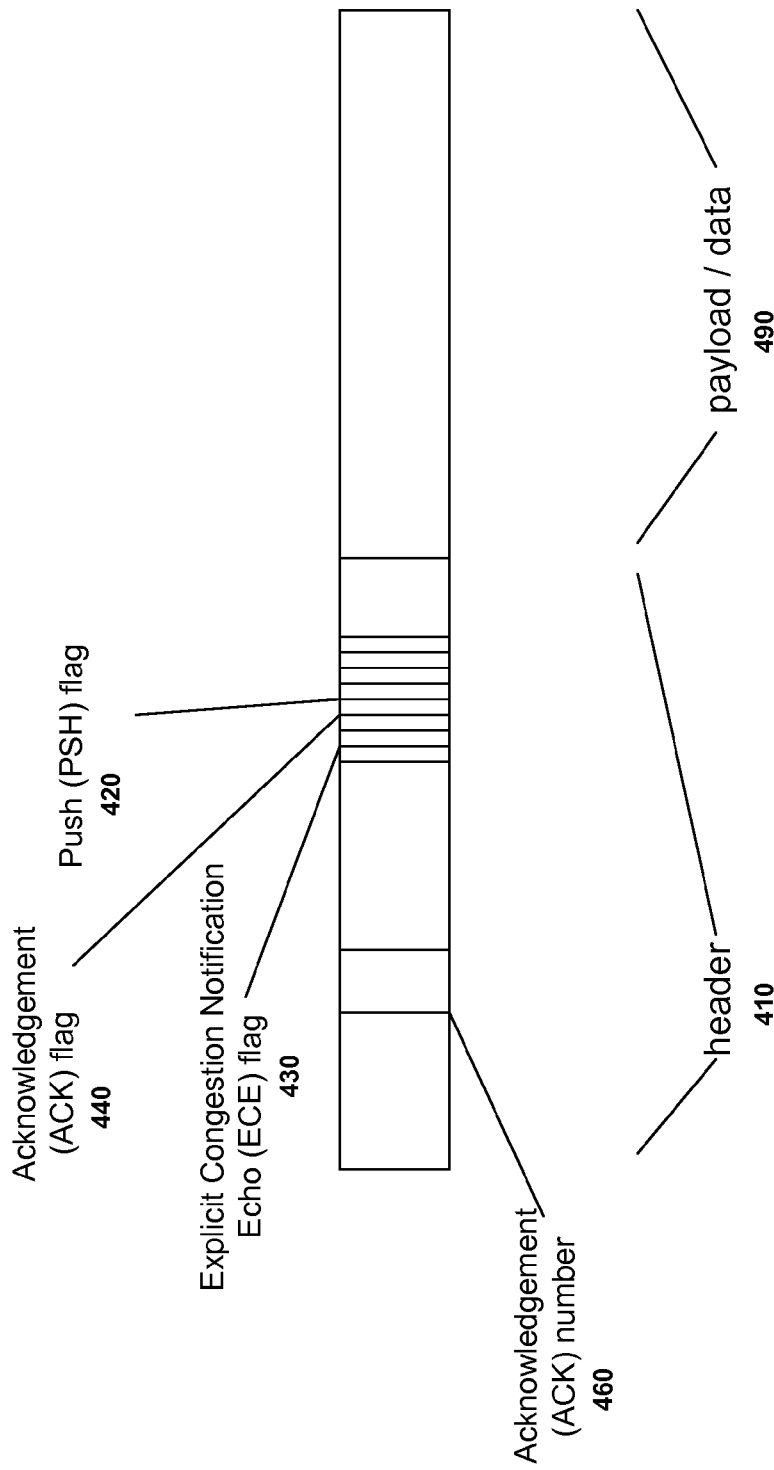
FIG. 4 is a block diagram of a sample TCP packet.

Now referring to FIG. 4, a sample TCP packet is shown. In brief overview, a TCP packet comprises a header 410 and payload 490. The header 410 comprises a number of indications which may be used to indicate transmission events related to data communications and network congestion, including an ACK number 460, Explicit Congestion Notification Echo (ECE flag), ACK flag 440, and Push (PSH) flag 420.

Still referring to FIG. 4, the sample TCP packet is shown to graphically illustrate some of the information that may be included in a TCP packet. Although the sample shown reflects a particular embodiment of a TCP packet, persons of ordinary skill in the art will recognize that many implementations and variations of TCP and other network protocols may be applicable to the systems and methods described herein, including the TCP implementations specified in RFC 793, RFC 1122, and specifically RFC 2581 and RFC 3168 relating to congestion control and avoidance. In some of these implementations and others, an ECE flag may be utilized to notify the packet recipient that network congestion is occurring. The packet recipient may then elect to slow down their rate of transmission or adopt any other congestion control or avoidance tactics. This ECE flag may also be used in combination with other signaling bits which negotiate with a recipient whether Explicit Congestion Notification (ECN) is supported. Any bits in any protocol used in the negotiation or signaling of explicit congestion may be referred to as ECN bits.

Figure 5A:
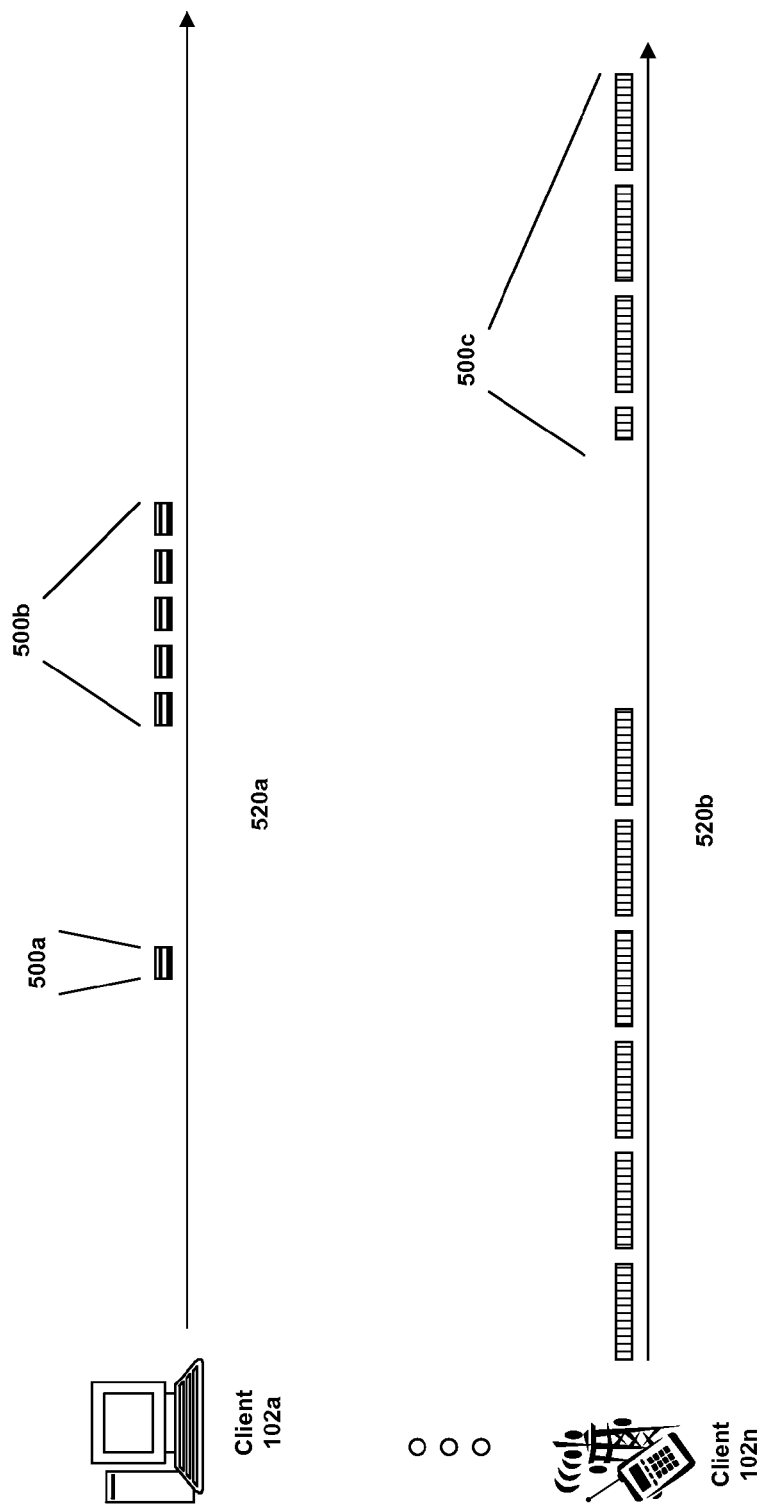
FIG. 5 is an illustration of a number of clients transmitting packet groups which may classified as transactions

Referring now to FIG. 5, an illustration of a number of clients transmitting packet groups which may be classified as transactions is shown. In brief overview, each client 102 is transmitting a number of packets via a connection 520. The packets may comprise any type of packet and may comprise any protocol or protocols. In one example, the packets may comprise network-layer packets, such as IP packets. In another example, the packets may comprise transport layer packets, such as TCP or UDP packets. The connections may comprise any type of connection and may be transmitted via any network. The packets may be divided into groups corresponding to transactions, as previously discussed herein, using any method.

Still referring to FIG. 5, now in greater detail, in many cases it may be useful to identify groups of packets comprising transactions. Broadly speaking, a transaction comprises a set of packets for which receipt of the entire set of packets is required before a subsequent transmission can begin. In some cases, a transaction may comprise a set of packets which must be successfully received before the recipient can begin sending a response. An example of this case may be an HTTP request where a server must receive the entire HTTP request before the server can begin transmitting the HTTP response. In other cases, a transaction may comprise a set of packets which must be successfully received before the sender of the packets can send a subsequent transmission. In some cases, a transaction-heavy communication stream may exhibit "ping pong" behavior, in that each side must wait for a response from the other side before beginning a next transmission.

A device may detect a transaction and/or transaction boundary using any technique. In some embodiments, the device may have specific knowledge of one or more application protocols which allow a device to detect transaction boundaries. In other embodiments, the device may detect a transaction boundary without specific knowledge of the application generating the transactions.

In one embodiment, a device may use time-based methods for detecting a transaction boundary. If the sender has been sending data and ceases then, after a period of time of inactivity, the device may decide that a transaction boundary has been indicated. A device may require any time interval to pass before declaring a transaction boundary. In some embodiments, the time interval may be an absolute time interval, including without limitation 1 ms, 2 ms, 5 ms, 10 ms, 20 ms, 30 ms, 50 ms, 100 ms, 200 ms, 500 ms and 1 second. In other embodiments, the time interval may be a time interval relative to previous packet delays. For example, if a connection has an average packet spacing of 5 ms, a spacing of greater than 10 ms may indicate a transaction boundary. For example, in connection 520a, the long delay between the group of packets 500b and 500a may indicate a transaction boundary. This time-based method may be used to identify transaction boundaries in connections using an unknown or encrypted protocol.

In other embodiments, a device may use explicit signals contained in the packets to determine transaction boundaries. For example, the setting of the PSH (TCP Push) bit by the sender in a TCP header of a packet may indicate a transaction boundary. Or for example, opening and closing of a TCP connection may also mark transaction boundaries. In some cases, a device may combine the time-based approach with these additional heuristics for detection of a transaction boundary. In another technique, if the device 220 understands the application protocol, it can parse the protocol data stream and directly determine transaction boundaries. In some embodiments, this last behavior can be used independent of any time-based mechanism. For example, a device may identify that a given packet is the last packet (or only packet) of a remote procedure call. Or a device may identify that a packet is the last packet of an HTTP request.

In still other embodiments, a device may detect a transaction boundary by comparing a packet to a maximum packet size for the connection. If a packet size is below the maximum packet size for the connection, it may indicate that the sender is not transmitting a full size packet because the sender cannot send any more data until that smaller packet is received and/or responded to. A device may determine the maximum packet size for a connection via any means, including prior configuration and analysis of one or more previous packets sent via the connection. For example, in connection 520b, a device may detect a transaction 500c after receiving a number of full size packets followed by a shorter packet. In still other embodiments, a device may detect a case where a packet is smaller than a preceding packet and mark those cases as indicating transaction boundaries. In some embodiments, these methods may allow detection of transaction boundaries before a device can determine whether the shorter packet is followed by a delay in transmission. These methods may also be used to identify transaction boundaries in connections using an unknown or encrypted protocol. In other embodiments, these techniques may be combined with one or more of the other techniques for determining transaction boundaries.

In another embodiment, a device may detect a transaction boundary by detecting whether one or more buffers corresponding to the connection have transitioned from full to empty. For example, a device may have a number of input buffers corresponding to data received via a number of connections. If one of the input buffers becomes empty, the device may determine that the last packet received via the connection is the last packet of a transaction. In some cases, monitoring buffer states may serve as a method of detecting gaps in packet arrival times, and thus provide similar functionality to the time-based method of transaction boundary detection. Buffer transitions from empty to full can also be used to demarcate the beginnings of transactions.

Figure 5B:
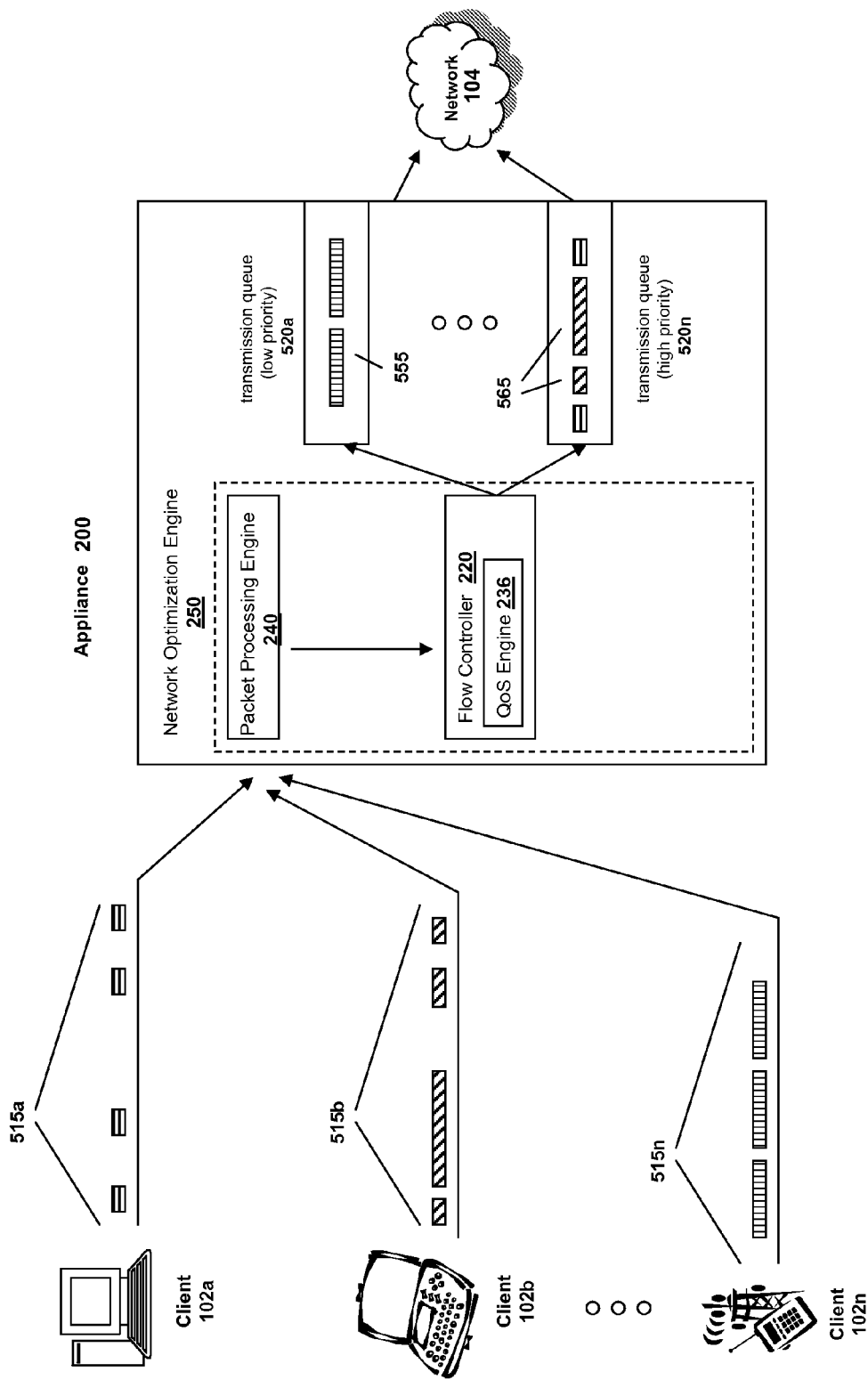

Now referring to FIG. 5B, a block diagram of a system for prioritizing, based on transaction size, packets awaiting transmission from an intermediary device is shown. In brief overview, an appliance 200 receives packet streams from a number of clients 102 via a number of connections 515. A flow controller 220 and QoS engine 236 sort the received packets into a number of transmission queues of high or low priority where they await transmission out via network 104. The appliance may prioritize packets corresponding to smaller transaction sizes higher than packets corresponding to larger transaction sizes. This system will be described in greater detail with respect to FIG. 6, which depicts a method that may be used by the system shown.

Figure 6:
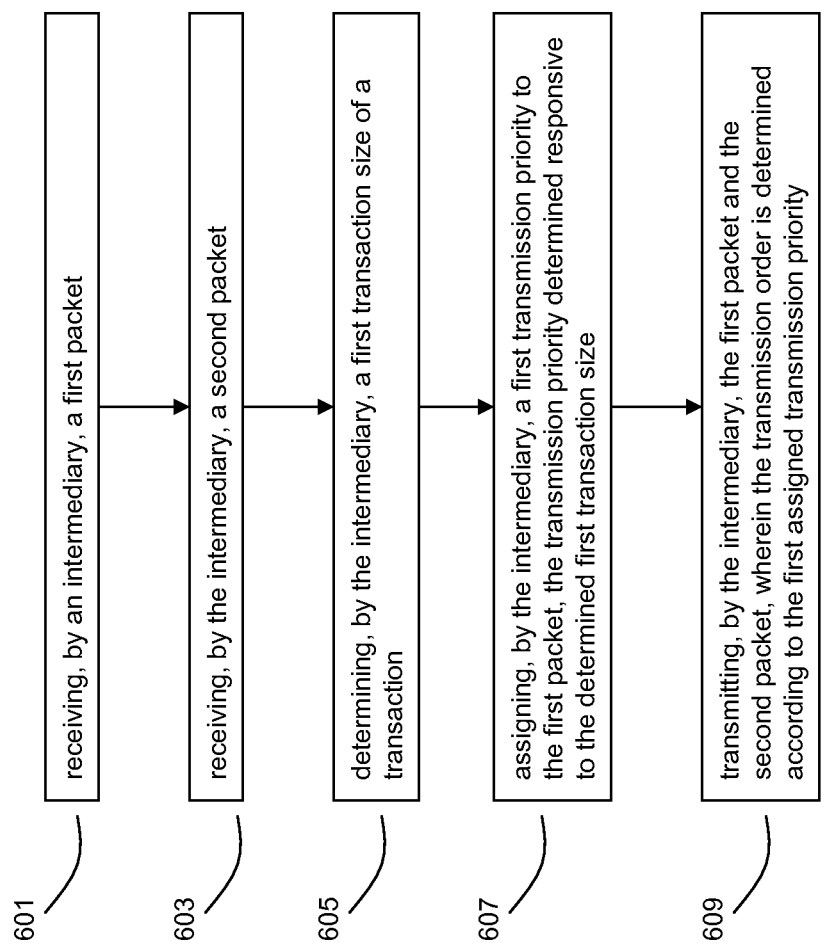
FIG. 6 is a flow diagram of a method for prioritizing, based on transaction size, packets awaiting transmission from an intermediary device.

Now referring to FIG. 6, a method for prioritizing, based on transaction size, packets awaiting transmission from an intermediary device is shown. In brief overview, the method comprises receiving, by an intermediary, a first packet (step 601); and receiving, by the intermediary, a second packet (step 603). The intermediary may then determine a first transaction size of a transaction (step 605); and assigning, a first transmission priority to the first packet, the transmission priority determined responsive to the determined first transaction size (step 607). The intermediary may then transmit the first packet and the second packet, wherein the transmission order is determined according to the first assigned transmission priority (step 609).

Still referring to FIG. 6, now in greater detail, an intermediary may receive a first packet in any manner (step 601). In some embodiments, the intermediary may comprise one of a client 102, client agent 120, server 106, server agent, or network appliance. In one embodiment, an intermediary for a plurality of transport layer connections may receive a first packet via a first transport layer connection of the plurality of transport layer connections. In some cases, the plurality of transport layer connections may all comprise the same transport layer protocol. In other cases, the plurality of transport layer connections may comprise a plurality of transport layer protocols. For example, the intermediary may be a client agent serving as an intermediary for a number of TCP connections from a client to a server. Or, for example, the intermediary may be a network appliance serving as a transparent proxy for a number of TCP connections from a number of clients to a number of servers. The received first packet may comprise any transport layer protocol including, without limitation, TCP and UDP.

The intermediary may receive a second packet in any manner (step 603). In some embodiments, the intermediary may receive the second packet via a second transport layer connection of a plurality of transport layer connections. The second packet may be received before, after, or simultaneously with the first packet. In some embodiments, the second packet may share a source and/or destination with the first packet. In other embodiments, the second packet may comprise a different source and destination.

The intermediary may determine a first transaction size of a transaction in any manner (step 605). In some embodiments, the first transaction size may be the transaction size of a transaction comprising the first packet. In other embodiments, the first transaction size may be a transaction size of another transaction related to the first packet, such as a transaction immediately preceding the first packet via the same connection as the first packet. In some embodiments, the intermediary may use one or more of any of the transaction and transaction boundary detection techniques described herein including, without limitation, time-based methods, PSH bit detection, packet size analysis, and buffer monitoring. A transaction size may be measured by any metric, including, without limitation, the total number of bytes comprising the transaction, the total number of packets comprising the transaction, or the elapsed time from the beginning to the end of the transaction. In one embodiment, an intermediary may determine a transaction size by storing, with respect to a given connection, a value which is set to zero at the start of each transaction. As more packets are received via the connection, the value may then be incremented with the number of bytes sent via the connection until a transaction boundary ending is detected. In another embodiment, an intermediary may determine a transaction size by storing, with respect to a given connection, a timestamp of a transaction start. After detecting a transaction ending boundary, the intermediary may compute the elapsed time between the ending boundary and the timestamp. In some embodiments, the intermediary may cap transaction sizes at a given amount. For example, an intermediary may treat all transactions of longer than 10 KB as if they were 10 KB transactions. Or for example, an intermediary may treat all transactions of longer than 1 second as 1 second transactions.

In some embodiments, the intermediary may determine an average transaction size for the first transport layer connection. This average may comprise any type of average, including, without limitation, a mean, median, or mode. An average transaction size may be computed in any manner. In some embodiments, an intermediary may maintain a rolling average of transaction sizes for a given connections. In other embodiments, an intermediary may compute an average transaction size for a connection by computing an average transaction size for a sample set of the data sent via the connection. For example, an intermediary may compute an average transaction size for transactions sent during the first minute of a connection. This average may be periodically updated with later samples as well. In another embodiment, an intermediary may track the total number of bytes sent via a connection and divide this total by the total number of detected transactions to determine an average transaction size.

In one embodiment, the intermediary may also determine a second transaction size of a transaction comprising the second packet in any manner. This transaction size may be determined using any of the above techniques. In one embodiment, the intermediary may determine an average transaction size with respect to the second connection. In some embodiments, the same method may be used to determine the first and second transaction sizes.

The intermediary may assign, to the first packet, a transmission priority based on the determined first transaction size in any manner (step 607). In one embodiment, higher transmission priorities may be assigned to packets corresponding to smaller transaction sizes. This embodiment may be used to provide QoS to one or more bursty connections, such as VoIP or videoconferencing traffic. In one example, an intermediary may assign high priority to transactions less than 256 bytes long, normal priority to transactions between 257 and 1280 bytes long, and high priority to transactions above 1280 bytes. In some embodiments, the transmission priority may be responsive to both a transaction size and a pre-existing priority. For example, an intermediary may compute a packet priority by incrementing a connection priority in response to the determined transaction size. In other embodiments, the transmission priority may be responsive to both a determined transaction size and a predetermined bandwidth threshold. For example, an intermediary may prioritize high priority to smaller transactions unless or until the connection sending the small transaction has exceeded a given bandwidth limit. The intermediary may then reduce the priority of subsequent small transaction sent via the connection until the bandwidth used by the connection drops below an acceptable threshold.

In some embodiments, the intermediary may assign a priority to the second packet in a similar manner to the assigning of priority to the first packet. In other embodiments, no priority may be assigned to the second packet.

The intermediary may then transmit the first and second packet in any manner, wherein the transmission order is determined according to an assigned transmission priority (step 609). In one embodiment, the intermediary may place the first and second packet into prioritized transmission queues as depicted in FIG. 5B. For example, the packets sent via connections 515a and 515b are placed in a high priority queue as they correspond to smaller transaction sizes. The packets corresponding to connection 515n are placed in a low priority queue as they correspond to a single, longer transaction. To give another example, in a situation in which three connections, A, B, and C have transactions queued for sending, and the transactions are 3, 2, and 1 packets long, respectively. The packets may then be sent in the order C B B A A A. This may be contrasted with a round-robin approach, which might send A B C A B A. In this example, a potential benefit of transaction-based prioritization can clearly be seen. Transactions C and B each finish two packets sooner than they would have under the round robin approach, while transaction A is unaffected.

In another embodiment, the first and second packets may be placed in a single queue, and the order within the queue may be determined by the relative priority of the packets. In some embodiments, a transmission queue may be reordered in response to receiving a subsequent transaction. In these embodiments, an intermediary may insert a newly received transaction ahead of larger transactions waiting to be transmitted. For example, if a transmission queue currently comprises D E E E F F F F, where D, E, and F are packets from transactions of 1, 3, and 4 bytes, respectively, and a transaction G G is received, the queue may be modified to D G G E E F F F F. In some embodiments, a single queue may be combined with one or more timers so that packets corresponding to longer transmissions are not held up by shorter transactions indefinitely. In still other embodiments, an intermediary may maintain multiple queues according to given priorities, and order packets within each queue according to relative priorities within the queue. For example, an intermediary may maintain a high priority queue for transactions of less than 200 bytes, and a normal priority queue for all other transactions. Within each queue, the transaction may then be ordered according to their respective sizes.

In some embodiments, any of the above methods may be used to provide QoS. For example, the above methods may be used to prioritize real-time traffic, which may be characterized by short bursty transactions, over file downloading, which may be characterized by long, continuous transactions. In another example, the above methods may be used to prioritize remote procedure calls and other interactive applications over non-interactive traffic.

E. Systems and Methods for Reducing Timeout Penalties

Figure 7A:
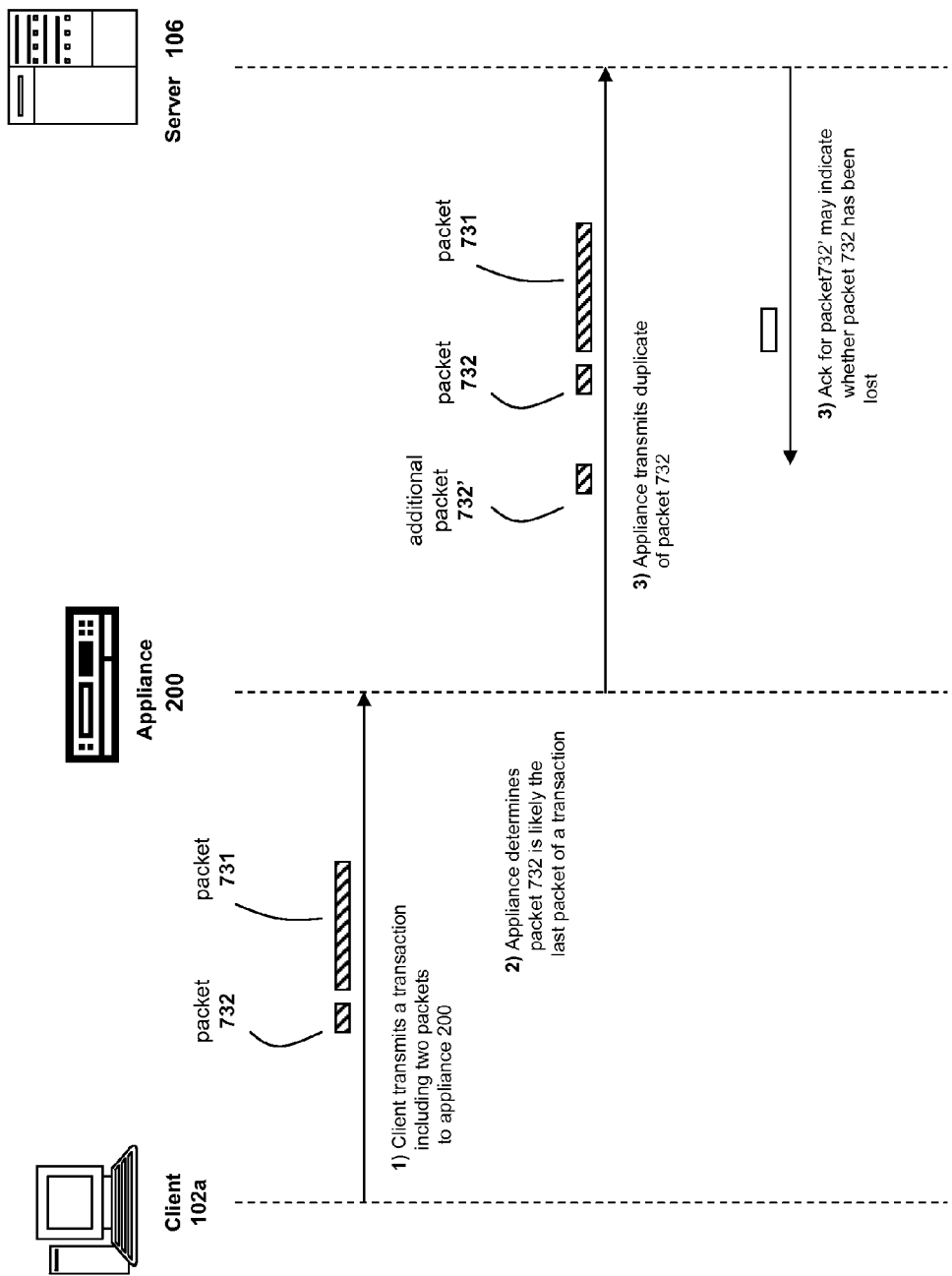
FIGS. 7A and 7B depict systems and methods for using transaction boundaries to reduce timeout penalties.
Figure 7B:
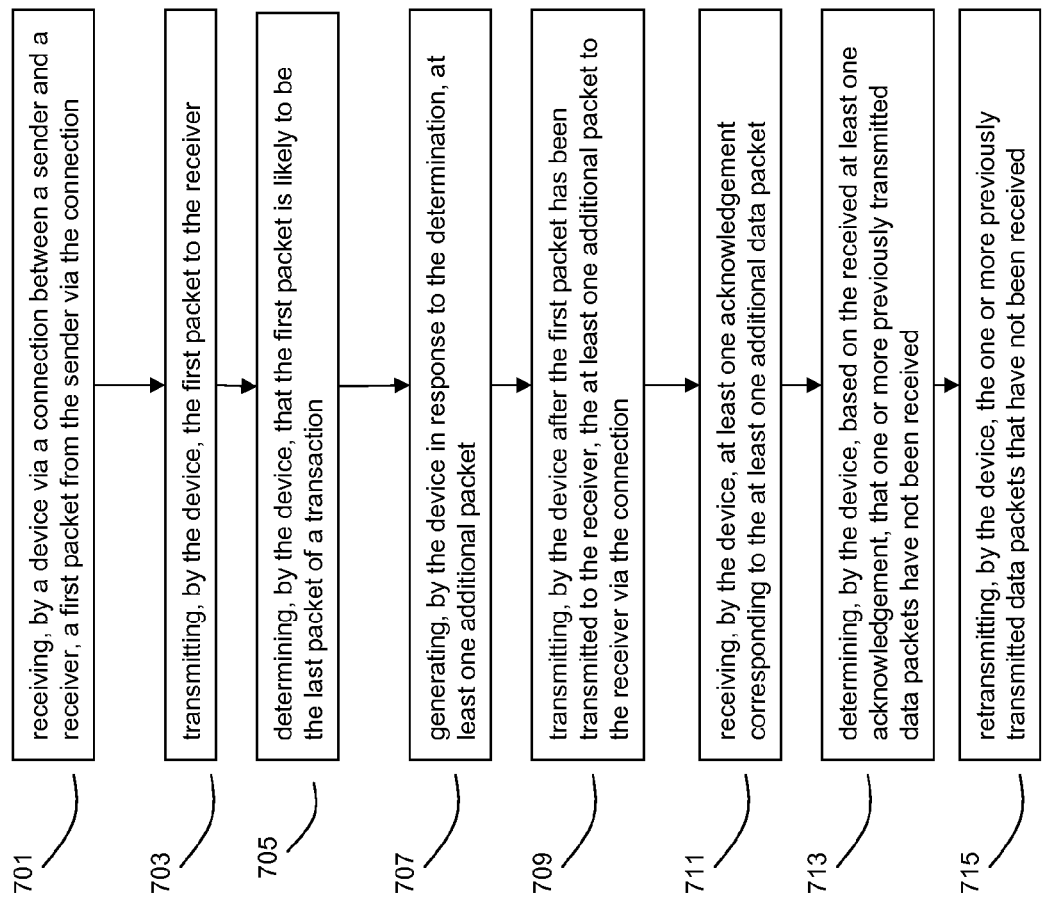

Referring now to FIGS. 7A and 7B, systems and methods for using transaction boundaries to reduce timeout penalties are shown. In brief overview, after detecting a transaction boundary, a device may generate and transmit an additional packet following the transmission of the transaction. The additional packet may be configured to generate an ACK from the receiver which will indicate whether the last packet of the transaction was successfully received. Many protocols, such as TCP, may use a retransmission timeout (RTO) to discover and correct cases where the last packet of a transaction has been dropped. However, RTOs may provide only coarse control over delays induced by packet losses. In some protocols, RTOs can be very expensive, such as TCP, where the RTO is by default a full second. The systems and methods of FIGS. 7A and 7B may be used to attempt to avoid such RTO delays by early discovery of dropped last packets.

Referring now to FIG. 7B, a method for reducing transmission timeouts by selectively transmitting additional packets from an intermediary device based on identifying transaction boundaries is shown. In brief overview, the method comprises receiving, by a first device, a first packet from a sender (step 701). The first device transmits the first packet to a receiver (step 703), and determines that the first packet is likely to be the last packet of a transaction (step 705). The first device then generates, responsive to the determination, at least one additional packet (step 707); and transmits the additional packet to the receiver after the first packet has been transmitted (step 709). The first device may then receive an acknowledgement corresponding to the additional packet (step 711), determine that a previously transmitted data packet has not been received (step 709), and retransmit the data packets not received (step 711).

Still referring to FIG. 7B, now in greater detail, a device may receive a first packet from a sender via any means (step 701). The device may comprise any computing device, including a client, server, client agent, server agent, or appliance. The sender may also comprise any computing device. In some cases the sender may be a client and the device may be a client agent executing on the client. The first packet may be received by any connection, including without limitation a transport layer connection such as a TCP or UDP connection. In some embodiments, the device may be serving as a transparent proxy for the connection. In other embodiments, the device may be performing one or more acceleration functions for the connection.

The first device may then transmit the first packet to a receiver via any means (step 703). In some embodiments, the first device may transmit the first packet via a transport layer connection such as a TCP or UDP connection. The receiver may also comprise any computing device. In some embodiments, either the sender or the receiver may be connected to the device by a WAN. In some embodiments, the appliance may determine to use the method shown based on a determination that one of the sender or receiver is connected to the device via a WAN.

The first device may determine that the first packet is likely to be the last packet of a transaction via any means (step 705). The first device may use any one or more of the transaction boundary techniques described herein. In some embodiments, the first device may determine that the first packet is smaller than a previously transmitted packet or a maximum packet size. In other embodiments, the first device may detect that a buffer corresponding to the connection has transitioned from non-empty to empty.

The first device may then send, in response to the determination, at least one additional packet (step 707). The additional packet may comprise any type of packet and may comprise any payload. In some embodiments, the additional packet may comprise a duplicate of the first packet. In other embodiments, the additional packet may comprise a duplicate of a portion of the first packet. In still other embodiments, the additional packet may be generated according to any forward error-correction techniques. In some cases, the device may send multiple additional packets. For example, if the connection has a high loss rate, the device may send a plurality of duplicate packets.

In some embodiments, the device may include any additional factors in the decision to transmit one or more additional factors. These factors may include, without limitation the connection loss rate, latency, available bandwidth, current load on the device, and a priority or QoS level assigned to the connection.

The first device may transmit, after the first packet has been transmitted to the receiver, the at least one additional packet to the receiver via the connection in any manner (step 709). The device may wait any time interval after the transmission of the first packet before sending the additional packet. In one embodiment, the device may transmit the additional packet immediately following the first packet. In another embodiment, the device may wait a period of time such that the first packet and the additional packet are unlikely to both be lost in a single loss event.

The additional packet may be configured in any way to generate an acknowledgement from the receiver. In some embodiments, the additional packet may comprise a TCP packet intended to provoke a TCP acknowledgement.

The first device may then receive an acknowledgement corresponding to the additional packet (step 711) and determine that one or more previously transmitted data packets have not been received (step 713). The received acknowledgement may comprise any type of acknowledgement and may contain any indication that a data packet has not been received. In some embodiments, the received acknowledgement may comprise a duplicate TCP acknowledgement. In some cases, the received acknowledgement may indicate that the first data packet was not received. In other cases, the received acknowledgement may indicate that one or more other data packets was not received.

The first device may then retransmit the packet or packets that were not received (step 715). In some embodiments, the first device may also transmit one or more additional packets after the retransmissions. In other embodiments, the first device may transmit an indication to the sender indicating the dropped packets so that the sender can retransmit the dropped packets.

Figure 8A:
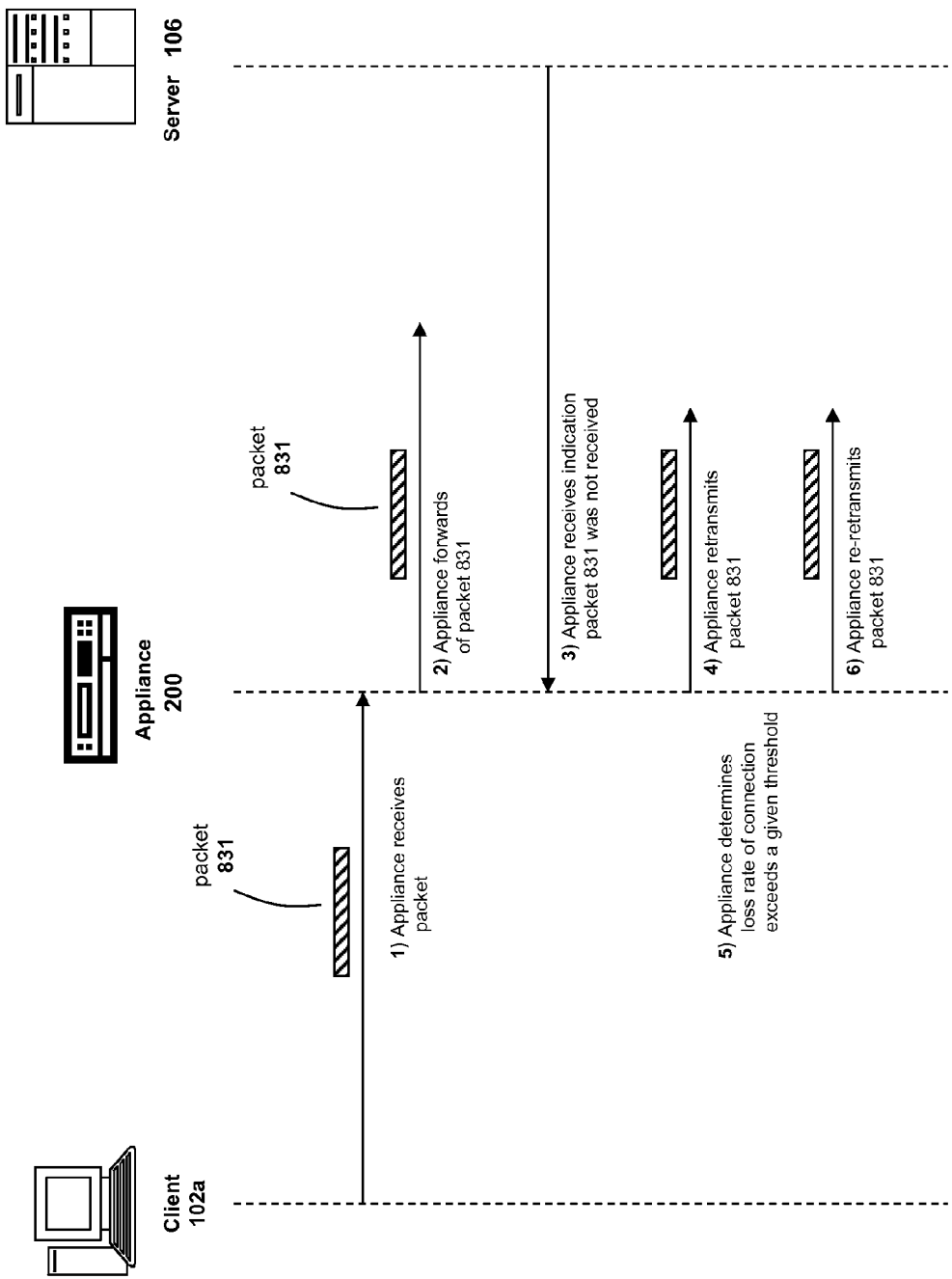
FIGS. 8A and 8B depict systems and methods for retransmitting network packets between a sender and a receiver to reduce retransmission costs associated with a transport layer connection The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.
Figure 8B:
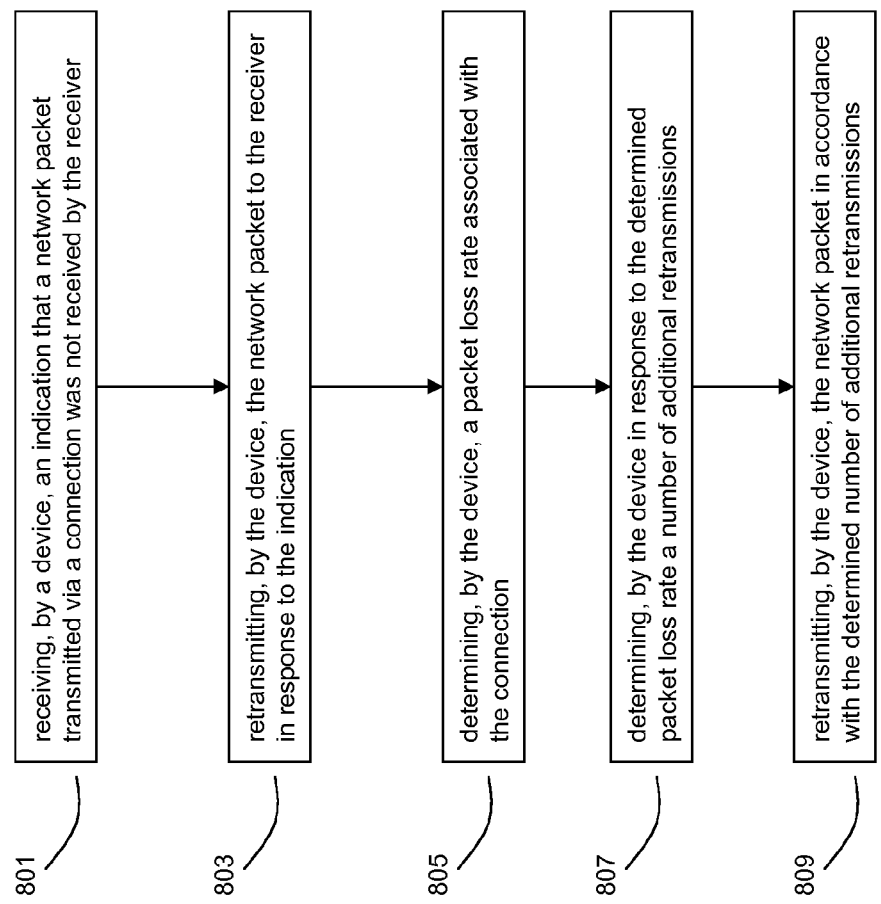

Referring now to FIGS. 8A and 8B, systems and methods for retransmitting network packets between a sender and a receiver to reduce retransmission costs associated with a connection are depicted. In many protocols, including, for example, TCP, use retransmissions as one means for providing a reliable data stream. In addition to standard retransmission delays, extra delays may be incurred when a retransmitted packet is also dropped. In some cases, the dropping of a retransmitted packet may cause a delay equal to a full RTT. The systems and methods shown may be used to reduce the likelihood of these additional performance penalties. In brief overview, a device, which may be an appliance 200, receives and forwards a packet. Upon receiving an indication that the packet was not received, the appliance retransmits the packet and also determines whether the loss rate of the connection exceeds a given threshold. If the loss rate does exceed the threshold, the appliance may then re-retransmit the dropped packet. This re-retransmission may be performed prior to receiving any indication that the retransmitted packet was lost.

Referring now to FIG. 8B, a method for retransmitting network packets between a sender and a receiver to reduce retransmission costs associated with a connection is shown. In brief overview, the method comprises receiving, by a device, an indication that a network packet transmitted via a connection was not received by the receiver (step 801); and retransmitting, by the device, the network packet to the receiver in response to the indication (step 803). The device may determine a packet loss rate associated with the connection (step 805). The device may then determine, in response to the determined packet loss rate, a number of additional retransmissions (step 807); and retransmit the network packet in accordance with the determined number of additional retransmissions (step 809).

Still referring to FIG. 8B, a device may receive an indication that a packet transmitted via the transport layer connection was not received by the receiver (step 801). The device may comprise any computing device, including a client, server, client agent, server agent, or appliance. The receiver may also comprise any computing device. In one embodiment, the connection may comprise a transport layer connection. In some embodiments, the connection may comprise a TCP connection and the packet may comprise a TCP packet. In these embodiments, the indication may comprise one or more duplicate acknowledgements indicating that the packet was not received. In other embodiments, the device may receive any other type of indication.

The device may then retransmit the network packet to the receiver in any manner (step 803). The device may retransmit the network packet via any protocol or protocols. In some embodiments, the device may also send an indication to the sender of the packet indicating the packet loss event.

The device may determine a packet loss rate associated with the connection in any manner (step 805). A packet loss rate may reflect any packet loss events, including packets dropped, lost, corrupted, or otherwise unsuccessfully received. In some embodiments, the packet loss rate may be computed based on statistics relating to the individual connection. In these embodiments, the device may compute a loss rate based on a total of packets sent via the connection divided by the total number of packet losses. Alternatively, the device may compute a packet loss rate by computing a packet loss rate for a subset or a number of subsets of packets transmitted via the connection. In other embodiments, the packet loss rate may be computed with respect to a number of connections traveling over a similar network. For example, an appliance connected to a WAN may compute an average packet loss rate for all traffic over the WAN. Or an appliance connected to a wireless network may compute an average loss rate for all traffic traversing the wireless network. In still other embodiments, the packet loss rate may be manually configured.

The device may determine, in response to the determined loss rate, a number of additional retransmissions. Additional retransmissions indicate the number of extra times the packet will be retransmitted before receiving an indication that the first retransmitted packet was not received. In some embodiments, if the loss rate is above a given threshold, the device may determine an additional retransmission is necessary. For example, if the packet loss rate is above 5%, the device may determine to use 1 additional retransmission. Or, for example, if the packet loss rate is above 10%, the device may determine to use 2 additional retransmissions. The device may determine and use any number of additional retransmissions, including 0, 1, 2, 3, 4, and 5. The loss rate threshold may comprise any number or percentage of packets lost, including without limitation 1%, 2%, 3%, 5%, 8%, 10% and 20%.

In some embodiments, the device may determine the number of additional retransmissions in response to one or more factors in addition to the loss rate. These additional factors may include, without limitation connection bandwidth, connection latency, a transaction size associated with the connection, a protocol associated with the connection, and/or a priority or QoS associated with the connection. For example, the device may determine that for low priority connections, no additional retransmissions will be done regardless of loss rate. Or, for example, the device may determine that for normal priority connections the connection loss rate must exceed 8% for an additional retransmission to be used, while for high priority connections the loss rate must only exceed 2% before an additional retransmission is used. In another example, protocols with low latency tolerances may be accorded higher numbers of additional retransmissions. In this example, protocols associated with VoIP or other real-time applications may be prioritized so that the extra delays associated with traditional methods of retransmitting may be avoided. In still another example, the device may determine a transaction size associated with the dropped packet, and compute the number of retransmissions accordingly. In this example, smaller transaction sizes may be accorded more additional retransmissions as they may be more likely to contain time-sensitive data.

The device may then retransmit the packet in accordance with the determined number of additional retransmissions. The device may re-retransmit the packet in any manner. In some embodiments, the device may space the transmission of the additional retransmission(s) so that they are unlikely to all be lost in a single network loss event. In some cases, the device may halt the transmission of one or more of the additional retransmissions upon receiving an indication that the packet has been successfully received.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for prioritizing transmission of packets comprising:

receiving, by an intermediary, a first packet of a first transaction, the first packet stored in a buffer of the intermediary;

receiving, by the intermediary, a second packet of a second transaction;

determining, by the intermediary, that the first transaction is complete;

determining, by the intermediary, a first average transaction size of the first transaction associated with a first transport layer connection of the first packet, responsive to determining that the first transaction is complete;

assigning, by the intermediary, a first transmission priority to the first packet, the transmission priority determined responsive to the determined first transaction size, wherein the first packet has a higher priority than the second packet, responsive to a determination that the first average transaction size is smaller than a second average transaction size associated with the second transaction; and transmitting from the buffer, by the intermediary and responsive to determining the first transaction is complete, the first packet and the second packet, wherein the transmission order is determined according to the first assigned transmission priority.

2. The method of claim 1, wherein the intermediary comprises one of: a client, a server, a client agent, and a network appliance.

3. The method of claim 1 wherein receiving the first packet of the first transaction comprises receiving, by the intermediary, the first packet via the first transport layer connection.

4. The method of claim 1, wherein receiving the first packet of the first transaction comprises receiving, by the intermediary, the first packet comprising encrypted data.

5. The method of claim 1, wherein receiving the first packet of the first transaction comprises receiving, by the intermediary, the first packet comprising one of Internet Computing Architecture (ICA) protocol or Remote Desktop Protocol (RDP) protocol.

6. The method of claim 1, wherein receiving the first packet of the first transaction comprises receiving, by an intermediary, for a plurality of Transport Control Protocol (TCP) connections, the first packet via a first TCP connection of the plurality of TCP connections.

7. The method of claim 1, wherein receiving the second packet of the second transaction comprises receiving, by the intermediary, the second packet via a second transport layer connection.

8. The method of claim 1, wherein determining the first average transaction size of the first transaction comprises determining, by the intermediary, the first average transaction size of the first transaction by identifying that the first packet comprises a final packet of the transaction.

9. The method of claim 1, wherein determining the first average transaction size of the first transaction comprises determining, by the intermediary, the first average transaction size of a transaction by identifying at least one starting and ending point of the first transaction transmitted via the first transport layer connection and identifying the amount of data transmitted between the starting and ending points.

10. The method of claim 1, wherein determining the first average transaction size of the first transaction comprises determining, by the intermediary, the first average transaction size of a transaction by identifying that at least one received packet is smaller than a maximum packet size.

11. The method of claim 1, wherein determining the first average transaction size of the first transaction comprises determining, by the intermediary, the first average transaction size of the transaction by identifying at least one received packet is smaller than a maximum packet size and was immediately preceded by at least one packet of the maximum packet size.

12. The method of claim 1, wherein determining the first average transaction size of the first transaction comprises determining, by the intermediary, the first average transaction size of the transaction by identifying that a buffer corresponding to a connection has transitioned from non-empty to empty.

13. The method of claim 1, wherein determining the first average transaction size of the first transaction comprises determining, by the intermediary, the first average transaction size of the transaction by identifying a gap in packet arrival times.

14. The method of claim 1, wherein determining the first average transaction size of the first transaction comprises determining, by the intermediary, the first average transaction size of the transaction by identifying a marked PSH bit.

15. The method of claim 1, wherein determining the first average transaction size of the first transaction comprises determining, by the intermediary, the first average transaction size of the transaction by identifying that a buffer corresponding to the first transport layer connection has transitioned from empty to non-empty.

16. The method of claim 1, wherein determining the first average transaction size of the first transaction comprises determining, by the intermediary, the first average transaction size associated with the first transport layer connection by identifying a plurality of starting and ending points of transactions transmitted via the first transport layer connection and determining the average amount of data transmitted between the plurality of starting and ending points.

17. The method of claim 1, wherein determining the first transaction size of the first transaction comprises determining, by the intermediary, the first average transaction size associated with the first transport layer connection by identifying a plurality of starting and ending points of transactions transmitted via the first transport layer connection over a predetermined time interval and determining the average amount of data transmitted between the plurality of starting and ending points.

18. The method of claim 1, further comprising: determining, by the intermediary, the second average transaction size associated with the second packet.

19. The method of claim 18, wherein assigning the first transmission priority to the first packet comprises assigning, by the intermediary, to the first packet and the second packet, a transmission priority, the transmission priority determined responsive to the determined first average transaction size and the determined second average transaction size.

20. The method of claim 18, wherein assigning the first transmission priority to the first packet comprises assigning, by the intermediary to the first packet and the second packet, a transmission priority wherein the first packet has a higher priority than the second packet, responsive to a determination that the first average transaction size is smaller than the second average transaction size.

21. The method of claim 18, wherein assigning the first transmission priority to the first packet comprises assigning, by the intermediary to the first packet and the second packet, a transmission priority wherein the first packet has a higher priority than the second packet, responsive to a determination that the first average transaction size is smaller than the second average transaction size and a determination that the first transport layer connection has not exceeded a given transmission bandwidth threshold.

22. The method of claim 18, wherein assigning the first transmission priority to the first packet comprises assigning, by the intermediary to the first packet and the second packet, a transmission priority wherein the first packet has a lower priority than the second packet, responsive to a determination that the first average transaction size is larger than the second average transaction size.

23. The method of claim 1, wherein transmitting the first packet and the second packet from the buffer comprises placing the first packet in a first transmission queue having a priority corresponding to the first assigned transmission priority.

24. The method of claim 1, wherein transmitting the first packet and the second packet from the buffer comprises placing the first packet in a first transmission queue having a priority corresponding to the first assigned transmission priority and placing the second packet in a second transmission queue having a priority corresponding to a transmission priority assigned to the second packet.

25. The apparatus of claim 1, wherein the flow controller assigns a first transmission priority to the first packet and a second transmission priority to the second packet, the first transmission priority determined responsive to the determined first average transaction size and the second transmission priority determined responsive to the second average transaction size.

26. The method of claim 1, wherein determining the first transaction is complete comprises determining that the first average transaction size exceeds a predetermined threshold.

27. The method of claim 1, wherein determining the first transaction is complete comprises determining that a predetermined time has passed since the first transaction was begun.

28. The method of claim 1, wherein assigning the first transmission priority to the first packet comprises assigning a single transmission priority to the first transaction associated with the first packet.

29. The method of claim 1, wherein the first transaction associated with the first packet comprises a plurality of packets.

30. A method for prioritizing transmission of packets comprising:
    receiving, by an intermediary, a first packet of a first transaction, the first packet stored in a buffer of the intermediary;
    receiving, by the intermediary, a second packet of a second transaction;
    determining, by the intermediary, that the first transaction is complete;
    determining, by the intermediary, a first average transaction size of a first transaction associated with a first transport layer connection of the first packet, responsive to determining that the first transaction is complete;

assigning, by the intermediary, a first transmission priority to the first packet, the transmission priority determined responsive to the determined first average transaction size, wherein the first packet has a higher priority than the second packet, responsive to a determination that the first average transaction size is smaller than a second average transaction size associated with the second transaction and a determination that the first transport layer connection has not exceeded a given transmission bandwidth threshold; and transmitting from the buffer, by the intermediary and responsive to determining the first transaction is complete, the first packet and the second packet, wherein the transmission order is determined according to the first assigned transmission priority.

31. A method for prioritizing transmission of packets comprising:
   receiving, by an intermediary, a first packet of a first transaction, the first packet stored in a buffer of the intermediary;
   receiving, by the intermediary, a second packet of a second transaction;
   determining, by the intermediary, that the first transaction is complete;
   determining, by the intermediary, a first average transaction size of a transaction associated with a first transport layer connection of the first packet, responsive to determining that the first transaction is complete;
   assigning, by the intermediary, a first transmission priority to the first packet, the transmission priority determined responsive to the determined first average transaction size, wherein the first packet has a lower priority than the second packet, responsive to a determination that the first average transaction size is larger than a second average transaction size associated with the second transaction; and
   transmitting from the buffer, by the intermediary and responsive to determining the first transaction is complete, the first packet and the second packet, wherein the transmission order is determined according to the first assigned transmission priority.

32. An apparatus for prioritizing packets for transmission comprising:
   a packet processor receiving a first packet of a first transaction and a second packet of a second transaction;
   a buffer storing the received first packet; and
   a flow controller
      determining that the first transaction is complete;
      determining a first average transaction size of the first transaction associated with a first transport layer connection of the first packet, responsive to determining the first transaction is complete;
      assigning to the first packet a transmission priority responsive to the determined first average transaction size, wherein the first packet has a higher priority than the second packet, responsive to a determination that the first average transaction size is smaller than a second average transaction size associated with the second transaction; and
      transmitting from the buffer, responsive to determining the first transaction is complete, the first packet and the second packet according to the assigned transmission priority.

33. The apparatus of claim 32 wherein the packet processor receives the first packet via the first transport layer connection.

34. The apparatus of claim 32 wherein the packet processor receives the second packet via a second transport layer connection.

35. The apparatus of claim 32, wherein the flow controller determines the first average transaction size associated with the first packet by determining that the first packet comprises a final packet of a transaction.

36. The apparatus of claim 32, wherein the flow controller determines the first average transaction size associated with the first packet by determining at least one starting and ending point of the first transaction transmitted via the first transport layer connection and computing the amount of data transmitted between the starting and ending points.

37. The apparatus of claim 32, wherein the flow controller determines the first average transaction size associated with the first packet by determining an ending point of the first transaction by identifying at least one packet received by the device via the first transport layer connection is smaller than a maximum packet size.

38. The apparatus of claim 32, wherein the flow controller determines the first average transaction size associated with the first packet by determining an ending point of the first transaction by identifying at least one packet received by the device via the first transport layer connection is smaller than a maximum packet size and was immediately preceded by at least one packet of the maximum packet size.

39. The apparatus of claim 32, wherein the flow controller determines the first average transaction size associated with the first packet by determining an ending point of the first transaction by identifying that a buffer corresponding to the first transport layer connection has transitioned from non-empty to empty.

40. The apparatus of claim 32, wherein the flow controller determines the first average transaction size associated with the first packet by determining an ending point of the first transaction by identifying a gap in packet arrival times.

41. The apparatus of claim 32, wherein the flow controller determines the first average transaction size associated with the first packet by determining an ending point of the first transaction by identifying a marked PSH bit.

42. The apparatus of claim 32, wherein the flow controller determines the first average transaction size associated with the first packet by determining a starting point of the first transaction by identifying that a buffer corresponding to the first transport layer connection has transitioned from empty to non-empty.

43. The apparatus of claim 32, wherein the flow controller determines the first average transaction size associated with the first packet by determining a plurality of starting and ending points of transactions transmitted via the first transport layer connection and determining the average amount of data transmitted between the plurality of starting and ending points.

44. The apparatus of claim 32, wherein the flow controller determines the first average transaction size associated with the first packet by determining a plurality of starting and ending points of transactions transmitted via the first transport layer connection over a predetermined time interval and computing the average amount of data transmitted between the plurality of starting and ending points.

45. The apparatus of claim 32, wherein the flow controller determines
   the second average transaction size associated with the second transport layer connection.

46. The apparatus of claim 45, wherein the flow controller assigns a first transmission priority to the first packet responsive to the determined first average transaction size and a second transmission priority to the second packet responsive to the determined second average transaction size.

47. The apparatus of claim 45, wherein the flow controller assigns a first transmission priority to the first packet having a higher priority than the second transmission priority, responsive to a determination that the first average transaction size is smaller than the second average transaction size and a determination that the first transport layer connection has not exceeded a given transmission bandwidth threshold.

48. The apparatus of claim 45, wherein the flow controller assigns a first transmission priority to the first packet having a lower priority than the second transmission priority, responsive to a determination that the first average transaction size is larger than the second average transaction size.

49. The apparatus of claim 32, wherein the apparatus is one of: a client, a server, a client agent and a network appliance.

50. An apparatus for prioritizing packets for transmission comprising:
- a packet processor receiving a first packet of a first transaction and a second packet of a second transaction;
- a buffer storing the received first packet; and
- a flow controller
    - determining that the first transaction is complete;
    - determining a first average transaction size associated with a first transport layer connection of the first packet, responsive to determining the first transaction is complete;
    - assigning to the first packet a transmission priority responsive to the determined first transaction size, wherein the first packet has a higher priority than the second packet, responsive to a determination that the first average transaction size is smaller than a second average transaction size and a determination that the first transport layer connection has not exceeded a given transmission bandwidth threshold; and
    - transmitting from the buffer, responsive to determining the first transaction is complete, the first packet and the second packet according to the assigned transmission priority.

51. An apparatus for prioritizing packets for transmission comprising:
- a packet processor receiving a first packet of a first transaction and a second packet of a second transaction;
- a buffer storing the received first packet; and
- a flow controller
    - determining that the first average transaction is complete;
    - determining a first average transaction size associated with a first transport layer connection of the first packet, responsive to determining the first transaction is complete;
    - assigning to the first packet a transmission priority responsive to the determined first transaction size, wherein the first packet has a higher priority than the second packet, responsive to a determination that the first average transaction size is larger than a second average transaction size; and
    - transmitting from the buffer, responsive to determining the first transaction is complete, the first packet and the second packet according to the assigned transmission priority.

* * * * *

UNITED STATES PATENT AND TRADEMARK OFFICE
CERTIFICATE OF CORRECTION

| | |
|---|---|
| PATENT NO. | : 8,432,800 B2 |
| APPLICATION NO. | : 11/685156 |
| DATED | : April 30, 2013 |
| INVENTOR(S) | : Plamondon et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1479 days.

Signed and Sealed this
Sixteenth Day of December, 2014

Michelle K. Lee
*Deputy Director of the United States Patent and Trademark Office*